US009830916B2

(12) United States Patent
Melkote et al.

(10) Patent No.: US 9,830,916 B2
(45) Date of Patent: Nov. 28, 2017

(54) SIGNAL DECORRELATION IN AN AUDIO PROCESSING SYSTEM

(71) Applicant: Dolby Laboratories Licensing Corporation, San Francisco, CA (US)

(72) Inventors: Vinay Melkote, Hayward, CA (US); Kuan-Chieh Yen, Foster City, CA (US); Grant A. Davidson, Burlingame, CA (US); Matthew Fellers, San Francisco, CA (US); Mark S. Vinton, San Francisco, CA (US); Vivek Kumar, San Bruno, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/766,371

(22) PCT Filed: Jan. 22, 2014

(86) PCT No.: PCT/US2014/012453
§ 371 (c)(1),
(2) Date: Aug. 6, 2015

(87) PCT Pub. No.: WO2014/126682
PCT Pub. Date: Aug. 21, 2014

(65) Prior Publication Data

US 2015/0380000 A1 Dec. 31, 2015

Related U.S. Application Data

(60) Provisional application No. 61/764,837, filed on Feb. 14, 2013.

(51) Int. Cl.
*G10L 19/008* (2013.01)
*G10L 19/02* (2013.01)
(Continued)

(52) U.S. Cl.
CPC ............ *G10L 19/008* (2013.01); *G10L 19/02* (2013.01); *G10L 19/06* (2013.01); *G10L 25/06* (2013.01); *H04S 3/008* (2013.01); *H04S 5/00* (2013.01)

(58) Field of Classification Search
USPC ..................... 704/501, 503; 381/17; 398/135
See application file for complete search history.

(56) References Cited

U.S. PATENT DOCUMENTS 4,701,936 A 10/1987 Clark
5,077,798 A 12/1991 Ichikawa
(Continued)

FOREIGN PATENT DOCUMENTS

EP 2144229 1/2010
EP 2209114 7/2010
(Continued)

OTHER PUBLICATIONS

Digital Audio Compression Standard (AC-3 E-AC-3), Advanced Television Systems Committee, Document A/52, Nov. 22, 2010 http://atsc.org/wp-content/uploads/2015/03/A52-201212-17.pdf.*
(Continued)

*Primary Examiner* — Duc Nguyen
*Assistant Examiner* — Yogeshkumar Patel

(57) ABSTRACT

Audio processing methods may involve receiving audio data corresponding to a plurality of audio channels. The audio data may include a frequency domain representation corresponding to filterbank coefficients of an audio encoding or processing system. A decorrelation process may be performed with the same filterbank coefficients used by the audio encoding or processing system. The decorrelation process may be performed without converting coefficients of the frequency domain representation to another frequency domain or time domain representation. The decorrelation
(Continued)

process may involve selective or signal-adaptive decorrelation of specific channels and/or specific frequency bands. The decorrelation process may involve applying a decorrelation filter to a portion of the received audio data to produce filtered audio data. The decorrelation process may involve using a non-hierarchal mixer to combine a direct portion of the received audio data with the filtered audio data according to spatial parameters.

15 Claims, 30 Drawing Sheets

(51) Int. Cl.

| | |
|---|---|
| ***H04S 3/00*** | (2006.01) |
| ***H04S 5/00*** | (2006.01) |
| ***H04L 19/00*** | (2006.01) |
| ***H04L 25/06*** | (2006.01) |
| ***G10L 19/06*** | (2013.01) |
| ***G10L 25/06*** | (2013.01) |

(56) References Cited

U.S. PATENT DOCUMENTS

| | | | | |
|---|---|---|---|---|
| 7,177,431 | B2 | 2/2007 | Davis | |
| 7,218,665 | B2 | 5/2007 | McElwain | |
| 7,564,978 | B2 | 7/2009 | Engdegard | |
| 7,961,890 | B2 | 6/2011 | Holzer | |
| 7,974,713 | B2 | 7/2011 | Disch et al. | |
| 7,986,789 | B2 | 7/2011 | Purnhagen | |
| 8,015,018 | B2 | 9/2011 | Seefeldt | |
| 8,019,350 | B2 | 9/2011 | Purnhagen | |
| 8,046,214 | B2 | 10/2011 | Mehrotra | |
| 8,081,764 | B2 | 12/2011 | Takagi | |
| 8,116,459 | B2 | 2/2012 | Disch | |
| 8,145,499 | B2 | 3/2012 | Herre | |
| 8,255,228 | B2 | 8/2012 | Hilpert | |
| 8,515,759 | B2 | 8/2013 | Engdegard | |
| 8,527,264 | B2 | 9/2013 | Davidson | |
| 8,793,125 | B2 | 7/2014 | Schuijers | |
| 8,885,836 | B2 | 11/2014 | McGrath | |
| 8,983,834 | B2 | 3/2015 | Davis | |
| 9,305,564 | B2 | 4/2016 | Disch | |
| 2007/0269063 | A1 | 11/2007 | Goodwin | |
| 2008/0126104 | A1 * | 5/2008 | Seefeldt | G10L 19/008<br>704/503 |
| 2008/0255856 | A1 | 10/2008 | Schuijers | |
| 2008/0263285 | A1 | 10/2008 | Sharma | |
| 2008/0279388 | A1 | 11/2008 | Oh | |
| 2009/0022328 | A1 | 1/2009 | Neugebauer | |
| 2009/0052681 | A1 | 2/2009 | Schobben | |
| 2009/0281800 | A1 | 11/2009 | Leblanc | |
| 2009/0299756 | A1 | 12/2009 | Davis | |
| 2009/0304198 | A1 | 12/2009 | Herre | |
| 2009/0306993 | A1 | 12/2009 | Wuebbolt | |
| 2010/0040243 | A1 | 2/2010 | Johnston | |
| 2010/0080397 | A1 | 4/2010 | Suzuki | |
| 2010/0094631 | A1 | 4/2010 | Engdegard | |
| 2010/0327147 | A1 | 12/2010 | Toliver | |
| 2012/0020499 | A1 | 1/2012 | Neusinger | |
| 2012/0051549 | A1 | 3/2012 | Nagel | |
| 2012/0076323 | A1 | 3/2012 | Disch | |
| 2012/0082319 | A1 | 4/2012 | Jot | |
| 2012/0243692 | A1 | 9/2012 | Ramamoorthy | |
| 2012/0314876 | A1 | 12/2012 | Vilkamo | |
| 2013/0006618 | A1 | 1/2013 | Toguri | |
| 2013/0051579 | A1 | 2/2013 | Craven | |
| 2013/0151263 | A1 | 6/2013 | Lee | |
| 2013/0173273 | A1 | 7/2013 | Kuntz | |

FOREIGN PATENT DOCUMENTS

| | | | |
|---|---|---|---|
| EP | 2477188 | | 7/2012 |
| EP | 2551850 | | 1/2013 |
| EP | 2947657 | A1 * | 11/2015 |
| JP | 2007-532960 | | 11/2007 |
| JP | 2008-522551 | | 6/2008 |
| JP | 2008-543227 | | 11/2008 |
| JP | 2009-506372 | | 2/2009 |
| JP | 2009-520237 | | 5/2009 |
| JP | 2010-504017 | | 2/2010 |
| JP | 2014-512020 | | 5/2014 |
| JP | 2016-510433 | | 4/2016 |
| RU | 2367033 | | 9/2009 |
| RU | 2383942 | | 3/2010 |
| RU | 2392671 | | 6/2010 |
| RU | 2422922 | | 6/2011 |
| RU | 2449388 | | 4/2012 |
| WO | 99/41947 | | 8/1999 |
| WO | 2005/101370 | | 10/2005 |
| WO | 2006/008697 | | 1/2006 |
| WO | 2006/026452 | | 3/2006 |
| WO | 2006/048227 | | 5/2006 |
| WO | 2007/109338 | | 9/2007 |
| WO | 2010/149700 | | 12/2010 |
| WO | 2011/086060 | | 7/2011 |
| WO | 2011/090834 | | 7/2011 |
| WO | 2011/124608 | | 10/2011 |
| WO | 2012/025283 | | 3/2012 |
| WO | 2012/025429 | | 3/2012 |
| WO | 2013/017435 | | 2/2013 |

OTHER PUBLICATIONS

Advanced Television Systems Committee, Inc., "A/52B, ATSC Standard, Digital Audio Compression Standard (AC-3, E-AC-3) Revision B", Jun. 14, 2005.

Chen, S. et al "Spatial Parameters for Audio Coding: MDCT Domain Analysis and Synthesis" Multimedia Tools and Applications, Jun. 2010, vol. 48, Issue 2, pp. 225-246.

Roden, J. et al "A Study of the MPEG Surround Quality Versus Bit-Rate Curve" AES presented at the 123rd Convention, Oct. 5-8, 2007, New York, USA.

Herre, J. et al "MPEG-4 High-Efficiency AAC Coding" IEEE Signal Processing Magazine, May 2008, vol. 25, Issue 3.

EBU-Tech 3324 "EBU Evaluations of Multichannel Audio Codecs", Geneva, Sep. 2007.

Recommendation ITU-R BS.1534-1, "Method for the Subjective Assessment of Intermediate Quality Level of Coding Systems" Mar. 2003.

ATSC, "Digital Audio Compression Standard (AC-3, E-AC-3)" Nov. 22, 2010.

Uhle, Christian "Applause Sound Detection" JAES, vol. 59, No. 4, Apr. 1, 2011, pp. 213-224.

Laitinen, Mikko-Ville, et al "Reproducing Applause-Type Signals with Directional Audio Coding" JAES, vol. 59, No. 1/2, Jan. 1, 2011, pp. 29-43.

Briand, M. et al "Parametric Coding of Stereo Audio Based on Principal Component Analysis" Proc. of the 9th Int. Conference on Digital Audio Effects, Montreal, Canada, Sep. 18-20, 2006, pp. 291-296.

Kuntz, A. et al "The Transient Steering Decorrelator Tool in the Upcoming MPEG Unified Speech and Audio Coding Standard", AES Convention, Oct. 19, 2011.

Gupta, S. et al "Feature Predictive Vector Quantization of Multispectral Images" IEEE Transactions on Geoscience and Remote Sensing, vol. 30, No. 3, May 1992, pp. 491-501.

ISO/IEC "Definitions and Interface Descriptions for NBC RM2" MPEG Meeting, Jul. 1995, ISO/IEC JTC1/SC29/WG11, Coding of Moving Pictures and Associated Audio.

Yang, D. et al "Adaptive Karhunen-Loeve Transform for Enhanced Multichannel Audio Coding" SPIE, vol. 4475, Dec. 5, 2001.

Ortega, A. et al "Adaptive Scalar Quantization Without Side Information" IEEE Transactions on Image Processing, Piscataway, NJ, USA, vol. 6, No. 5, May 1, 1997.

Fielder, L. D. et al "Introduction to Dolby Digital Plus, an Enhancement to the Dolby Digital Coding System" AES Convention Paper 6196, presented at the 117th Convention, Oct. 28-31, 2004, San Francisco, CA, USA.

(56) References Cited

OTHER PUBLICATIONS

Melkote, V. et al "Transform-Domain Decorrelation in Dolby Digital Plus" IEEE International Conference on Acoustic, Speech and Signal Processing, May 4, 2014, pp. 6949-6953.
Varner, L.W. et al "A Simple Adaptive Filtering Technique for Speech Enhancement" IEEE on Acoustics, Speech and Signal Processing, vol. 8, pp. 1126-1128, Apr. 1983.
Yu, Shiang-Hwua, "Feedback Dithering for Decorrelating Quantization Noise and Enhancing SNDR" IEEE Transactions on Control Systems Technology, vol. 20, No. 3, pp. 621-631, May 2012.
Breebaart, J. et al "MPEG Spatial Audio Coding/MPEG Surround: Overview and Current Status" AES Convention 119, Oct. 1, 2005.
ISO/IEC FDIS 23003-3:2011—Information Technology—MPEG Audio Technologies—Part 3: Unified Speech and Audio Coding, ISO/IEC JTC 1/SC 29 WG 11, Sep. 2011.
Neuendorf, M. et al "MPEG Unified Speech and Audio Coding—the ISO/MPEG Standard for High-Efficiency Audio Coding of all Content Types" Audio Engineering Society Convention, AES Convention 132, published on Apr. 26, 2012.
Liu, Chin-Min et al "Design of the Coupling Schemes for the AC-3 Coder In Stereo Coding" IEEE Transactions on consumer Electronics, vol. 44, No. 3, pp. 878-882, Aug. 1998.
Potard, G. et al "Decorrelation Techniques for the Rendering of Apparent Sound Source Width in 3D Audio Displays" Proc. of the 7th International Conference on Digital Audio Effects (DAFx '04), Naples, Italy, Oct. 5-8, 2004, pp. 280-284.

* cited by examiner

SIGNAL DECORRELATION IN AN AUDIO PROCESSING SYSTEM

TECHNICAL FIELD

This disclosure relates to signal processing.

BACKGROUND

The development of digital encoding and decoding processes for audio and video data continues to have a significant effect on the delivery of entertainment content. Despite the increased capacity of memory devices and widely available data delivery at increasingly high bandwidths, there is continued pressure to minimize the amount of data to be stored and/or transmitted. Audio and video data are often delivered together, and the bandwidth for audio data is often constrained by the requirements of the video portion.

Accordingly, audio data are often encoded at high compression factors, sometimes at compression factors of 30:1 or higher. Because signal distortion increases with the amount of applied compression, trade-offs may be made between the fidelity of the decoded audio data and the efficiency of storing and/or transmitting the encoded data.

Moreover, it is desirable to reduce the complexity of the encoding and decoding algorithms. Encoding additional data regarding the encoding process can simplify the decoding process, but at the cost of storing and/or transmitting additional encoded data. Although existing audio encoding and decoding methods are generally satisfactory, improved methods would be desirable.

SUMMARY

Some aspects of the subject matter described in this disclosure can be implemented in audio processing methods. Some such methods may involve receiving audio data corresponding to a plurality of audio channels. The audio data may include a frequency domain representation corresponding to filterbank coefficients of an audio encoding or processing system. The method may involve applying a decorrelation process to at least some of the audio data. In some implementations, the decorrelation process may be performed with the same filterbank coefficients used by the audio encoding or processing system.

In some implementations, the decorrelation process may be performed without converting coefficients of the frequency domain representation to another frequency domain or time domain representation. The frequency domain representation may be the result of applying a perfect reconstruction, critically-sampled filterbank. The decorrelation process may involve generating reverb signals or decorrelation signals by applying linear filters to at least a portion of the frequency domain representation. The frequency domain representation may be a result of applying a modified discrete sine transform, a modified discrete cosine transform or a lapped orthogonal transform to audio data in a time domain. The decorrelation process may involve applying a decorrelation algorithm that operates entirely on real-valued coefficients.

According to some implementations, the decorrelation process may involve selective or signal-adaptive decorrelation of specific channels. Alternatively, or additionally, the decorrelation process may involve selective or signal-adaptive decorrelation of specific frequency bands. The decorrelation process may involve applying a decorrelation filter to a portion of the received audio data to produce filtered audio data. The decorrelation process may involve using a non-hierarchal mixer to combine a direct portion of the received audio data with the filtered audio data according to spatial parameters.

In some implementations, decorrelation information may be received, either with the audio data or otherwise. The decorrelation process may involve decorrelating at least some of the audio data according to the received decorrelation information. The received decorrelation information may include correlation coefficients between individual discrete channels and a coupling channel, correlation coefficients between individual discrete channels, explicit tonality information and/or transient information.

The method may involve determining decorrelation information based on received audio data. The decorrelation process may involve decorrelating at least some of the audio data according to determined decorrelation information. The method may involve receiving decorrelation information encoded with the audio data. The decorrelation process may involve decorrelating at least some of the audio data according to at least one of the received decorrelation information or the determined decorrelation information.

According to some implementations, the audio encoding or processing system may be a legacy audio encoding or processing system. The method may involve receiving control mechanism elements in a bitstream produced by the legacy audio encoding or processing system. The decorrelation process may be based, at least in part, on the control mechanism elements.

In some implementations, an apparatus may include an interface and a logic system configured for receiving, via the interface, audio data corresponding to a plurality of audio channels. The audio data may include a frequency domain representation corresponding to filterbank coefficients of an audio encoding or processing system. The logic system may be configured for applying a decorrelation process to at least some of the audio data. In some implementations, the decorrelation process may be performed with the same filterbank coefficients used by the audio encoding or processing system. The logic system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components.

In some implementations, the decorrelation process may be performed without converting coefficients of the frequency domain representation to another frequency domain or time domain representation. The frequency domain representation may be the result of applying a critically-sampled filterbank. The decorrelation process may involve generating reverb signals or decorrelation signals by applying linear filters to a least a portion of the frequency domain representation. The frequency domain representation may be the result of applying a modified discrete sine transform, a modified discrete cosine transform or a lapped orthogonal transform to audio data in a time domain. The decorrelation process may involve applying a decorrelation algorithm that operates entirely on real-valued coefficients.

The decorrelation process may involve selective or signal-adaptive decorrelation of specific channels. The decorrelation process may involve selective or signal-adaptive decorrelation of specific frequency bands. The decorrelation process may involve applying a decorrelation filter to a portion of the received audio data to produce filtered audio data. In some implementations, the decorrelation process may involve using a non-hierarchal mixer to combine the portion of the received audio data with the filtered audio data according to spatial parameters.

The apparatus may include a memory device. In some implementations, the interface may be an interface between the logic system and the memory device. Alternatively, the interface may be a network interface.

The audio encoding or processing system may be a legacy audio encoding or processing system. In some implementations, the logic system may be further configured for receiving, via the interface, control mechanism elements in a bitstream produced by the legacy audio encoding or processing system. The decorrelation process may be based, at least in part, on the control mechanism elements.

Some aspects of this disclosure may be implemented in a non-transitory medium having software stored thereon. The software may include instructions for controlling an apparatus to receive audio data corresponding to a plurality of audio channels. The audio data may include a frequency domain representation corresponding to filterbank coefficients of an audio encoding or processing system. The software may include instructions for controlling the apparatus to apply a decorrelation process to at least some of the audio data. In some implementations, the decorrelation process being performed with the same filterbank coefficients used by the audio encoding or processing system.

In some implementations, the decorrelation process may be performed without converting coefficients of the frequency domain representation to another frequency domain or time domain representation. The frequency domain representation may be the result of applying a critically-sampled filterbank. The decorrelation process may involve generating reverb signals or decorrelation signals by applying linear filters to a least a portion of the frequency domain representation. The frequency domain representation may be a result of applying a modified discrete sine transform, a modified discrete cosine transform or a lapped orthogonal transform to audio data in a time domain. The decorrelation process may involve applying a decorrelation algorithm that operates entirely on real-valued coefficients.

Some methods may involve receiving audio data corresponding to a plurality of audio channels and determining audio characteristics of the audio data. The audio characteristics may include transient information. The methods may involve determining an amount of decorrelation for the audio data based, at least in part, on the audio characteristics and processing the audio data according to a determined amount of decorrelation.

In some instances, no explicit transient information may be received with the audio data. In some implementations, the process of determining transient information may involve detecting a soft transient event.

The process of determining transient information may involve evaluating a likelihood and/or a severity of a transient event. The process of determining transient information may involve evaluating a temporal power variation in the audio data.

The process of determining the audio characteristics may involve receiving explicit transient information with the audio data. The explicit transient information may include at least one of a transient control value corresponding to a definite transient event, a transient control value corresponding to a definite non-transient event or an intermediate transient control value. The explicit transient information may include an intermediate transient control value or a transient control value corresponding to a definite transient event. The transient control value may be subject to an exponential decay function.

The explicit transient information may indicate a definite transient event. Processing the audio data may involve temporarily halting or slowing a decorrelation process. The explicit transient information may include a transient control value corresponding to a definite non-transient event or an intermediate transient value. The process of determining transient information may involve detecting a soft transient event. The process of detecting a soft transient event may involve evaluating at least one of a likelihood or a severity of a transient event.

The determined transient information may be a determined transient control value corresponding to the soft transient event. The method may involve combining the determined transient control value with the received transient control value to obtain a new transient control value. The process of combining the determined transient control value and the received transient control value may involve determining the maximum of the determined transient control value and the received transient control value.

The process of detecting a soft transient event may involve detecting a temporal power variation of the audio data. Detecting the temporal power variation may involve determining a variation in a logarithmic power average. The logarithmic power average may be a frequency-band-weighted logarithmic power average. Determining the variation in the logarithmic power average may involve determining a temporal asymmetric power differential. The asymmetric power differential may emphasize increasing power and may de-emphasize decreasing power. The method may involve determining a raw transient measure based on the asymmetric power differential. Determining the raw transient measure may involve calculating a likelihood function of transient events based on an assumption that the temporal asymmetric power differential is distributed according to a Gaussian distribution. The method may involve determining a transient control value based on the raw transient measure. The method may involve applying an exponential decay function to the transient control value.

Some methods may involve applying a decorrelation filter to a portion of the audio data, to produce filtered audio data and mixing the filtered audio data with a portion of the received audio data according to a mixing ratio. The process of determining the amount of decorrelation may involve modifying the mixing ratio based, at least in part, on the transient control value.

Some methods may involve applying a decorrelation filter to a portion of the audio data to produce filtered audio data. Determining the amount of decorrelation for the audio data may involve attenuating an input to the decorrelation filter based on the transient information. The process of determining an amount of decorrelation for the audio data may involve reducing an amount of decorrelation in response to detecting a soft transient event.

Processing the audio data may involve applying a decorrelation filter to a portion of the audio data, to produce filtered audio data, and mixing the filtered audio data with a portion of the received audio data according to a mixing ratio. The process of reducing the amount of decorrelation may involve modifying the mixing ratio.

Processing the audio data may involve applying a decorrelation filter to a portion of the audio data to produce filtered audio data, estimating a gain to be applied to the filtered audio data, applying the gain to the filtered audio data and mixing the filtered audio data with a portion of the received audio data.

The estimating process may involve matching a power of the filtered audio data with a power of the received audio data. In some implementations, the processes of estimating and applying the gain may be performed by a bank of duckers. The bank of duckers may include buffers. A fixed delay may be applied to the filtered audio data and the same delay may be applied to the buffers.

At least one of a power estimation smoothing window for the duckers or the gain to be applied to the filtered audio data may be based, at least in part, on determined transient information. In some implementations, a shorter smoothing window may be applied when a transient event is relatively more likely or a relatively stronger transient event is detected, and a longer smoothing window may be applied when a transient event is relatively less likely, a relatively weaker transient event is detected or no transient event is detected.

Some methods may involve applying a decorrelation filter to a portion of the audio data to produce filtered audio data, estimating a ducker gain to be applied to the filtered audio data, applying the ducker gain to the filtered audio data and mixing the filtered audio data with a portion of the received audio data according to a mixing ratio. The process of determining the amount of decorrelation may involve modifying the mixing ratio based on at least one of the transient information or the ducker gain.

The process of determining the audio characteristics may involve determining at least one of a channel being block switched, a channel being out of coupling or channel coupling not being in use. Determining an amount of decorrelation for the audio data may involve determining that a decorrelation process should be slowed or temporarily halted.

Processing the audio data may involve a decorrelation filter dithering process.

The method may involve determining, based at least in part on the transient information, that the decorrelation filter dithering process should be modified or temporarily halted. According to some methods, it may be determined that the decorrelation filter dithering process will be modified by changing a maximum stride value for dithering poles of the decorrelation filter.

According to some implementations, an apparatus may include an interface and a logic system. The logic system may be configured for receiving, from the interface, audio data corresponding to a plurality of audio channels and for determining audio characteristics of the audio data. The audio characteristics may include transient information. The logic system may be configured for determining an amount of decorrelation for the audio data based, at least in part, on the audio characteristics and for processing the audio data according to a determined amount of decorrelation.

In some implementations, no explicit transient information may be received with the audio data. The process of determining transient information may involve detecting a soft transient event. The process of determining transient information may involve evaluating at least one of a likelihood or a severity of a transient event. The process of determining transient information may involve evaluating a temporal power variation in the audio data.

In some implementations, determining the audio characteristics may involve receiving explicit transient information with the audio data. The explicit transient information may indicate at least one of a transient control value corresponding to a definite transient event, a transient control value corresponding to a definite non-transient event or an intermediate transient control value. The explicit transient information may include an intermediate transient control value or a transient control value corresponding to a definite transient event. The transient control value may be subject to an exponential decay function.

If the explicit transient information indicates a definite transient event, processing the audio data may involve temporarily slowing or halting a decorrelation process. If the explicit transient information includes a transient control value corresponding to a definite non-transient event or an intermediate transient value, the process of determining transient information may involve detecting a soft transient event. The determined transient information may be a determined transient control value corresponding to the soft transient event.

The logic system may be further configured for combining the determined transient control value with the received transient control value to obtain a new transient control value. In some implementations, the process of combining the determined transient control value and the received transient control value may involve determining the maximum of the determined transient control value and the received transient control value.

The process of detecting a soft transient event may involve evaluating at least one of a likelihood or a severity of a transient event. The process of detecting a soft transient event may involve detecting a temporal power variation of the audio data.

In some implementations, the logic system may be further configured for applying a decorrelation filter to a portion of the audio data to produce filtered audio data and mixing the filtered audio data with a portion of the received audio data according to a mixing ratio. The process of determining the amount of decorrelation may involve modifying the mixing ratio based, at least in part, on the transient information.

The process of determining an amount of decorrelation for the audio data may involve reducing an amount of decorrelation in response to detecting the soft transient event. Processing the audio data may involve applying a decorrelation filter to a portion of the audio data, to produce filtered audio data, and mixing the filtered audio data with a portion of the received audio data according to a mixing ratio. The process of reducing the amount of decorrelation may involve modifying the mixing ratio.

Processing the audio data may involve applying a decorrelation filter to a portion of the audio data to produce filtered audio data, estimating a gain to be applied to the filtered audio data, applying the gain to the filtered audio data and mixing the filtered audio data with a portion of the received audio data. The estimating process may involve matching a power of the filtered audio data with a power of the received audio data. The logic system may include a bank of duckers configured to perform the processes of estimating and applying the gain.

Some aspects of this disclosure may be implemented in a non-transitory medium having software stored thereon. The software may include instructions to control an apparatus for receiving audio data corresponding to a plurality of audio channels and for determining audio characteristics of the audio data. In some implementations, the audio characteristics may include transient information. The software may include instructions to controlling an apparatus for determining an amount of decorrelation for the audio data based, at least in part, on the audio characteristics and for processing the audio data according to a determined amount of decorrelation.

In some instances, no explicit transient information may be received with the audio data. The process of determining transient information may involve detecting a soft transient event. The process of determining transient information may involve evaluating at least one of a likelihood or a severity of a transient event. The process of determining transient information may involve evaluating a temporal power variation in the audio data.

However, in some implementations determining the audio characteristics may involve receiving explicit transient information with the audio data. The explicit transient information may include a transient control value corresponding to a definite transient event, a transient control value corresponding to a definite non-transient event and/or an intermediate transient control value. If the explicit transient information indicates a transient event, processing the audio data may involve temporarily halting or slowing a decorrelation process.

If the explicit transient information includes a transient control value corresponding to a definite non-transient event or an intermediate transient value, the process of determining transient information may involve detecting a soft transient event. The determined transient information may be a determined transient control value corresponding to the soft transient event. The process of determining transient information may involve combining the determined transient control value with the received transient control value to obtain a new transient control value. The process of combining the determined transient control value and the received transient control value may involve determining the maximum of the determined transient control value and the received transient control value.

The process of detecting a soft transient event may involve evaluating at least one of a likelihood or a severity of a transient event. The process of detecting a soft transient event may involve detecting a temporal power variation of the audio data.

The software may include instructions for controlling the apparatus to apply a decorrelation filter to a portion of the audio data to produce filtered audio data and to mix the filtered audio data with a portion of the received audio data according to a mixing ratio. The process of determining the amount of decorrelation may involve modifying the mixing ratio based, at least in part, on the transient information. The process of determining an amount of decorrelation for the audio data may involve reducing an amount of decorrelation in response to detecting the soft transient event.

Processing the audio data may involve applying a decorrelation filter to a portion of the audio data, to produce filtered audio data, and mixing the filtered audio data with a portion of the received audio data according to a mixing ratio. The process of reducing the amount of decorrelation may involve modifying the mixing ratio.

Processing the audio data may involve applying a decorrelation filter to a portion of the audio data to produce filtered audio data, estimating a gain to be applied to the filtered audio data, applying the gain to the filtered audio data and mixing the filtered audio data with a portion of the received audio data. The estimating process may involve matching a power of the filtered audio data with a power of the received audio data.

Some methods may involve receiving audio data corresponding to a plurality of audio channels and determining audio characteristics of the audio data. The audio characteristics may include transient information. The transient information may include an intermediate transient control value indicating a transient value between a definite transient event and a definite non-transient event. Such methods also may involve forming encoded audio data frames that include encoded transient information.

The encoded transient information may include one or more control flags. The method may involve coupling at least a portion of two or more channels of the audio data into at least one coupling channel. The control flags may include at least one of a channel block switch flag, a channel out-of-coupling flag or a coupling-in-use flag. The method may involve determining a combination of one or more of the control flags to form encoded transient information that indicates at least one of a definite transient event, a definite non-transient event, a likelihood of a transient event or a severity of a transient event.

The process of determining transient information may involve evaluating at least one of a likelihood or a severity of a transient event. The encoded transient information may indicate at least one of a definite transient event, a definite non-transient event, the likelihood of a transient event or the severity of a transient event. The process of determining transient information may involve evaluating a temporal power variation in the audio data.

The encoded transient information may include a transient control value corresponding to a transient event. The transient control value may be subject to an exponential decay function. The transient information may indicate that a decorrelation process should be temporarily slowed or halted.

The transient information may indicate that a mixing ratio of a decorrelation process should be modified. For example, the transient information may indicate that an amount of decorrelation in a decorrelation process should be temporarily reduced.

Some methods may involve receiving audio data corresponding to a plurality of audio channels and determining audio characteristics of the audio data. The audio characteristics may include spatial parameter data. The methods may involve determining at least two decorrelation filtering processes for the audio data based, at least in part, on the audio characteristics. The decorrelation filtering processes may cause a specific inter-decorrelation signal coherence ("IDC") between channel-specific decorrelation signals for at least one pair of channels. The decorrelation filtering processes may involve applying a decorrelation filter to at least a portion of the audio data to produce filtered audio data. The channel-specific decorrelation signals may be produced by performing operations on the filtered audio data.

The methods may involve applying the decorrelation filtering processes to at least a portion of the audio data to produce the channel-specific decorrelation signals, determining mixing parameters based, at least in part, on the audio characteristics and mixing the channel-specific decorrelation signals with a direct portion of the audio data according to the mixing parameters. The direct portion may correspond to the portion to which the decorrelation filter is applied.

The method also may involve receiving information regarding a number of output channels. The process of determining at least two decorrelation filtering processes for the audio data may be based, at least in part, on the number of output channels. The receiving process may involve receiving audio data corresponding to N input audio channels. The method may involve determining that the audio data for N input audio channels will be downmixed or upmixed to audio data for K output audio channels and producing decorrelated audio data corresponding to the K output audio channels.

The method may involve downmixing or upmixing the audio data for N input audio channels to audio data for M intermediate audio channels, producing decorrelated audio data for the M intermediate audio channels and downmixing or upmixing the decorrelated audio data for the M intermediate audio channels to decorrelated audio data for K output audio channels. Determining the two decorrelation filtering processes for the audio data may be based, at least in part, on the number M of intermediate audio channels. The decorrelation filtering processes may be determined based, at least in part, on N-to-K, M-to-K or N-to-M mixing equations.

The method also may involve controlling inter-channel coherence ("ICC") between a plurality of audio channel pairs. The process of controlling ICC may involve at least one of receiving an ICC value or determining an ICC value based, at least in part, on the spatial parameter data.

The process of controlling ICC may involve at least one of receiving a set of ICC values or determining the set of ICC values based, at least in part, on the spatial parameter data. The method also may involve determining a set of IDC values based, at least in part, on the set of ICC values and synthesizing a set of channel-specific decorrelation signals that corresponds with the set of IDC values by performing operations on the filtered audio data.

The method also may involve a process of conversion between a first representation of the spatial parameter data and a second representation of the spatial parameter data. The first representation of the spatial parameter data may include a representation of coherence between individual discrete channels and a coupling channel. The second representation of the spatial parameter data may include a representation of coherence between the individual discrete channels.

The process of applying the decorrelation filtering processes to at least a portion of the audio data may involve applying the same decorrelation filter to audio data for a plurality of channels to produce the filtered audio data and multiplying the filtered audio data corresponding to a left channel or a right channel by −1. The method also may involve reversing a polarity of filtered audio data corresponding to a left surround channel with reference to the filtered audio data corresponding to the left channel and reversing a polarity of filtered audio data corresponding to a right surround channel with reference to the filtered audio data corresponding to the right channel.

The process of applying the decorrelation filtering processes to at least a portion of the audio data may involve applying a first decorrelation filter to audio data for a first and second channel to produce first channel filtered data and second channel filtered data and applying a second decorrelation filter to audio data for a third and fourth channel to produce third channel filtered data and fourth channel filtered data. The first channel may be a left channel, the second channel may be a right channel, the third channel may be a left surround channel and the fourth channel may be a right surround channel. The method also may involve reversing a polarity of the first channel filtered data relative to the second channel filtered data and reversing a polarity of the third channel filtered data relative to the fourth channel filtered data. The processes of determining at least two decorrelation filtering processes for the audio data may involve either determining that a different decorrelation filter will be applied to audio data for a center channel or determining that a decorrelation filter will not be applied to the audio data for the center channel.

The method also may involve receiving channel-specific scaling factors and a coupling channel signal corresponding to a plurality of coupled channels. The applying process may involve applying at least one of the decorrelation filtering processes to the coupling channel to generate channel-specific filtered audio data and applying the channel-specific scaling factors to the channel-specific filtered audio data to produce the channel-specific decorrelation signals.

The method also may involve determining decorrelation signal synthesizing parameters based, at least in part, on the spatial parameter data. The decorrelation signal synthesizing parameters may be output-channel-specific decorrelation signal synthesizing parameters. The method also may involve receiving a coupling channel signal corresponding to a plurality of coupled channels and channel-specific scaling factors. At least one of the processes of determining at least two decorrelation filtering processes for the audio data and applying the decorrelation filtering processes to a portion of the audio data may involve generating a set of seed decorrelation signals by applying a set of decorrelation filters to the coupling channel signal, sending the seed decorrelation signals to a synthesizer, applying the output-channel-specific decorrelation signal synthesizing parameters to the seed decorrelation signals received by the synthesizer to produce channel-specific synthesized decorrelation signals, multiplying the channel-specific synthesized decorrelation signals with channel-specific scaling factors appropriate for each channel to produce scaled channel-specific synthesized decorrelation signals and outputting the scaled channel-specific synthesized decorrelation signals to a direct signal and decorrelation signal mixer.

The method also may involve receiving channel-specific scaling factors. At least one of the processes of determining at least two decorrelation filtering processes for the audio data and applying the decorrelation filtering processes to a portion of the audio data may involve: generating a set of channel-specific seed decorrelation signals by applying a set of decorrelation filters to the audio data; sending the channel-specific seed decorrelation signals to a synthesizer; determining a set of channel-pair-specific level adjusting parameters based, at least in part, on the channel-specific scaling factors; applying the output-channel-specific decorrelation signal synthesizing parameters and the channel-pair-specific level adjusting parameters to the channel-specific seed decorrelation signals received by the synthesizer to produce channel-specific synthesized decorrelation signals; and outputting the channel-specific synthesized decorrelation signals to a direct signal and decorrelation signal mixer.

Determining the output-channel-specific decorrelation signal synthesizing parameters may involve determining a set of IDC values based, at least in part, on the spatial parameter data and determining output-channel-specific decorrelation signal synthesizing parameters that correspond with the set of IDC values. The set of IDC values may be determined, at least in part, according to a coherence between individual discrete channels and a coupling channel and a coherence between pairs of individual discrete channels.

The mixing process may involve using a non-hierarchal mixer to combine the channel-specific decorrelation signals with the direct portion of the audio data. Determining the audio characteristics may involve receiving explicit audio characteristic information with the audio data. Determining the audio characteristics may involve determining audio characteristic information based on one or more attributes of the audio data. The spatial parameter data may include a representation of coherence between individual discrete channels and a coupling channel and/or a representation of coherence between pairs of individual discrete channels.

The audio characteristics may include at least one of tonality information or transient information.

Determining the mixing parameters may be based, at least in part, on the spatial parameter data. The method also may involve providing the mixing parameters to a direct signal and decorrelation signal mixer. The mixing parameters may be output-channel-specific mixing parameters. The method also may involve determining modified output-channel-specific mixing parameters based, at least in part, on the output-channel-specific mixing parameters and transient control information.

According to some implementations, an apparatus may include an interface and a logic system configured for receiving audio data corresponding to a plurality of audio channels and determining audio characteristics of the audio data. The audio characteristics may include spatial parameter data. The logic system may be configured for determining at least two decorrelation filtering processes for the audio data based, at least in part, on the audio characteristics. The decorrelation filtering processes may cause a specific IDC between channel-specific decorrelation signals for at least one pair of channels. The decorrelation filtering processes may involve applying a decorrelation filter to at least a portion of the audio data to produce filtered audio data. The channel-specific decorrelation signals may be produced by performing operations on the filtered audio data.

The logic system may be configured for: applying the decorrelation filtering processes to at least a portion of the audio data to produce the channel-specific decorrelation signals; determining mixing parameters based, at least in part, on the audio characteristics; and mixing the channel-specific decorrelation signals with a direct portion of the audio data according to the mixing parameters. The direct portion may correspond to the portion to which the decorrelation filter is applied.

The receiving process may involve receiving information regarding a number of output channels. The process of determining at least two decorrelation filtering processes for the audio data may be based, at least in part, on the number of output channels. For example, the receiving process may involve receiving audio data corresponding to N input audio channels and the logic system may be configured for: determining that the audio data for N input audio channels will be downmixed or upmixed to audio data for K output audio channels and producing decorrelated audio data corresponding to the K output audio channels.

The logic system may be further configured for: downmixing or upmixing the audio data for N input audio channels to audio data for M intermediate audio channels; producing decorrelated audio data for the M intermediate audio channels; and downmixing or upmixing the decorrelated audio data for the M intermediate audio channels to decorrelated audio data for K output audio channels.

The decorrelation filtering processes may be determined based, at least in part, on N-to-K mixing equations. Determining the two decorrelation filtering processes for the audio data may be based, at least in part, on the number M of intermediate audio channels. The decorrelation filtering processes may be determined based, at least in part, on M-to-K or N-to-M mixing equations.

The logic system may be further configured for controlling ICC between a plurality of audio channel pairs. The process of controlling ICC may involve at least one of receiving an ICC value or determining an ICC value based, at least in part, on the spatial parameter data. The logic system may be further configured for determining a set of IDC values based, at least in part, on the set of ICC values and synthesizing a set of channel-specific decorrelation signals that corresponds with the set of IDC values by performing operations on the filtered audio data.

The logic system may be further configured for a process of conversion between a first representation of the spatial parameter data and a second representation of the spatial parameter data. The first representation of the spatial parameter data may include a representation of coherence between individual discrete channels and a coupling channel. The second representation of the spatial parameter data may include a representation of coherence between the individual discrete channels.

The process of applying the decorrelation filtering processes to at least a portion of the audio data may involve applying the same decorrelation filter to audio data for a plurality of channels to produce the filtered audio data and multiplying the filtered audio data corresponding to a left channel or a right channel by −1. The logic system may be further configured for reversing a polarity of filtered audio data corresponding to a left surround channel with reference to the filtered audio data corresponding to the left-side channel and reversing a polarity of filtered audio data corresponding to a right surround channel with reference to the filtered audio data corresponding to the right-side channel.

The process of applying the decorrelation filtering processes to at least a portion of the audio data may involve applying a first decorrelation filter to audio data for a first and second channel to produce first channel filtered data and second channel filtered data, and applying a second decorrelation filter to audio data for a third and fourth channel to produce third channel filtered data and fourth channel filtered data. The first channel may be a left-side channel, the second channel may be a right-side channel, the third channel may be a left surround channel and the fourth channel may be a right surround channel.

The logic system may be further configured for reversing a polarity of the first channel filtered data relative to the second channel filtered data and reversing a polarity of the third channel filtered data relative to the fourth channel filtered data. The processes of determining at least two decorrelation filtering processes for the audio data may involve either determining that a different decorrelation filter will be applied to audio data for a center channel or determining that a decorrelation filter will not be applied to the audio data for the center channel.

The logic system may be further configured for receiving, from the interface, channel-specific scaling factors and a coupling channel signal corresponding to a plurality of coupled channels. The applying process may involve applying at least one of the decorrelation filtering processes to the coupling channel to generate channel-specific filtered audio data and applying the channel-specific scaling factors to the channel-specific filtered audio data to produce the channel-specific decorrelation signals.

The logic system may be further configured for determining decorrelation signal synthesizing parameters based, at least in part, on the spatial parameter data. The decorrelation signal synthesizing parameters may be output-channel-specific decorrelation signal synthesizing parameters. The logic system may be further configured for receiving, from the interface, a coupling channel signal corresponding to a plurality of coupled channels and channel-specific scaling factors.

At least one of the processes of determining at least two decorrelation filtering processes for the audio data and applying the decorrelation filtering processes to a portion of the audio data may involve: generating a set of seed decorrelation signals by applying a set of decorrelation filters to the coupling channel signal; sending the seed decorrelation signals to a synthesizer; applying the output-channel-specific decorrelation signal synthesizing parameters to the seed decorrelation signals received by the synthesizer to produce channel-specific synthesized decorrelation signals; multiplying the channel-specific synthesized decorrelation signals with channel-specific scaling factors appropriate for each channel to produce scaled channel-specific synthesized decorrelation signals; and outputting the scaled channel-specific synthesized decorrelation signals to a direct signal and decorrelation signal mixer.

At least one of the processes of determining at least two decorrelation filtering processes for the audio data and applying the decorrelation filtering processes to a portion of the audio data may involve: generating a set of channel-specific seed decorrelation signals by applying a set of channel-specific decorrelation filters to the audio data; sending the channel-specific seed decorrelation signals to a synthesizer; determining channel-pair-specific level adjusting parameters based, at least in part, on the channel-specific scaling factors; applying the output-channel-specific decorrelation signal synthesizing parameters and the channel-pair-specific level adjusting parameters to the channel-specific seed decorrelation signals received by the synthesizer to produce channel-specific synthesized decorrelation signals; and outputting the channel-specific synthesized decorrelation signals to a direct signal and decorrelation signal mixer.

Determining the output-channel-specific decorrelation signal synthesizing parameters may involve determining a set of IDC values based, at least in part, on the spatial parameter data and determining output-channel-specific decorrelation signal synthesizing parameters that correspond with the set of IDC values. The set of IDC values may be determined, at least in part, according to a coherence between individual discrete channels and a coupling channel and a coherence between pairs of individual discrete channels.

The mixing process may involve using a non-hierarchal mixer to combine the channel-specific decorrelation signals with the direct portion of the audio data. Determining the audio characteristics may involve receiving explicit audio characteristic information with the audio data. Determining the audio characteristics may involve determining audio characteristic information based on one or more attributes of the audio data. The audio characteristics may include tonality information and/or transient information.

The spatial parameter data may include a representation of coherence between individual discrete channels and a coupling channel and/or a representation of coherence between pairs of individual discrete channels. Determining the mixing parameters may be based, at least in part, on the spatial parameter data.

The logic system may be further configured for providing the mixing parameters to a direct signal and decorrelation signal mixer. The mixing parameters may be output-channel-specific mixing parameters. The logic system may be further configured for determining modified output-channel-specific mixing parameters based, at least in part, on the output-channel-specific mixing parameters and transient control information.

The apparatus may include a memory device. The interface may be an interface between the logic system and the memory device. However, the interface may be a network interface.

Some aspects of this disclosure may be implemented in a non-transitory medium having software stored thereon. The software may include instructions to control an apparatus for receiving audio data corresponding to a plurality of audio channels and for determining audio characteristics of the audio data. The audio characteristics may include spatial parameter data. The software may include instructions to control the apparatus for determining at least two decorrelation filtering processes for the audio data based, at least in part, on the audio characteristics. The decorrelation filtering processes may cause a specific IDC between channel-specific decorrelation signals for at least one pair of channels. The decorrelation filtering processes may involve applying a decorrelation filter to at least a portion of the audio data to produce filtered audio data. The channel-specific decorrelation signals may be produced by performing operations on the filtered audio data The software may include instructions to control the apparatus for applying the decorrelation filtering processes to at least a portion of the audio data to produce the channel-specific decorrelation signals; determining mixing parameters based, at least in part, on the audio characteristics; and mixing the channel-specific decorrelation signals with a direct portion of the audio data according to the mixing parameters. The direct portion may correspond to the portion to which the decorrelation filter is applied.

The software may include instructions for controlling the apparatus to receive information regarding a number of output channels. The process of determining at least two decorrelation filtering processes for the audio data may be based, at least in part, on the number of output channels. For example, the receiving process may involve receiving audio data corresponding to N input audio channels. The software may include instructions for controlling the apparatus to determine that the audio data for N input audio channels will be downmixed or upmixed to audio data for K output audio channels and to produce decorrelated audio data corresponding to the K output audio channels.

The software may include instructions for controlling the apparatus to: downmix or upmix the audio data for N input audio channels to audio data for M intermediate audio channels; produce decorrelated audio data for the M intermediate audio channels; and downmix or upmix the decorrelated audio data for the M intermediate audio channels to decorrelated audio data for K output audio channels.

Determining the two decorrelation filtering processes for the audio data may be based, at least in part, on the number M of intermediate audio channels. The decorrelation filtering processes may be determined based, at least in part, on N-to-K, M-to-K or N-to-M mixing equations.

The software may include instructions for controlling the apparatus to perform a process of controlling ICC between a plurality of audio channel pairs. The process of controlling ICC may involve receiving an ICC value and/or determining an ICC value based, at least in part, on the spatial parameter data. The process of controlling ICC may involve at least one of receiving a set of ICC values or determining the set of ICC values based, at least in part, on the spatial parameter data. The software may include instructions for controlling the apparatus to perform processes of determining a set of IDC values based, at least in part, on the set of ICC values and synthesizing a set of channel-specific decorrelation signals that corresponds with the set of IDC values by performing operations on the filtered audio data.

The process of applying the decorrelation filtering processes to at least a portion of the audio data may involve applying the same decorrelation filter to audio data for a plurality of channels to produce the filtered audio data and multiplying the filtered audio data corresponding to a left channel or a right channel by −1. The software may include instructions for controlling the apparatus to perform processes of reversing a polarity of filtered audio data corresponding to a left surround channel with reference to the filtered audio data corresponding to the left-side channel and reversing a polarity of filtered audio data corresponding to a right surround channel with reference to the filtered audio data corresponding to the right-side channel.

The process of applying the decorrelation filter to a portion of the audio data may involve applying a first decorrelation filter to audio data for a first and second channel to produce first channel filtered data and second channel filtered data and applying a second decorrelation filter to audio data for a third and fourth channel to produce third channel filtered data and fourth channel filtered data. The first channel may be a left-side channel, the second channel may be a right-side channel, the third channel may be a left surround channel and the fourth channel may be a right surround channel.

The software may include instructions for controlling the apparatus to perform processes of reversing a polarity of the first channel filtered data relative to the second channel filtered data and reversing a polarity of the third channel filtered data relative to the fourth channel filtered data. The processes of determining at least two decorrelation filtering processes for the audio data may involve either determining that a different decorrelation filter will be applied to audio data for a center channel or determining that a decorrelation filter will not be applied to the audio data for the center channel.

The software may include instructions for controlling the apparatus to receive channel-specific scaling factors and a coupling channel signal corresponding to a plurality of coupled channels. The applying process may involve applying at least one of the decorrelation filtering processes to the coupling channel to generate channel-specific filtered audio data and applying the channel-specific scaling factors to the channel-specific filtered audio data to produce the channel-specific decorrelation signals.

The software may include instructions for controlling the apparatus to determine decorrelation signal synthesizing parameters based, at least in part, on the spatial parameter data. The decorrelation signal synthesizing parameters may be output-channel-specific decorrelation signal synthesizing parameters. The software may include instructions for controlling the apparatus to receive a coupling channel signal corresponding to a plurality of coupled channels and channel-specific scaling factors. At least one of the processes of determining at least two decorrelation filtering processes for the audio data and applying the decorrelation filtering processes to a portion of the audio data may involve: generating a set of seed decorrelation signals by applying a set of decorrelation filters to the coupling channel signal; sending the seed decorrelation signals to a synthesizer; applying the output-channel-specific decorrelation signal synthesizing parameters to the seed decorrelation signals received by the synthesizer to produce channel-specific synthesized decorrelation signals; multiplying the channel-specific synthesized decorrelation signals with channel-specific scaling factors appropriate for each channel to produce scaled channel-specific synthesized decorrelation signals; and outputting the scaled channel-specific synthesized decorrelation signals to a direct signal and decorrelation signal mixer.

The software may include instructions for controlling the apparatus to receive a coupling channel signal corresponding to a plurality of coupled channels and channel-specific scaling factors. At least one of the processes of determining at least two decorrelation filtering processes for the audio data and applying the decorrelation filtering processes to a portion of the audio data may involve: generating a set of channel-specific seed decorrelation signals by applying a set of channel-specific decorrelation filters to the audio data; sending the channel-specific seed decorrelation signals to a synthesizer; determining channel-pair-specific level adjusting parameters based, at least in part, on the channel-specific scaling factors; applying the output-channel-specific decorrelation signal synthesizing parameters and the channel-pair-specific level adjusting parameters to the channel-specific seed decorrelation signals received by the synthesizer to produce channel-specific synthesized decorrelation signals; and outputting the channel-specific synthesized decorrelation signals to a direct signal and decorrelation signal mixer.

Determining the output-channel-specific decorrelation signal synthesizing parameters may involve determining a set of IDC values based, at least in part, on the spatial parameter data and determining output-channel-specific decorrelation signal synthesizing parameters that correspond with the set of IDC values. The set of IDC values may be determined, at least in part, according to a coherence between individual discrete channels and a coupling channel and a coherence between pairs of individual discrete channels.

In some implementations, a method may involve: receiving audio data comprising a first set of frequency coefficients and a second set of frequency coefficients; estimating, based on at least part on the first set of frequency coefficients, spatial parameters for at least part of the second set of frequency coefficients; and applying the estimated spatial parameters to the second set of frequency coefficients to generate a modified second set of frequency coefficients. The first set of frequency coefficients may correspond to a first frequency range and the second set of frequency coefficients may correspond to a second frequency range. The first frequency range may be below the second frequency range.

The audio data may include data corresponding to individual channels and a coupled channel. The first frequency range may correspond to an individual channel frequency range and the second frequency range may correspond to a coupled channel frequency range. The applying process may involve applying the estimated spatial parameters on a per-channel basis.

The audio data may include frequency coefficients in the first frequency range for two or more channels. The estimating process may involve calculating combined frequency coefficients of a composite coupling channel based on frequency coefficients of the two or more channels and computing, for at least a first channel, cross-correlation coefficients between frequency coefficients of the first channel and the combined frequency coefficients. The combined frequency coefficients may correspond to the first frequency range.

The cross-correlation coefficients may be normalized cross-correlation coefficients. The first set of frequency coefficients may include audio data for a plurality of channels. The estimating process may involve estimating normalized cross-correlation coefficients for multiple channels of the plurality of channels. The estimating process may involve dividing at least part of the first frequency range into first frequency range bands and computing a normalized cross-correlation coefficient for each first frequency range band.

In some implementations, the estimating process may involve averaging the normalized cross-correlation coefficients across all of the first frequency range bands of a channel and applying a scaling factor to the average of the normalized cross-correlation coefficients to obtain the estimated spatial parameters for the channel. The process of averaging the normalized cross-correlation coefficients may involve averaging across a time segment of a channel. The scaling factor may decrease with increasing frequency.

The method may involve the addition of noise to model the variance of the estimated spatial parameters. The variance of added noise may be based, at least in part, on the variance in the normalized cross-correlation coefficients. The variance of added noise may be dependent, at least in part, on a prediction of the spatial parameter across bands, the dependence of the variance on the prediction being based on empirical data.

The method may involve receiving or determining tonality information regarding the second set of frequency coefficients. The applied noise may vary according to the tonality information.

The method may involve measuring per-band energy ratios between bands of the first set of frequency coefficients and bands of the second set of frequency coefficients. The estimated spatial parameters may vary according to the per-band energy ratios. In some implementations, the estimated spatial parameters may vary according to temporal changes of input audio signals. The estimating process may involve operations only on real-valued frequency coefficients.

The process of applying the estimated spatial parameters to the second set of frequency coefficients may be part of a decorrelation process. In some implementations, the decorrelation process may involve generating a reverb signal or a decorrelation signal and applying it to the second set of frequency coefficients. The decorrelation process may involve applying a decorrelation algorithm that operates entirely on real-valued coefficients. The decorrelation process may involve selective or signal-adaptive decorrelation of specific channels. The decorrelation process may involve selective or signal-adaptive decorrelation of specific frequency bands. In some implementations, the first and second sets of frequency coefficients may be results of applying a modified discrete sine transform, a modified discrete cosine transform or a lapped orthogonal transform to audio data in a time domain.

The estimating process may be based, at least in part, on estimation theory. For example, the estimating process may be based, at least in part, on at least one of a maximum likelihood method, a Bayes estimator, a method of moments estimator, a minimum mean squared error estimator or a minimum variance unbiased estimator.

In some implementations, the audio data may be received in a bitstream encoded according to a legacy encoding process. The legacy encoding process may, for example, be a process of the AC-3 audio codec or the Enhanced AC-3 audio codec. Applying the spatial parameters may yield a more spatially accurate audio reproduction than that obtained by decoding the bitstream according to a legacy decoding process that corresponds with the legacy encoding process.

Some implementations involve apparatus that includes an interface and a logic system. The logic system may be configured for: receiving audio data comprising a first set of frequency coefficients and a second set of frequency coefficients; estimating, based on at least part of the first set of frequency coefficients, spatial parameters for at least part of the second set of frequency coefficients; and applying the estimated spatial parameters to the second set of frequency coefficients to generate a modified second set of frequency coefficients.

The apparatus may include a memory device. The interface may be an interface between the logic system and the memory device. However, the interface may be a network interface.

The first set of frequency coefficients may correspond to a first frequency range and the second set of frequency coefficients may correspond to a second frequency range. The first frequency range may be below the second frequency range. The audio data may include data corresponding to individual channels and a coupled channel. The first frequency range may correspond to an individual channel frequency range and the second frequency range may correspond to a coupled channel frequency range.

The applying process may involve applying the estimated spatial parameters on a per-channel basis. The audio data may include frequency coefficients in the first frequency range for two or more channels. The estimating process may involve calculating combined frequency coefficients of a composite coupling channel based on frequency coefficients of the two or more channels and computing, for at least a first channel, cross-correlation coefficients between frequency coefficients of the first channel and the combined frequency coefficients.

The combined frequency coefficients may correspond to the first frequency range. The cross-correlation coefficients may be normalized cross-correlation coefficients. The first set of frequency coefficients may include audio data for a plurality of channels. The estimating process may involve estimating normalized cross-correlation coefficients multiple channels of the plurality of channels.

The estimating process may involve dividing the second frequency range into second frequency range bands and computing a normalized cross-correlation coefficient for each second frequency range band. The estimating process may involve dividing the first frequency range into first frequency range bands, averaging the normalized cross-correlation coefficients across all of the first frequency range bands and applying a scaling factor to the average of the normalized cross-correlation coefficients to obtain the estimated spatial parameters.

The process of averaging the normalized cross-correlation coefficients may involve averaging across a time segment of a channel. The logic system may be further configured for the addition of noise to the modified second set of frequency coefficients. The addition of noise may be added to model a variance of the estimated spatial parameters. The variance of noise added by the logic system may be based, at least in part, on a variance in the normalized cross-correlation coefficients. The logic system may be further configured for receiving or determining tonality information regarding the second set of frequency coefficients and varying the applied noise according to the tonality information.

In some implementations, the audio data may be received in a bitstream encoded according to a legacy encoding process. For example, the legacy encoding process may be a process of the AC-3 audio codec or the Enhanced AC-3 audio codec.

Some aspects of this disclosure may be implemented in a non-transitory medium having software stored thereon. The software may include instructions to control an apparatus for: receiving audio data comprising a first set of frequency coefficients and a second set of frequency coefficients; estimating, based on at least part of the first set of frequency coefficients, spatial parameters for at least part of the second set of frequency coefficients; and applying the estimated spatial parameters to the second set of frequency coefficients to generate a modified second set of frequency coefficients.

The first set of frequency coefficients may correspond to a first frequency range and the second set of frequency coefficients may correspond to a second frequency range. The audio data may include data corresponding to individual channels and a coupled channel. The first frequency range may correspond to an individual channel frequency range and the second frequency range may correspond to a coupled channel frequency range. The first frequency range may be below the second frequency range.

The applying process may involve applying the estimated spatial parameters on a per-channel basis. The audio data may include frequency coefficients in the first frequency range for two or more channels. The estimating process may involve calculating combined frequency coefficients of a composite coupling channel based on frequency coefficients of the two or more channels and computing, for at least a first channel, cross-correlation coefficients between frequency coefficients of the first channel and the combined frequency coefficients.

The combined frequency coefficients may correspond to the first frequency range. The cross-correlation coefficients may be normalized cross-correlation coefficients. The first set of frequency coefficients may include audio data for a plurality of channels. The estimating process may involve estimating normalized cross-correlation coefficients multiple channels of the plurality of channels. The estimating process may involve dividing the second frequency range into second frequency range bands and computing a normalized cross-correlation coefficient for each second frequency range band.

The estimating process may involve: dividing the first frequency range into first frequency range bands; averaging the normalized cross-correlation coefficients across all of the first frequency range bands; and applying a scaling factor to the average of the normalized cross-correlation coefficients to obtain the estimated spatial parameters. The process of averaging the normalized cross-correlation coefficients may involve averaging across a time segment of a channel.

The software also may include instructions for controlling the decoding apparatus to add noise to the modified second set of frequency coefficients in order to model a variance of the estimated spatial parameters. A variance of added noise may be based, at least in part, on a variance in the normalized cross-correlation coefficients. The software also may include instructions for controlling the decoding apparatus to receive or determine tonality information regarding the second set of frequency coefficients. The applied noise may vary according to the tonality information.

In some implementations, the audio data may be received in a bitstream encoded according to a legacy encoding process. For example, the legacy encoding process may be a process of the AC-3 audio codec or the Enhanced AC-3 audio codec.

According to some implementations, a method, may involve: receiving audio data corresponding to a plurality of audio channels; determining audio characteristics of the audio data; determining decorrelation filter parameters for the audio data based, at least in part, on the audio characteristics; forming a decorrelation filter according to the decorrelation filter parameters; and applying the decorrelation filter to at least some of the audio data. For example, the audio characteristics may include tonality information and/or transient information.

Determining the audio characteristics may involve receiving explicit tonality information or transient information with the audio data. Determining the audio characteristics may involve determining tonality information or transient information based on one or more attributes of the audio data.

In some implementations, the decorrelation filter may include a linear filter with at least one delay element. The decorrelation filter may include an all-pass filter.

The decorrelation filter parameters may include dithering parameters or randomly selected pole locations for at least one pole of the all-pass filter. For example, the dithering parameters or pole locations may involve a maximum stride value for pole movement. The maximum stride value may be substantially zero for highly tonal signals of the audio data. The dithering parameters or pole locations may be bounded by constraint areas within which pole movements are constrained. In some implementations, the constraint areas may be circles or annuli. In some implementations, the constraint areas may be fixed. In some implementations, different channels of the audio data may share the same constraint areas.

According to some implementations, the poles may be dithered independently for each channel. In some implementations, motions of the poles may not be bounded by constraint areas. In some implementations, the poles may maintain a substantially consistent spatial or angular relationship relative to one another. According to some implementations, a distance from a pole to a center of a z-plane circle may be a function of audio data frequency.

In some implementations, an apparatus may include an interface and a logic system. In some implementations, the logic system may include a general purpose single- or multi-chip processor, a digital signal processor (DSP), an application specific integrated circuit (ASIC), a field programmable gate array (FPGA) or other programmable logic device, discrete gate or transistor logic and/or discrete hardware components.

The logic system may be configured for receiving, from the interface, audio data corresponding to a plurality of audio channels and determining audio characteristics of the audio data. In some implementations, the audio characteristics may include tonality information and/or transient information. The logic system may be configured for determining decorrelation filter parameters for the audio data based, at least in part, on the audio characteristics, forming a decorrelation filter according to the decorrelation filter parameters and applying the decorrelation filter to at least some of the audio data.

The decorrelation filter may include a linear filter with at least one delay element. The decorrelation filter parameters may include dithering parameters or randomly selected pole locations for at least one pole of the decorrelation filter. The dithering parameters or pole locations may be bounded by constraint areas within which pole movements are constrained. The dithering parameters or pole locations may be determined with reference to a maximum stride value for pole movement. The maximum stride value may be substantially zero for highly tonal signals of the audio data.

The apparatus may include a memory device. The interface may be an interface between the logic system and the memory device. However, the interface may be a network interface.

Some aspects of this disclosure may be implemented in a non-transitory medium having software stored thereon. The software may include instructions for controlling an apparatus to: receive audio data corresponding to a plurality of audio channels; determine audio characteristics of the audio data, the audio characteristics comprising at least one of tonality information or transient information; determine decorrelation filter parameters for the audio data based, at least in part, on the audio characteristics; form a decorrelation filter according to the decorrelation filter parameters; and apply the decorrelation filter to at least some of the audio data. The decorrelation filter may include a linear filter with at least one delay element.

The decorrelation filter parameters may include dithering parameters or randomly selected pole locations for at least one pole of the decorrelation filter. The dithering parameters or pole locations may be bounded by constraint areas within which pole movements are constrained. The dithering parameters or pole locations may be determined with reference to a maximum stride value for pole movement. The maximum stride value may be substantially zero for highly tonal signals of the audio data.

According to some implementations, a method, may involve: receiving audio data corresponding to a plurality of audio channels; determining decorrelation filter control information corresponding to a maximum pole displacement of a decorrelation filter; determining decorrelation filter parameters for the audio data based, at least in part, on the decorrelation filter control information; forming the decorrelation filter according to the decorrelation filter parameters; and applying the decorrelation filter to at least some of the audio data.

The audio data may be in the time domain or the frequency domain. Determining the decorrelation filter control information may involve receiving an express indication of the maximum pole displacement.

Determining the decorrelation filter control information may involve determining audio characteristic information and determining the maximum pole displacement based, at least in part, on the audio characteristic information. In some implementations, the audio characteristic information may include at least one of tonality information or transient information.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. Although the examples provided in this application are primarily described in terms of the AC-3 audio codec, and the Enhanced AC-3 audio codec (also known as E-AC-3), the concepts provided herein apply to other audio codecs, including but not limited to MPEG-2 AAC and MPEG-4 AAC. Moreover, the described implementations may be embodied in various audio processing devices, including but not limited to encoders and/or decoders, which may be included in mobile telephones, smartphones, desktop computers, hand-held or portable computers, netbooks, notebooks, smartbooks, tablets, stereo systems, televisions, DVD players, digital recording devices and a variety of other devices. Accordingly, the teachings of this disclosure are not intended to be limited to the implementations shown in the figures and/or described herein, but instead have wide applicability.

Some audio codecs, including the AC-3 and E-AC-3 audio codecs (proprietary implementations of which are licensed as "Dolby Digital" and "Dolby Digital Plus"), employ some form of channel coupling to exploit redundancies between channels, encode data more efficiently and reduce the coding bit-rate. For example, with the AC-3 and E-AC-3 codecs, in a coupling channel frequency range beyond a specific "coupling-begin frequency," the modified discrete cosine transform (MDCT) coefficients of the discrete channels (also referred to herein as "individual channels") are downmixed to a mono channel, which may be referred to herein as a "composite channel" or a "coupling channel." Some codecs may form two or more coupling channels.

The AC-3 and E-AC-3 decoders upmix the mono signal of the coupling channel into the discrete channels using scale factors based on coupling coordinates sent in the bitstream. In this manner, the decoder restores a high frequency envelope, but not the phase, of the audio data in the coupling channel frequency range of each channel.

Figure 1B:
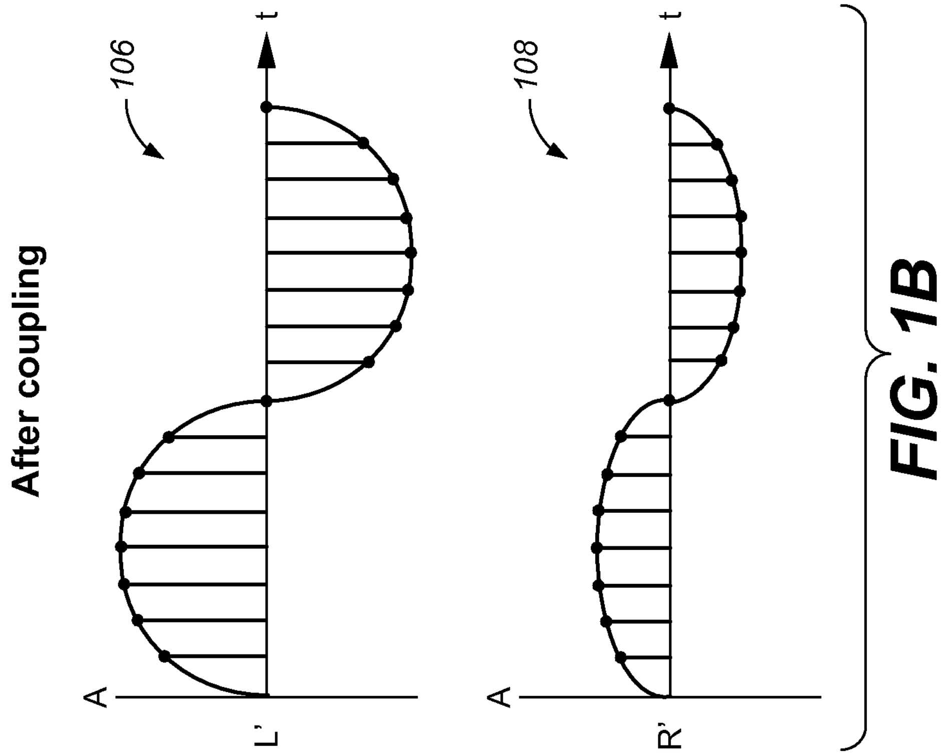
FIGS. 1A and 1B are graphs that show examples of channel coupling during an audio encoding process.
Figure 1A:
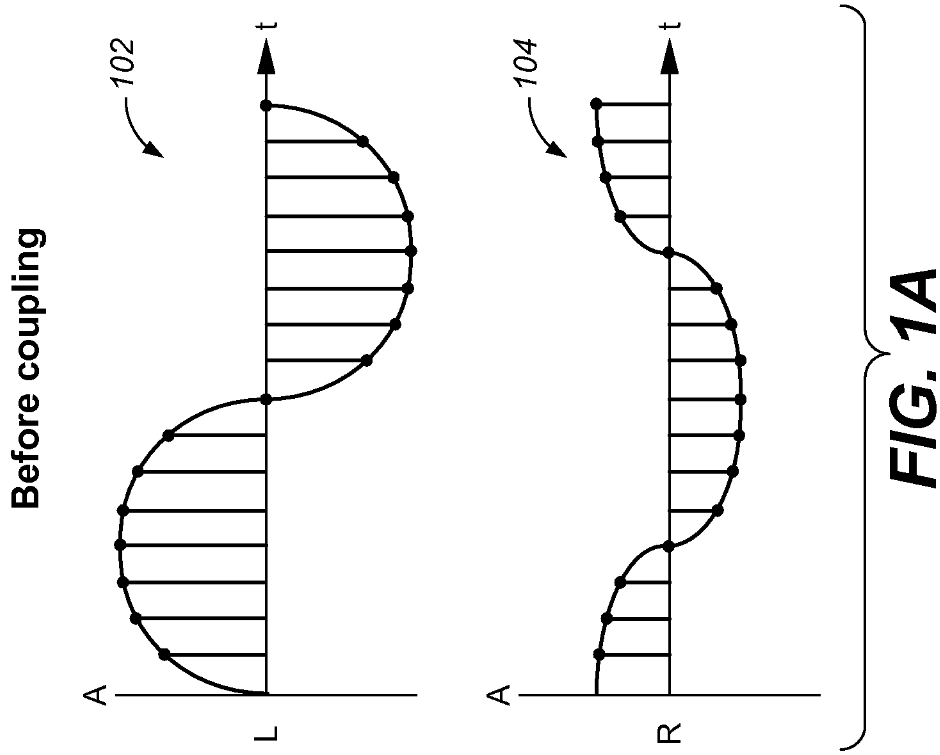

FIGS. 1A and 1B are graphs that show examples of channel coupling during an audio encoding process. Graph 102 of FIG. 1A indicates an audio signal that corresponds to a left channel before channel coupling. Graph 104 indicates an audio signal that corresponds to a right channel before channel coupling. FIG. 1B shows the left and right channels after encoding, including channel coupling, and decoding. In this simplified example, graph 106 indicates that the audio data for the left channel is substantially unchanged, whereas graph 108 indicates that the audio data for the right channel is now in phase with the audio data for the left channel.

As shown in FIGS. 1A and 1B, the decoded signal beyond the coupling-begin frequency may be coherent between channels. Accordingly, the decoded signal beyond the coupling-begin frequency may sound spatially collapsed, as compared to the original signal. When the decoded channels are downmixed, for instance on binaural rendition via headphone virtualization or playback over stereo loudspeakers, the coupled channels may add up coherently. This may lead to a timbre mismatch when compared to the original reference signal. The negative effects of channel coupling may be particularly evident when the decoded signal is binaurally rendered over headphones.

Various implementations described herein may mitigate these effects, at least in part. Some such implementations involve novel audio encoding and/or decoding tools. Such implementations may be configured to restore phase diversity of the output channels in frequency regions encoded by channel coupling. In accordance with various implementations, a decorrelated signal may be synthesized from the decoded spectral coefficients in the coupling channel frequency range of each output channel.

Figure 2A:
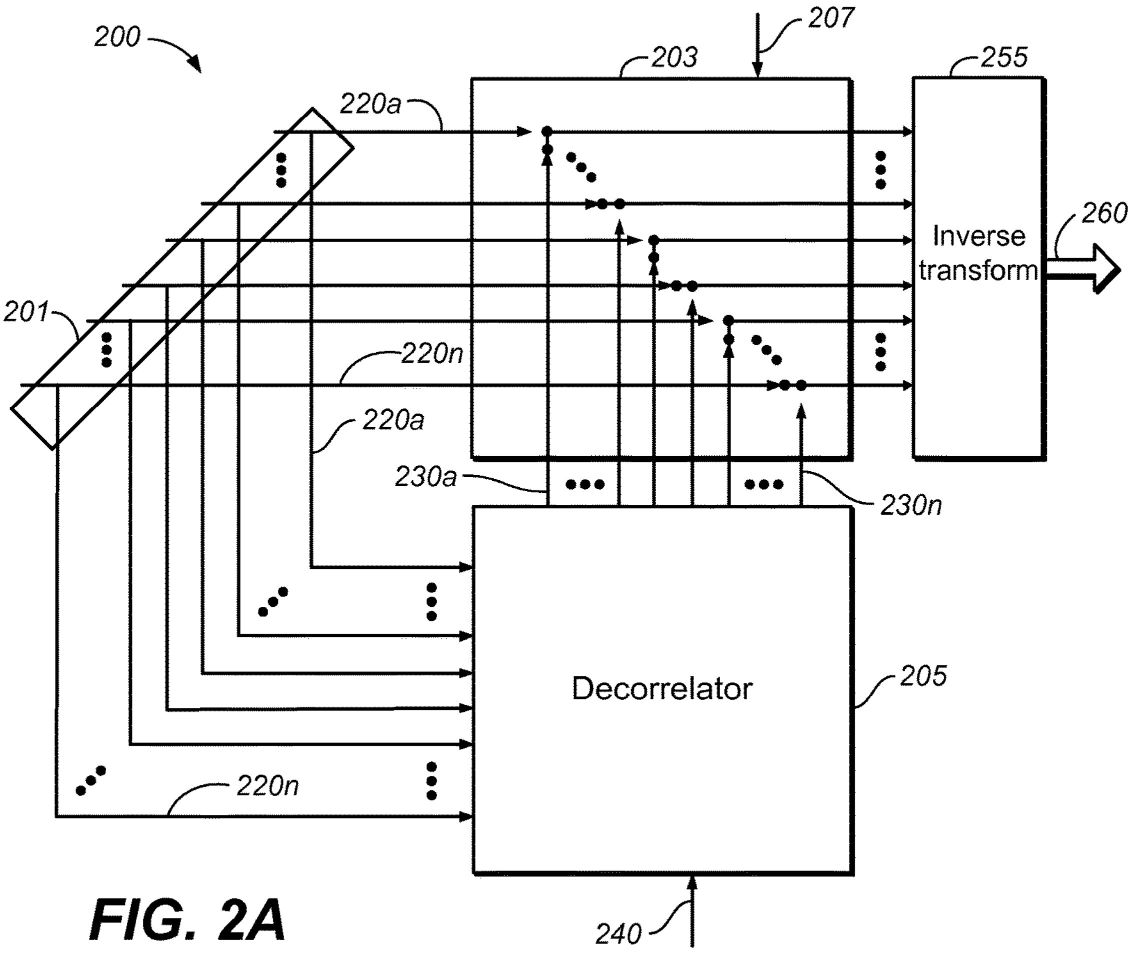
FIG. 2A is a block diagram that illustrates elements of an audio processing system.

However, many other types of audio processing devices and methods are described herein. FIG. 2A is a block diagram that illustrates elements of an audio processing system. In this implementation, the audio processing system 200 includes a buffer 201, a switch 203, a decorrelator 205 and an inverse transform module 255. The switch 203 may, for example, be a cross-point switch. The buffer 201 receives audio data elements 220*a* through 220*n*, forwards audio data elements 220*a* through 220*n* to the switch 203 and sends copies of the audio data elements 220*a* through 220*n* to the decorrelator 205.

In this example, the audio data elements 220*a* through 220*n* correspond to a plurality of audio channels 1 through N. Here, the audio data elements 220*a* through 220*n* include a frequency domain representations corresponding to filter-bank coefficients of an audio encoding or processing system, which may be a legacy audio encoding or processing system. However, in alternative implementations, the audio data elements 220*a* through 220*n* may correspond to a plurality of frequency bands 1 through N.

In this implementation, all of the audio data elements 220*a* through 220*n* are received by both the switch 203 and the decorrelator 205. Here, all of the audio data elements 220*a* through 220*n* are processed by the decorrelator 205 to produce decorrelated audio data elements 230*a* through 230*n*. Moreover, all of the decorrelated audio data elements 230*a* through 230*n* are received by the switch 203.

However, not all of the decorrelated audio data elements 230*a* through 230*n* are received by the inverse transform module 255 and converted to time domain audio data 260. Instead, the switch 203 selects which of the decorrelated audio data elements 230*a* through 230*n* will be received by the inverse transform module 255. In this example the switch 203 selects, according to the channel, which of the audio data elements 230*a* through 230*n* will be received by the inverse transform module 255. Here, for example, the audio data element 230*a* is received by the inverse transform module 255, whereas the audio data element 230*n* is not. Instead, the switch 203 sends the audio data element 220*n*, which has not been processed by the decorrelator 205, to the inverse transform module 255.

In some implementations, the switch 203 may determine whether to send a direct audio data element 220 or a decorrelated audio data element 230 to the inverse transform module 255 according to predetermined settings corresponding to the channels 1 through N. Alternatively, or additionally, the switch 203 may determine whether to send an audio data element 220 or a decorrelated audio data element 230 to the inverse transform module 255 according to channel-specific components of the selection information 207, which may be generated or stored locally, or received with the audio data 220. Accordingly, the audio processing system 200 may provide selective decorrelation of specific audio channels.

Alternatively, or additionally, the switch 203 may determine whether to send a direct audio data element 220 or a decorrelated audio data element 230 to the inverse transform module 255 according to changes in the audio data 220. For example, the switch 203 may determine which, if any, of the decorrelated audio data elements 230 are sent to the inverse transform module 255 according to signal-adaptive components of the selection information 207, which may indicate transients or tonality changes in the audio data 220. In alternative implementations, the switch 203 may receive such signal-adaptive information from the decorrelator 205. In yet other implementations, the switch 203 may be configured to determine changes in the audio data, such as transients or tonality changes. Accordingly, the audio processing system 200 may provide signal-adaptive decorrelation of specific audio channels.

As noted above, in some implementations the audio data elements 220*a* through 220*n* may correspond to a plurality of frequency bands 1 through N. In some such implementations, the switch 203 may determine whether to send an audio data element 220 or a decorrelated audio data element 230 to the inverse transform module 255 according to predetermined settings corresponding to the frequency bands and/or according to received selection information 207. Accordingly, the audio processing system 200 may provide selective decorrelation of specific frequency bands.

Alternatively, or additionally, the switch 203 may determine whether to send a direct audio data element 220 or a decorrelated audio data element 230 to the inverse transform module 255 according to changes in the audio data 220, which may be indicated by the selection information 207 or by information received from the decorrelator 205. In some implementations, the switch 203 may be configured to determine changes in the audio data. Therefore, the audio processing system 200 may provide signal-adaptive decorrelation of specific frequency bands.

Figure 2B:
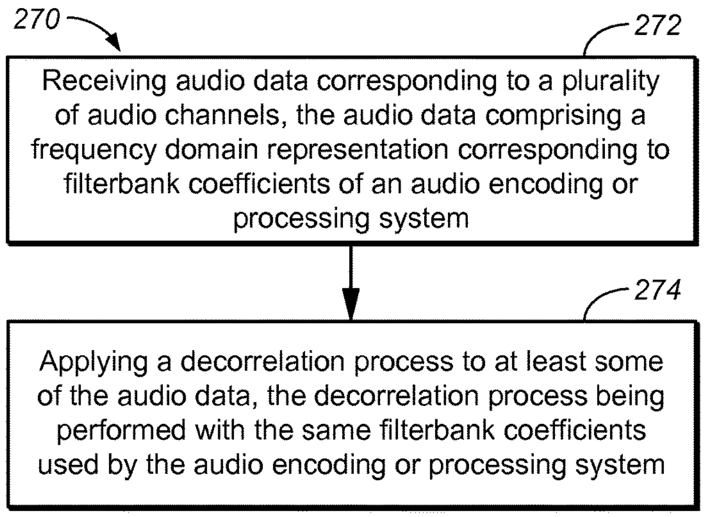
FIG. 2B provides an overview of the operations that may be performed by the audio processing system of FIG. 2A.

FIG. 2B provides an overview of the operations that may be performed by the audio processing system of FIG. 2A. In this example, method 270 begins with a process of receiving audio data corresponding to a plurality of audio channels (block 272). The audio data may include a frequency domain representation corresponding to filterbank coefficients of an audio encoding or processing system. The audio encoding or processing system may, for example, be a legacy audio encoding or processing system such as AC-3 or E-AC-3. Some implementations may involve receiving control mechanism elements in a bitstream produced by the legacy audio encoding or processing system, such as indications of block switching, etc. The decorrelation process may be based, at least in part, on the control mechanism elements. Detailed examples are provided below. In this example, the method 270 also involves applying a decorrelation process to at least some of the audio data (block 274). The decorrelation process may be performed with the same filterbank coefficients used by the audio encoding or processing system.

Referring again to FIG. 2A, the decorrelator 205 may perform various types of decorrelation operations, depending on the particular implementation. Many examples are provided herein. In some implementations, the decorrelation process is performed without converting coefficients of the frequency domain representation of the audio data elements 220 to another frequency domain or time domain representation. The decorrelation process may involve generating reverb signals or decorrelation signals by applying linear filters to at least a portion of the frequency domain representation. In some implementations, the decorrelation process may involve applying a decorrelation algorithm that operates entirely on real-valued coefficients. As used herein, "real-valued" means using only one of a cosine or a sine modulated filterbank.

The decorrelation process may involve applying a decorrelation filter to a portion of the received audio data elements 220*a* through 220*n* to produce filtered audio data elements. The decorrelation process may involve using a non-hierarchal mixer to combine a direct portion of the received audio data (to which no decorrelation filter has been applied) with the filtered audio data according to spatial parameters. For example, a direct portion of the audio data element 220*a* may be mixed with a filtered portion of the audio data element 220*a* in an output-channel-specific manner. Some implementations may include an output-channel-specific combiner (e.g., a linear combiner) of decorrelation or reverb signals. Various examples are described below.

In some implementations, the spatial parameters may be determined by audio processing system 200 pursuant to analysis of the received audio data 220. Alternatively, or additionally, the spatial parameters may be received in a bitstream, along with the audio data 220 as part or all of the decorrelation information 240. In some implementations the decorrelation information 240 may include correlation coefficients between individual discrete channels and a coupling channel, correlation coefficients between individual discrete channels, explicit tonality information and/or transient information. The decorrelation process may involve decorrelating at least a portion of the audio data 220 based, at least in part, on the decorrelation information 240. Some implementations may be configured to use both locally determined and received spatial parameters and/or other decorrelation information. Various examples are described below.

Figure 2C:
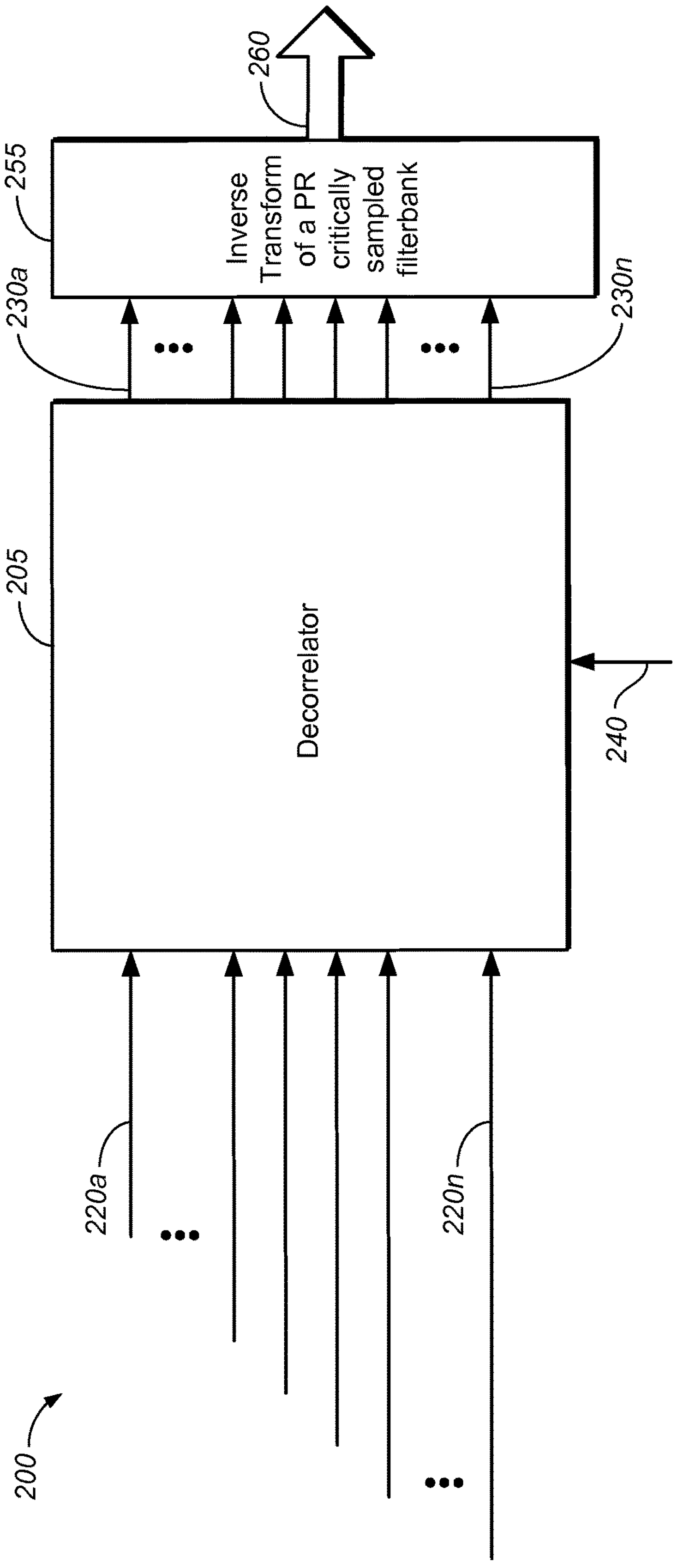
FIG. 2C is a block diagram that shows elements of an alternative audio processing system.

FIG. 2C is a block diagram that shows elements of an alternative audio processing system. In this example, the audio data elements 220*a* through 220*n* include audio data for N audio channels. The audio data elements 220*a* through 220*n* include frequency domain representations corresponding to filterbank coefficients of an audio encoding or processing system. In this implementation, the frequency domain representations are the result of applying a perfect reconstruction, critically-sampled filterbank. For example, the frequency domain representations may be the result of applying a modified discrete sine transform, a modified discrete cosine transform or a lapped orthogonal transform to audio data in a time domain.

The decorrelator 205 applies a decorrelation process to at least a portion of the audio data elements 220*a* through 220*n*. For example, the decorrelation process may involve generating reverb signals or decorrelation signals by applying linear filters to at least a portion of the audio data elements 220*a* through 220*n*. The decorrelation process may be performed, at least in part, according to decorrelation information 240 received by the decorrelator 205. For example, the decorrelation information 240 may be received in a bitstream along with the frequency domain representations of the audio data elements 220*a* through 220*n*. Alternatively, or additionally, at least some decorrelation information may be determined locally, e.g., by the decorrelator 205.

The inverse transform module 255 applies an inverse transform to produce the time domain audio data 260. In this example, the inverse transform module 255 applies an inverse transform equivalent to a perfect reconstruction, critically-sampled filterbank. The perfect reconstruction, critically-sampled filterbank may correspond to that applied to audio data in the time domain (e.g., by an encoding device) to produce the frequency domain representations of the audio data elements 220*a* through 220*n*.

Figure 2D:
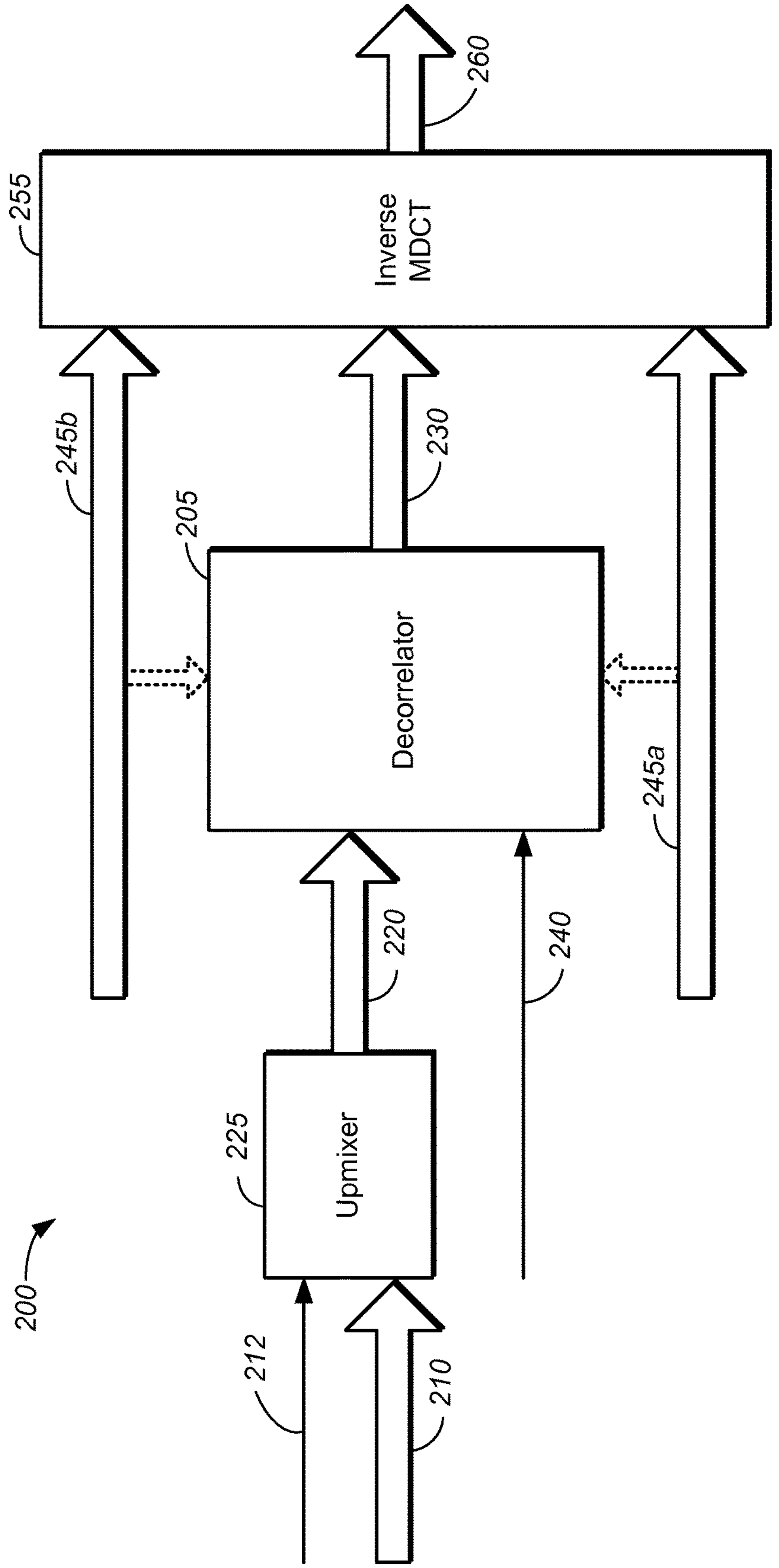
FIG. 2D is a block diagram that shows an example of how a decorrelator may be used in an audio processing system.

FIG. 2D is a block diagram that shows an example of how a decorrelator may be used in an audio processing system. In this example, the audio processing system 200 is a decoder that includes a decorrelator 205. In some implementations, the decoder may be configured to function according to the AC-3 or the E-AC-3 audio codec. However, in some implementations the audio processing system may be configured for processing audio data for other audio codecs. The decorrelator 205 may include various subcomponents, such as those that are described elsewhere herein. In this example, an upmixer 225 receives audio data 210, which includes frequency domain representations of audio data of a coupling channel. The frequency domain representations are MDCT coefficients in this example.

The upmixer 225 also receives coupling coordinates 212 for each channel and coupling channel frequency range. In this implementation, scaling information, in the form of coupling coordinates 212, has been computed in a Dolby Digital or Dolby Digital Plus encoder in an exponent-mantissa form. The upmixer 225 may compute frequency coefficients for each output channel by multiplying the coupling channel frequency coordinates by the coupling coordinates for that channel.

In this implementation, the upmixer 225 outputs decoupled MDCT coefficients of individual channels in the coupling channel frequency range to the decorrelator 205. Accordingly, in this example the audio data 220 that are input to the decorrelator 205 include MDCT coefficients.

In the example shown in FIG. 2D, the decorrelated audio data 230 output by the decorrelator 205 include decorrelated MDCT coefficients. In this example, not all of the audio data received by the audio processing system 200 are also decorrelated by the decorrelator 205. For example, the frequency domain representations of audio data 245*a*, for frequencies below the coupling channel frequency range, as well as the frequency domain representations of audio data 245*b*, for frequencies above the coupling channel frequency range, are not decorrelated by the decorrelator 205. These data, along with the decorrelated MDCT coefficients 230 that are output from the decorrelator 205, are input to an inverse MDCT process 255. In this example, the audio data 245*b* include MDCT coefficients determined by the Spectral Extension tool, an audio bandwidth extension tool of the E-AC-3 audio codec.

In this example, decorrelation information 240 is received by the decorrelator 205. The type of decorrelation information 240 received may vary according to the implementation. In some implementations, the decorrelation information 240 may include explicit, decorrelator-specific control information and/or explicit information that may form the basis of such control information. The decorrelation information 240 may, for example, include spatial parameters such as correlation coefficients between individual discrete channels and a coupling channel and/or correlation coefficients between individual discrete channels. Such explicit decorrelation information 240 also may include explicit tonality information and/or transient information. This information may be used to determine, at least in part, decorrelation filter parameters for the decorrelator 205.

However, in alternative implementations, no such explicit decorrelation information 240 is received by the decorrelator 205. According to some such implementations, the decorrelation information 240 may include information from a bitstream of a legacy audio codec. For example, the decorrelation information 240 may include time segmentation information that is available in a bitstream encoded according to the AC-3 audio codec or the E-AC-3 audio codec. The decorrelation information 240 may include coupling-in-use information, block-switching information, exponent information, exponent strategy information, etc. Such information may have been received by an audio processing system in a bitstream along with audio data 210.

In some implementations, the decorrelator 205 (or another element of the audio processing system 200) may determine spatial parameters, tonality information and/or transient information based on one or more attributes of the audio data. For example, the audio processing system 200 may determine spatial parameters for frequencies in the coupling channel frequency range based on the audio data 245*a* or 245*b*, outside of the coupling channel frequency range. Alternatively, or additionally, the audio processing system 200 may determine tonality information based on information from a bitstream of a legacy audio codec. Some such implementations will be described below.

Figure 2E:
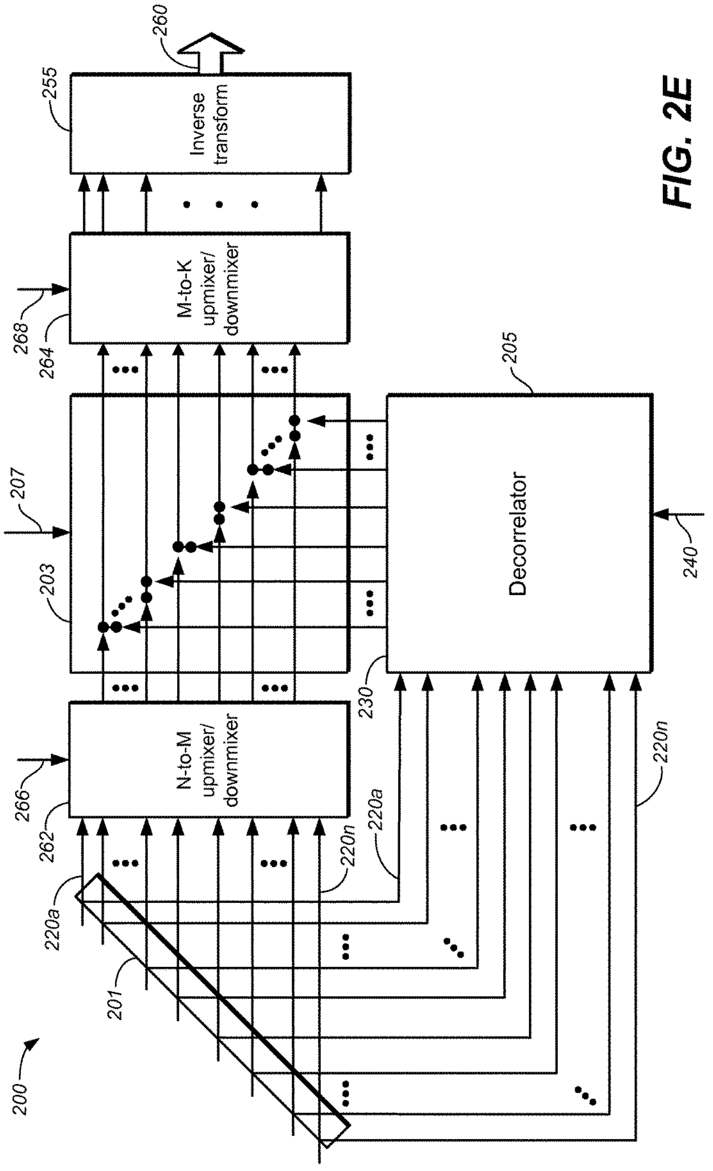
FIG. 2E is a block diagram that illustrates elements of an alternative audio processing system.

FIG. 2E is a block diagram that illustrates elements of an alternative audio processing system. In this implementation, the audio processing system 200 includes an N-to-M upmixer/downmixer 262 and an M-to-K upmixer/downmixer 264. Here, the audio data elements 220*a*-220*n*, which include transform coefficients for N audio channels, are received by the N-to-M upmixer/downmixer 262 and the decorrelator 205.

In this example, the N-to-M upmixer/downmixer 262 may be configured to upmix or downmix the audio data for N channels to audio data for M channels, according to the mixing information 266. However, in some implementations, the N-to-M upmixer/downmixer 262 may be a pass-through element. In such implementations, N=M. The mixing information 266 may include N-to-M mixing equations. The mixing information 266 may, for example, be received by the audio processing system 200 in a bitstream along with the decorrelation information 240, frequency domain representations corresponding to a coupling channel, etc. In this example, the decorrelation information 240 that is received by the decorrelator 205 indicates that the decorrelator 205 should output M channels of the decorrelated audio data 230 to the switch 203.

The switch 203 may determine, according to the selection information 207, whether the direct audio data from the N-to-M upmixer/downmixer 262 or the decorrelated audio data 230 will be forwarded to the M-to-K upmixer/downmixer 264. The M-to-K upmixer/downmixer 264 may be configured to upmix or downmix the audio data for M channels to audio data for K channels, according to the mixing information 268. In such implementations, the mixing information 268 may include M-to-K mixing equations. For implementations in which N=M, the M-to-K upmixer/downmixer 264 may upmix or downmix the audio data for N channels to audio data for K channels according to the mixing information 268. In such implementations, the mixing information 268 may include N-to-K mixing equations. The mixing information 268 may, for example, be received by the audio processing system 200 in a bitstream along with the decorrelation information 240 and other data.

The N-to-M, M-to-K or N-to-K mixing equations may be upmixing or downmixing equations. The N-to-M, M-to-K or N-to-K mixing equations may be a set of linear combination coefficients that map input audio signals to output audio signals. According to some such implementations, the M-to-K mixing equations may be stereo downmixing equations. For example, the M-to-K upmixer/downmixer 264 may be configured to downmix audio data for 4, 5, 6, or more channels to audio data for 2 channels, according to the M-to-K mixing equations in the mixing information 268. In some such implementations, audio data for a left channel ("L"), a center channel ('C") and a left surround channel ("Ls") may be combined, according to the M-to-K mixing equations, into a left stereo output channel Lo. Audio data for a right channel ("R"), the center channel and a right surround channel ("Rs") may be combined, according to the M-to-K mixing equations, into a right stereo output channel Ro. For example, the M-to-K mixing equations may be as follows:

$$Lo=L+0.707C+0.707Ls$$

$$Ro=R+0.707C+0.707Rs$$

Alternatively, the M-to-K mixing equations may be as follows:

$$Lo=L+-3\ \mathrm{dB}*C+att*Ls$$

$$Ro=R+-3\ \mathrm{dB}*C+att*Rs,$$

where att may, for example, represent a value such as −3 dB, −6 dB, −9 dB or zero. For implementations in which N=M, the foregoing equations may be considered N-to-K mixing equations.

In this example, the decorrelation information 240 that is received by the decorrelator 205 indicates that the audio data for M channels will subsequently be upmixed or downmixed to K channels. The decorrelator 205 may be configured to use a different decorrelation process, depending on whether the data for M channels will subsequently be upmixed or downmixed to audio data for K channels. Accordingly, the decorrelator 205 may be configured to determine decorrelation filtering processes based, at least in part, on the M-to-K mixing equations. For example, if the M channels will subsequently be downmixed to K channels, different decorrelation filters may be used for channels that will be combined in the subsequent downmix. According to one such example, if the decorrelation information 240 indicates that audio data for L, R, Ls and Rs channels will be downmixed to 2 channels, one decorrelation filter may be used for both the L and the R channels and another decorrelation filter may be used for both the Ls and Rs channels.

In some implementations, M=K. In such implementations, the M-to-K upmixer/downmixer 264 may be a pass-through element.

However, in other implementations, M>K. In such implementations, the M-to-K upmixer/downmixer 264 may function as a downmixer. According to some such implementations, a less computationally intensive method of generating the decorrelated downmix may be used. For example, the decorrelator 205 may be configured to generate the decorrelated audio data 230 only for channels that the switch 203 will send to the inverse transform module 255. For example, if N=6, and M=2, the decorrelator 205 may be configured to generate the decorrelated audio data 230 for only 2 downmixed channels. In the process, the decorrelator 205 may use decorrelation filters for only 2 channels rather than 6, reducing complexity. Corresponding mixing information may be included in the decorrelation information 240, the mixing information 266 and the mixing information 268. Accordingly, the decorrelator 205 may be configured to determine decorrelation filtering processes based, at least in part, on the N-to-M, N-to-K or M-to-K mixing equations.

Figure 2F:
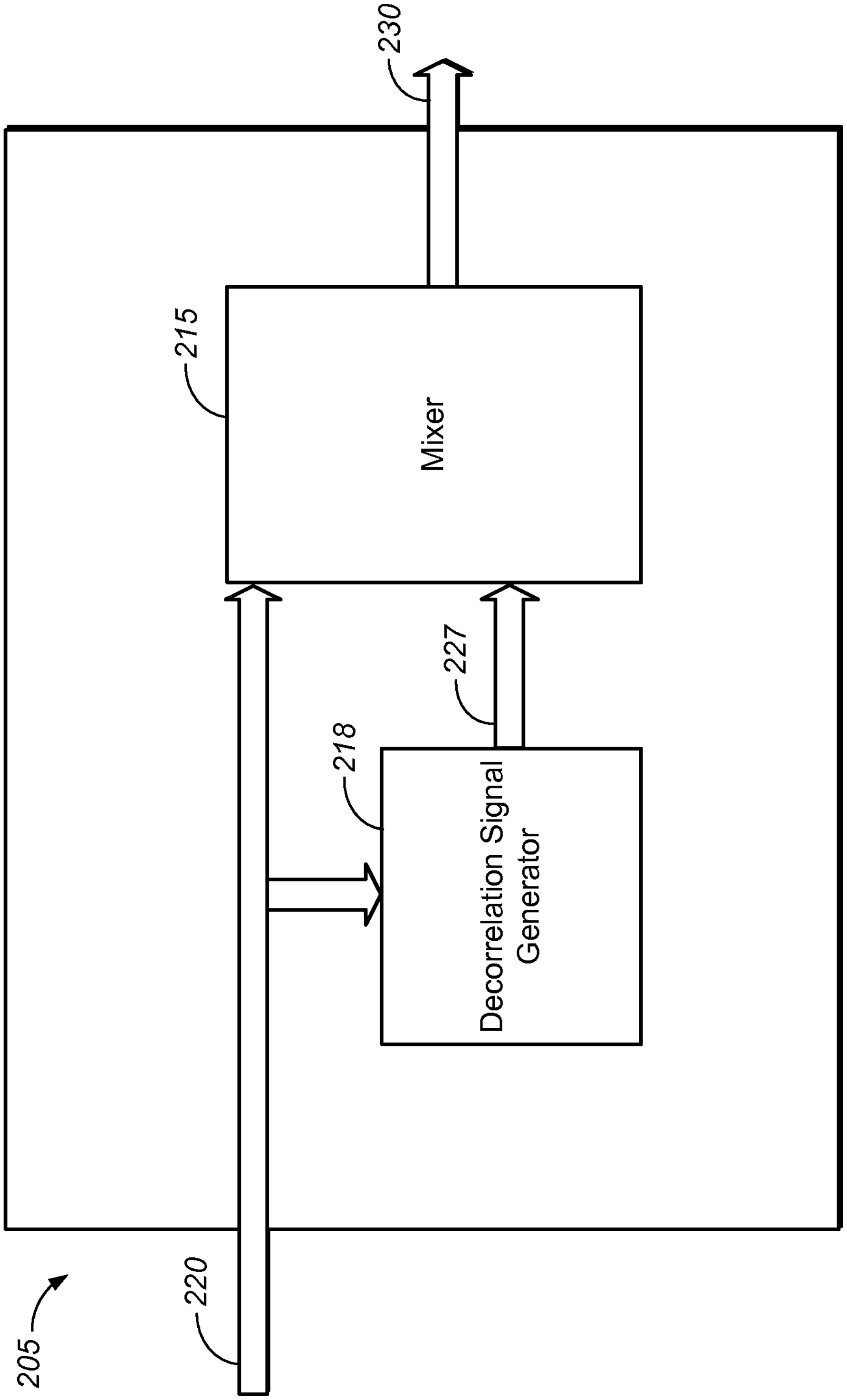
FIG. 2F is a block diagram that shows examples of decorrelator elements.

FIG. 2F is a block diagram that shows examples of decorrelator elements. The elements shown in FIG. 2F may, for example, be implemented in a logic system of a decoding apparatus, such as the apparatus described below with reference to FIG. 12. FIG. 2F depicts a decorrelator 205 that includes a decorrelation signal generator 218 and a mixer 215. In some embodiments, the decorrelator 205 may include other elements. Examples of other elements of the decorrelator 205 and how they may function are set forth elsewhere herein.

In this example, audio data 220 are input to the decorrelation signal generator 218 and the mixer 215. The audio data 220 may correspond to a plurality of audio channels. For example, the audio data 220 may include data resulting from channel coupling during an audio encoding process that has been upmixed prior to being received by the decorrelator 205. In some embodiments, the audio data 220 may be in the time domain, whereas in other embodiments the audio data 220 may be in the frequency domain. For example, the audio data 220 may include time sequences of transform coefficients.

The decorrelation signal generator 218 may form one or more decorrelation filters, apply the decorrelation filters to the audio data 220 and provide the resulting decorrelation signals 227 to the mixer 215. In this example, the mixer combines the audio data 220 with the decorrelation signals 227 to produce decorrelated audio data 230.

In some embodiments, the decorrelation signal generator 218 may determine decorrelation filter control information for a decorrelation filter. According to some such embodiments, the decorrelation filter control information may correspond to a maximum pole displacement of the decorrelation filter. The decorrelation signal generator 218 may determine decorrelation filter parameters for the audio data 220 based, at least in part, on the decorrelation filter control information.

In some implementations, determining the decorrelation filter control information may involve receiving an express indication of the decorrelation filter control information (for example, an express indication of a maximum pole displacement) with the audio data 220. In alternative implementations, determining the decorrelation filter control information may involve determining audio characteristic information and determining decorrelation filter parameters (such as a maximum pole displacement) based, at least in part, on the audio characteristic information. In some implementations, the audio characteristic information may include spatial information, tonality information and/or transient information.

Figure 3:
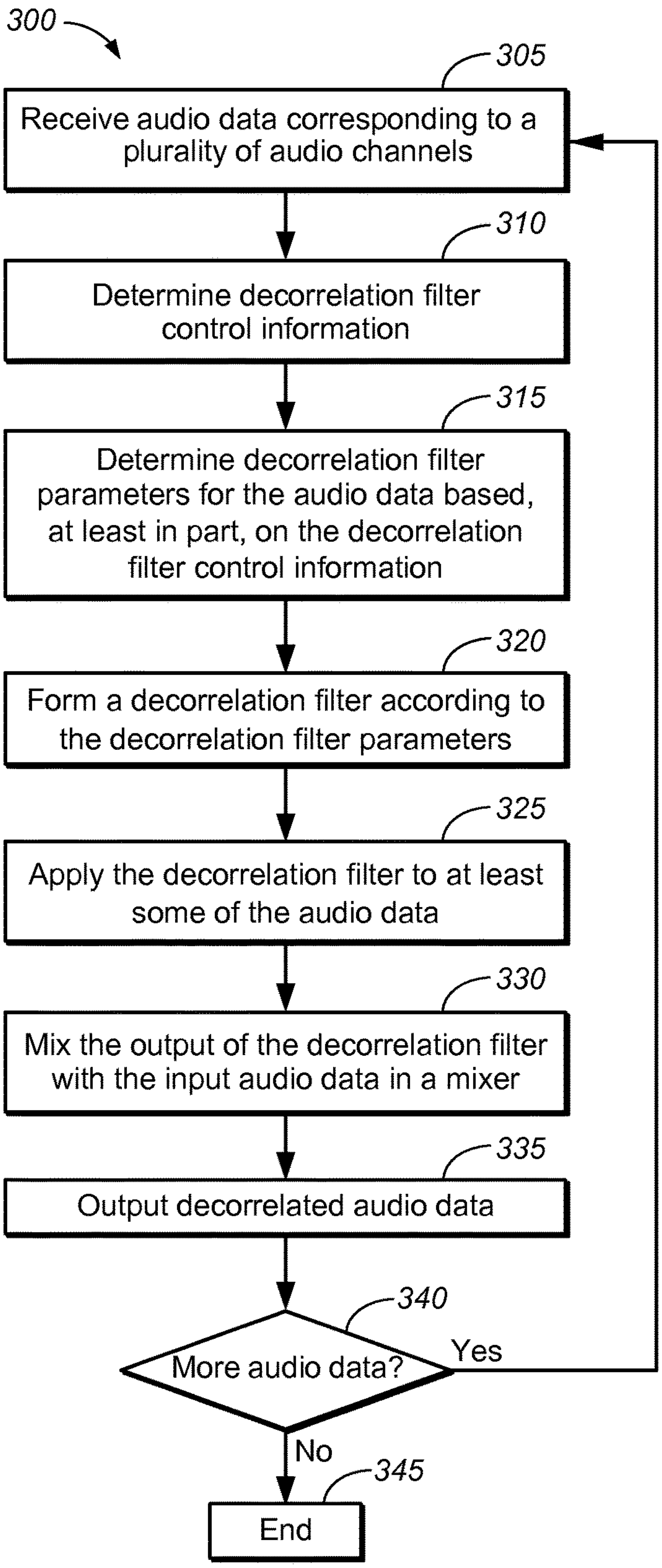
FIG. 3 is a flow diagram illustrating an example of a decorrelation process.
Figure 4:
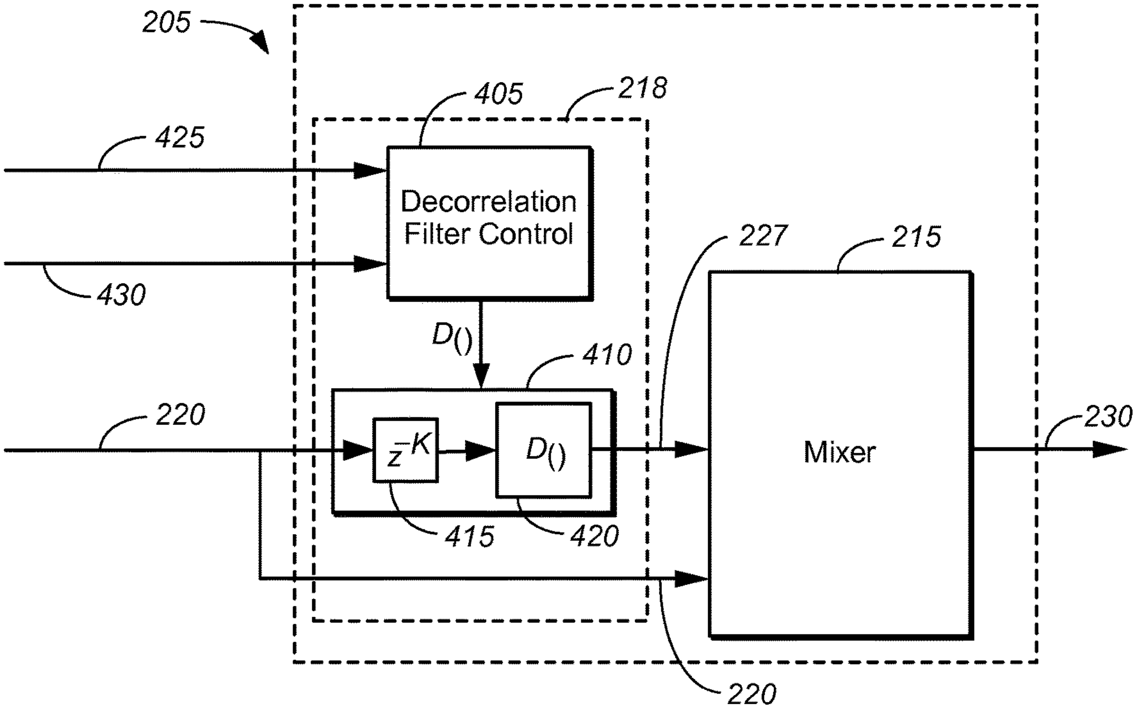
FIG. 4 is a block diagram illustrating examples of decorrelator components that may be configured for performing the decorrelation process of FIG. 3.

Some implementations of the decorrelator 205 will now be described in more detail with reference to FIGS. 3-5E. FIG. 3 is a flow diagram illustrating an example of a decorrelation process. FIG. 4 is a block diagram illustrating examples of decorrelator components that may be configured for performing the decorrelation process of FIG. 3. The decorrelation process 300 of FIG. 3 may be performed, at least in part, in a decoding apparatus such as that described below with reference to FIG. 12.

In this example, the process 300 begins when a decorrelator receives audio data (block 305). As described above with reference to FIG. 2F, the audio data may be received by the decorrelation signal generator 218 and the mixer 215 of the decorrelator 205. Here, at least some of the audio data are received from an upmixer, such as the upmixer 225 of FIG. 2D. As such, the audio data correspond to a plurality of audio channels. In some implementations, the audio data received by the decorrelator may include a time sequence of frequency domain representations of audio data (such as MDCT coefficients) in the coupling channel frequency range of each channel. In alternative implementations, the audio data may be in the time domain.

In block 310, decorrelation filter control information is determined. The decorrelation filter control information may, for example, be determined according to audio characteristics of the audio data. In some implementations, such as the example shown in FIG. 4, such audio characteristics may include explicit spatial information, tonality information and/or transient information encoded with the audio data.

In the embodiment shown in FIG. 4, the decorrelation filter 410 includes a fixed delay 415 and a time-varying portion 420. In this example, the decorrelation signal generator 218 includes a decorrelation filter control module 405 for controlling the time-varying portion 420 of the decorrelation filter 410. In this example, the decorrelation filter control module 405 receives explicit tonality information 425 in the form of a tonality flag. In this implementation, the decorrelation filter control module 405 also receives explicit transient information 430. In some implementations, the explicit tonality information 425 and/or the explicit transient information 430 may be received with the audio data, e.g. as part of the decorrelation information 240. In some implementations, the explicit tonality information 425 and/or the explicit transient information 430 may be locally generated.

In some implementations, no explicit spatial information, tonality information or transient information is received by the decorrelator 205. In some such implementations, a transient control module of the decorrelator 205 (or another element of an audio processing system) may be configured to determine transient information based on one or more attributes of the audio data. A spatial parameter module of the decorrelator 205 may be configured to determine spatial parameters based on one or more attributes of the audio data. Some examples are described elsewhere herein.

In block 315 of FIG. 3, decorrelation filter parameters for the audio data are determined, at least in part, based on the decorrelation filter control information determined in block 310. A decorrelation filter may then be formed according to the decorrelation filter parameters, as shown in block 320. The filter may, for example, be a linear filter with at least one delay element. In some implementations, the filter may be based, at least in part, on a meromorphic function. For example, the filter may include an all-pass filter.

In the implementation shown in FIG. 4, the decorrelation filter control module 405 may control the time-varying portion 420 of the decorrelation filter 410 based, at least in part, on tonality flags 425 and/or explicit transient information 430 received by the decorrelator 205 in the bitstream. Some examples are described below. In this example, the decorrelation filter 410 is only applied to audio data in the coupling channel frequency range.

In this embodiment, the decorrelation filter 410 includes a fixed delay 415 followed by the time-varying portion 420, which is an all-pass filter in this example. In some embodiments, the decorrelation signal generator 218 may include a bank of all-pass filters. For example, in some embodiments wherein the audio data 220 is in the frequency domain, the decorrelation signal generator 218 may include an all-pass filter for each of a plurality of frequency bins. However, in alternative implementations, the same filter may be applied to each frequency bin. Alternatively, frequency bins may be grouped and the same filter may be applied to each group. For example, the frequency bins may be grouped into frequency bands, may be grouped by channel and/or grouped by frequency band and by channel.

The amount of the fixed delay may be selectable, e.g., by a logic device and/or according to user input. In order to introduce controlled chaos into the decorrelation signals 227, the decorrelation filter control 405 may apply decorrelation filter parameters to control the poles of the all-pass filter(s) so that one or more of the poles move randomly or pseudo-randomly in a constrained region.

Accordingly, the decorrelation filter parameters may include parameters for moving at least one pole of the all-pass filter. Such parameters may include parameters for dithering one or more poles of the all-pass filter. Alternatively, the decorrelation filter parameters may include parameters for selecting a pole location from among a plurality of predetermined pole locations for each pole of the all-pass filter. At a predetermined time interval (for example, once every Dolby Digital Plus block), a new location for each pole of the all-pass filter may be chosen randomly or pseudo-randomly.

Figure 5A:
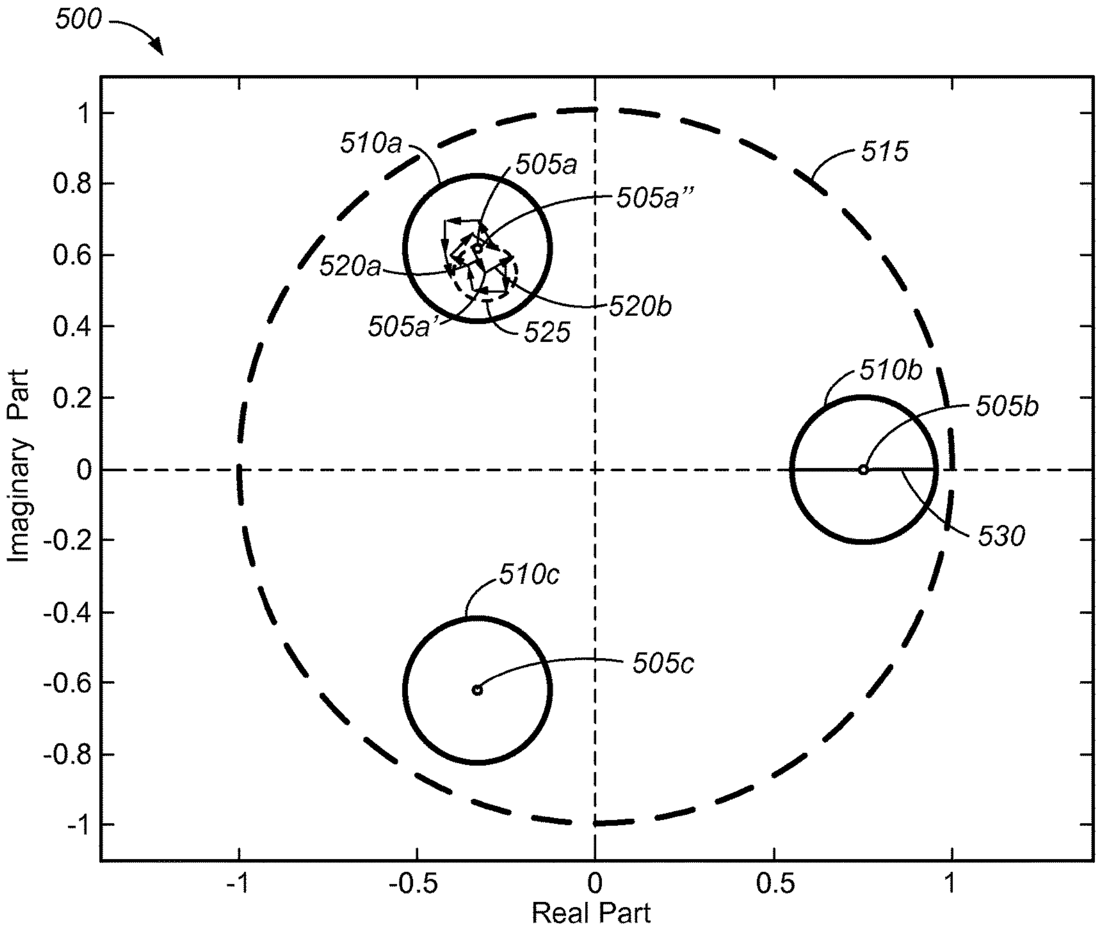
FIG. 5A is a graph that shows an example of moving the poles of an all-pass filter.

Some such implementations will now be described with reference to FIGS. 5A-5E. FIG. 5A is a graph that shows an example of moving the poles of an all-pass filter. The graph 500 is a pole plot of a $3^{rd}$-order all-pass filter. In this example, the filter has two complex poles (poles 505*a* and 505*c*) and one real pole (pole 505*b*). The large circle is the unit circle 515. Over time, the pole locations may be dithered (or otherwise changed) such that they move within constraint areas 510*a*, 510*b* and 510*c*, which constrain the possible paths of the poles 505*a*, 505*b* and 505*c*, respectively.

In this example, the constraint areas 510*a*, 510*b* and 510*c* are circular. The initial (or "seed") locations of the poles 505*a*, 505*b* and 505*c* are indicated by the circles in the centers of the constraint areas 510*a*, 510*b* and 510*c*. In the example of FIG. 5A, the constraint areas 510*a*, 510*b* and 510*c* are circles of radius 0.2 centered at the initial pole locations. The poles 505*a* and 505*c* correspond to a complex conjugate pair, whereas the pole 505*b* is a real pole.

Figure 5B:
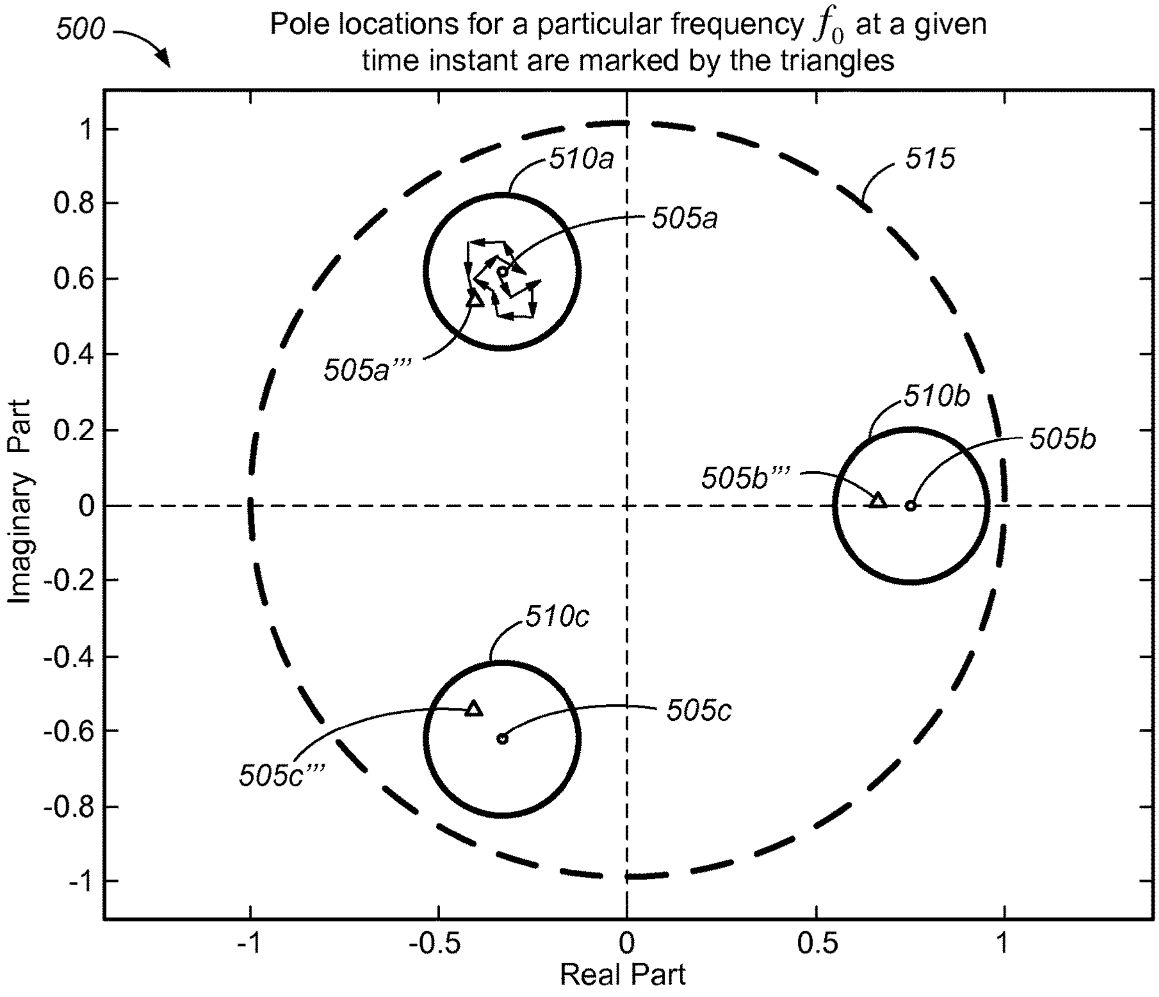
FIGS. 5B and 5C are graphs that show alternative examples of moving the poles of an all-pass filter.

However, other implementations may include more or fewer poles. Alternative implementations also may include constraint areas of different sizes or shapes. Some examples are shown in FIGS. 5D and 5E, and are described below.

In some implementations, different channels of the audio data share the same constraint areas. However, in alternative implementations, channels of the audio data do not share the same constraint areas. Whether or not channels of the audio data share the same constraint areas, the poles may be dithered (or otherwise moved) independently for each audio channel.

A sample trajectory of the pole 505*a* is indicated by arrows within the constraint area 510*a*. Each arrow represents a movement or "stride" 520 of the pole 505*a*. Although not shown in FIG. 5A, the two poles of the complex conjugate pair, poles 505*a* and 505*c*, move in tandem, so that the poles retain their conjugate relationship.

In some implementations, the movement of a pole may be controlled by changing a maximum stride value. The maximum stride value may correspond to a maximum pole displacement from the most recent pole location. The maximum stride value may define a circle having a radius equal to the maximum stride value.

One such example is shown in FIG. 5A. The pole 505*a* is displaced from its initial location by the stride 520*a* to the location 505*a*'. The stride 520*a* may have been constrained according to a previous maximum stride value, e.g., an initial maximum stride value. After the pole 505*a* moves from its initial location to the location 505*a*', a new maximum stride value is determined. The maximum stride value defines the maximum stride circle 525, which has a radius equal to the maximum stride value. In the example shown in FIG. 5A, the next stride (the stride 520*b*) happens to be equal to the maximum stride value. Therefore, the stride 520*b* moves the pole to the location 505*a*", on the circumference of the maximum stride circle 525. However, the strides 520 may generally be less than the maximum stride value.

In some implementations, the maximum stride value may be reset after each stride. In other implementations, the maximum stride value may be reset after multiple strides and/or according to changes in the audio data.

The maximum stride value may be determined and/or controlled in various ways. In some implementations, the maximum stride value may be based, at least in part, on one or more attributes of the audio data to which the decorrelation filter will be applied.

For example, the maximum stride value may be based, at least in part, on tonality information and/or transient information. According to some such implementations, the maximum stride value may be at or near zero for highly tonal signals of the audio data (such as audio data for a pitch pipe, a harpsichord, etc.), which causes little or no variation in the poles to occur. In some implementations, the maximum stride value may be at or near zero at the instant of an attack in a transient signal (such as audio data for an explosion, a door slam, etc.). Subsequently (for example, over a time period of a few blocks), the maximum stride value may be ramped to a larger value.

In some implementations, tonality and/or transient information may be detected at the decoder, based on one or more attributes of the audio data. For example, tonality and/or transient information may be determined according to one or more attributes of the audio data by a module such as the control information receiver/generator 640, which is described below with reference to FIGS. 6B and 6C. Alternatively, explicit tonality and/or transient information may be transmitted from the encoder and received in a bitstream received by a decoder, e.g., via tonality and/or transient flags.

In this implementation, the movement of a pole may be controlled according to dithering parameters. Accordingly, while the movement of a pole may be constrained according to a maximum stride value, the direction and/or extent of the pole movement may include a random or quasi-random component. For example, the movement of a pole may be based, at least in part, on the output of a random number generator or pseudo-random number generator algorithm implemented in software. Such software may be stored on a non-transitory medium and executed by a logic system.

However, in alternative implementations the decorrelation filter parameters may not involve dithering parameters. Instead, pole movement may be restricted to predetermined pole locations. For example, a number of predetermined pole locations may lie within a radius defined by a maximum stride value. A logic system may randomly or pseudo-randomly select one of these predetermined pole locations as the next pole location.

Various other methods may be employed to control pole movement. In some implementations, if a pole is approaching the boundary of a constraint area, the selection of pole movements may be biased towards new pole locations that are closer to the center of the constraint area. For example, if the pole 505*a* moves towards the boundary of the constraint area 510*a*, the center of the maximum stride circle 525 may be shifted inwards towards the center of the constraint area 510*a*, so that the maximum stride circle 525 always lies within the boundary of the constraint area 510*a*.

In some such implementations, a weight function may be applied in order to create a bias that tends to move a pole location away from a constraint area boundary. For example, predetermined pole locations within the maximum stride circle 525 may not be assigned equal probabilities of being selected as the next pole location. Instead, predetermined pole locations that are closer to the center of the constraint area may be assigned a higher probability than predetermined pole locations that are relatively farther from the center of the constraint area. According to some such implementations, when the pole 505*a* is close to the boundary of the constraint area 510*a*, it is more likely that the next pole movement will be towards the center of the constraint area 510*a*.

In this example, locations of the pole 505*b* also change, but are controlled such that the pole 505*b* continues to remain real. Accordingly, locations of the pole 505*b* are constrained to lie along the diameter 530 of the constraint area 510*b*. In alternative implementations, however, the pole 505*b* may be moved to locations that have an imaginary component.

In yet other implementations, the locations of all poles may be constrained to move only along radii. In some such implementations, changes in pole location only increase or decrease the poles (in terms of magnitude) but do not affect their phase. Such implementations may be useful, for example, for imparting a selected reverberation time constant.

Poles for frequency coefficients corresponding to higher frequencies may be relatively closer to the center of the unit circle 515 than poles for frequency coefficients corresponding to lower frequencies. We will use FIG. 5B, a variation of FIG. 5A, to illustrate an example implementation. Here, at a given time instant the triangles 505*a*''', 505*b*''' and 505*c*''' indicate the pole locations at frequency $f_0$ obtained after dithering or some other process describing their time variation. Let the pole at 505*a*''' be indicated by $z_1$ and the pole at 505*b*''' be indicated by $z_2$. The pole at 505*c*''' is the complex conjugate of the pole at 505*a*''' and is hence represented by $z^*_1$ where the asterisk indicates complex conjugation.

The poles for the filter used at any other frequency f is obtained in this example by scaling the poles $z_1$, $z_2$ and $z^*_1$ by a factor $a(f)/a(f_0)$, where a(f) is a function that decreases with the audio data frequency f. When $f=f_0$ the scaling factor is equal to 1 and the poles are at the expected locations. According to some such implementations, smaller group delays may be applied to frequency coefficients corresponding to higher frequencies than to frequency coefficients corresponding to lower frequencies. In the embodiment described here the poles are dithered at one frequency and scaled to obtain pole locations for other frequencies. The frequency $f_0$ could be, for instance, the coupling begin frequency. In alternative implementations, the poles could be separately dithered at each frequency, and the constraint areas (510*a*, 510*b*, and 510*c*) may be substantially closer to the origin at higher frequencies compared to lower frequencies.

According to various implementations described herein, poles 505 may be moveable, but may maintain a substantially consistent spatial or angular relationship relative to one another. In some such implementations, movements of the poles 505 may not be limited according to constraint areas.

Figure 5C:
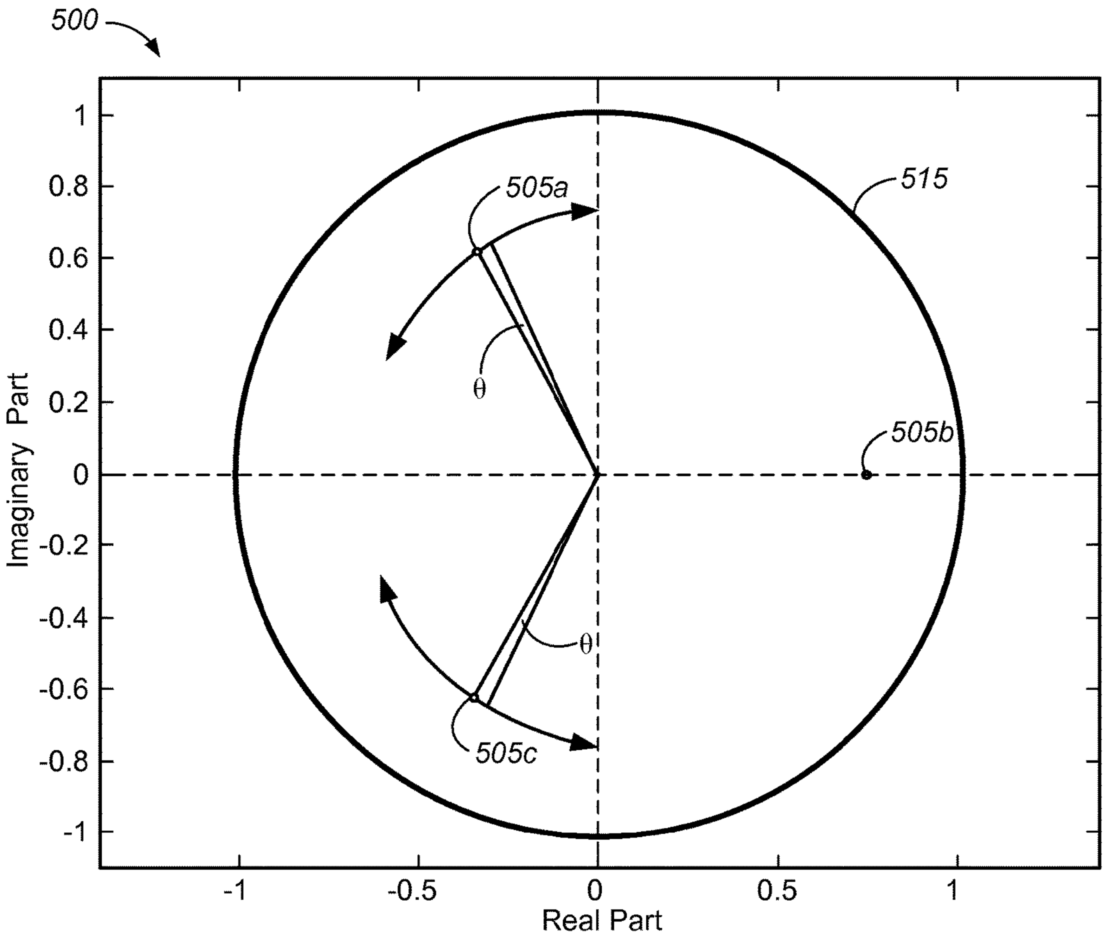
Figure 5D:
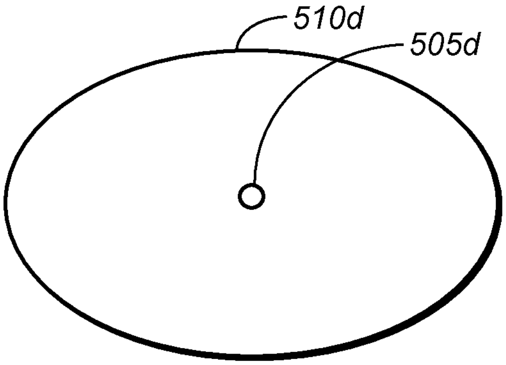
FIGS. 5D and 5E are graphs that show alternative examples of constraint areas that may be applied when moving the poles of an all-pass filter.
Figure 5E:
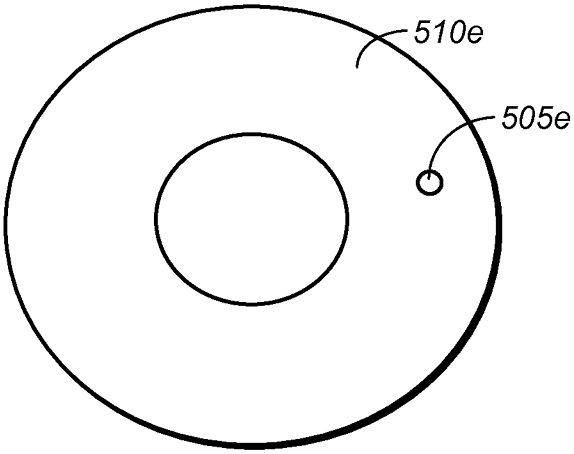

FIG. 5C shows one such example. In this example, the complex conjugate poles 505*a* and 505*c* may be moveable in a clockwise or counterclockwise direction within the unit circle 515. When the poles 505*a* and 505*c* are moved (for example, at a predetermined time interval), both poles may be rotated by an angle θ that is selected randomly or quasi-randomly. In some embodiments, this angular motion may be constrained according to a maximum angular stride value. In the example shown in FIG. 5C, the pole 505*a* has been moved by an angle θ in a clockwise direction. Accordingly, the pole 505*c* has been moved by an angle θ in a counterclockwise direction, in order to maintain the complex conjugate relationship between the pole 505*a* and the pole 505*c*.

In this example, the pole 505*b* is constrained to move along the real axis. In some such implementations, the poles 505*a* and 505*c* also may be moveable towards or away from the center of the unit circle 515, e.g., as described above with reference to FIG. 5B. In alternative implementations, the pole 505*b* may not be moved. In yet other implementations, the pole 505*b* may be moved from the real axis.

In the examples shown in FIGS. 5A and 5B, the constraint areas 510*a*, 510*b* and 510*c* are circular. However, various other constraint area shapes are contemplated by the inventors. For example, the constraint area 510*d* of FIG. 5D is substantially oval in shape. The pole 505*d* may be positioned at various locations within the oval constraint area 510*d*. In the example of FIG. 5E, the constraint area 510*e* is an annulus. The pole 505*e* may be positioned at various locations within the annulus of constraint area 510*d*.

Returning now to FIG. 3, in block 325 a decorrelation filter is applied to at least some of the audio data. For example, the decorrelation signal generator 218 of FIG. 4 may apply a decorrelation filter to at least some of the input audio data 220. The output of the decorrelation filter 227 may be uncorrelated with the input audio data 220. Moreover, the output of the decorrelation filter may have substantially the same power spectral density as the input signal. Therefore, the output of the decorrelation filter 227 may sound natural. In block 330, the output of the decorrelation filter is mixed with input audio data. In block 335, decorrelated audio data are output. In the example of FIG. 4, in block 330 the mixer 215 combines the output of the decorrelation filter 227 (which may be referred to herein as "filtered audio data") with the input audio data 220 (which may be referred to herein as "direct audio data"). In block 335, the mixer 215 outputs the decorrelated audio data 230. If it is determined in block 340 that more audio data will be processed, the decorrelation process 300 reverts to block 305. Otherwise, the decorrelation process 300 ends. (Block 345.)

Figure 6A:
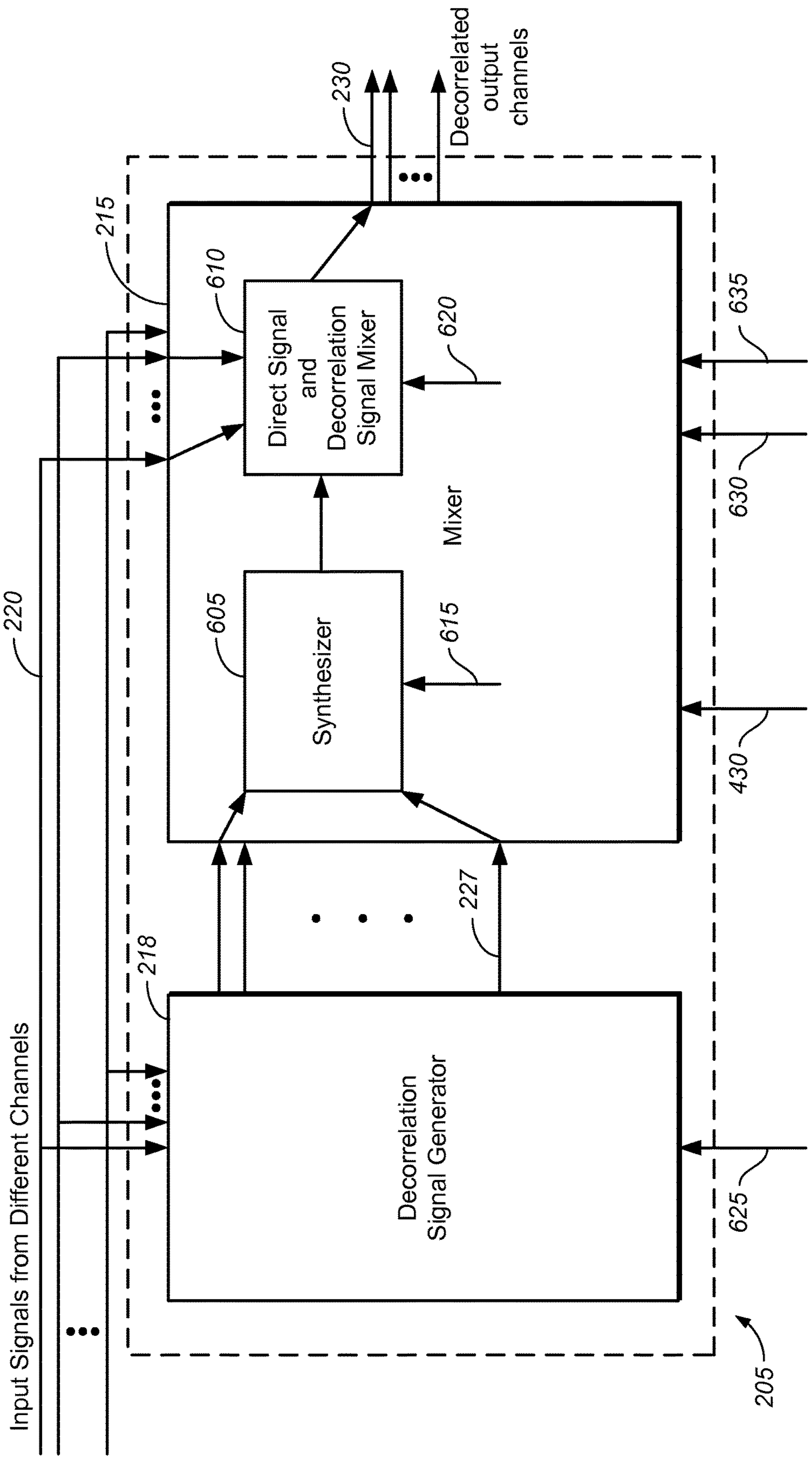
FIG. 6A is a block diagram that illustrates an alternative implementation of a decorrelator.

FIG. 6A is a block diagram that illustrates an alternative implementation of a decorrelator. In this example, the mixer 215 and the decorrelation signal generator 218 receive audio data elements 220 corresponding to a plurality of channels. At least some of the audio data elements 220 may, for example, be output from an upmixer, such as the upmixer 225 of FIG. 2D.

Here, the mixer 215 and the decorrelation signal generator 218 also receive various types of decorrelation information. In some implementations, at least some of the decorrelation information may be received in a bitstream along with the audio data elements 220. Alternatively, or additionally, at least some of the decorrelation information may be determined locally, e.g., by other components of the decorrelator 205 or by one or more other components of the audio processing system 200.

In this example, the received decorrelation information includes decorrelation signal generator control information 625. The decorrelation signal generator control information 625 may include decorrelation filter information, gain information, input control information, etc. The decorrelation signal generator produces the decorrelation signals 227 based, at least in part, on the decorrelation signal generator control information 625.

Here, the received decorrelation information also includes transient control information 430. Various examples of how the decorrelator 205 may use and/or generate the transient control information 430 are provided elsewhere in this disclosure.

In this implementation, the mixer 215 includes the synthesizer 605 and the direct signal and decorrelation signal mixer 610. In this example, the synthesizer 605 is an output-channel-specific combiner of decorrelation or reverb signals, such as the decorrelation signals 227 received from the decorrelation signal generator 218. According to some such implementations, the synthesizer 605 may be a linear combiner of the decorrelation or reverb signals. In this example, the decorrelation signals 227 correspond to audio data elements 220 for a plurality of channels, to which one or more decorrelation filters have been applied by the decorrelation signal generator. Accordingly, the decorrelation signals 227 also may be referred to herein as "filtered audio data" or "filtered audio data elements."

Here, the direct signal and decorrelation signal mixer 610 is an output-channel-specific combiner of the filtered audio data elements with the "direct" audio data elements 220 corresponding to a plurality of channels, to produce the decorrelated audio data 230. Accordingly, the decorrelator 205 may provide channel-specific and non-hierarchical decorrelation of audio data.

In this example, the synthesizer 605 combines the decorrelation signals 227 according to the decorrelation signal synthesizing parameters 615, which also may be referred to herein as "decorrelation signal synthesizing coefficients." Similarly, the direct signal and decorrelation signal mixer 610 combines the direct and filtered audio data elements according to the mixing coefficients 620. The decorrelation signal synthesizing parameters 615 and the mixing coefficients 620 may be based, at least in part, on the received decorrelation information.

Here, the received decorrelation information includes the spatial parameter information 630, which is channel-specific in this example. In some implementations, the mixer 215 may be configured to determine the decorrelation signal synthesizing parameters 615 and/or the mixing coefficients 620 based, at least in part, on the spatial parameter information 630. In this example, the received decorrelation information also includes downmix/upmix information 635. For example, the downmix/upmix information 635 may indicate how many channels of audio data were combined to produce downmixed audio data, which may correspond to one or more coupling channels in a coupling channel frequency range. The downmix/upmix information 635 also may indicate a number of desired output channels and/or characteristics of the output channels. As described above with reference to FIG. 2E, in some implementations the downmix/upmix information 635 may include information corresponding to the mixing information 266 received by the N-to-M upmixer/downmixer 262 and/or the mixing information 268 received by the M-to-K upmixer/downmixer 264.

Figure 6B:
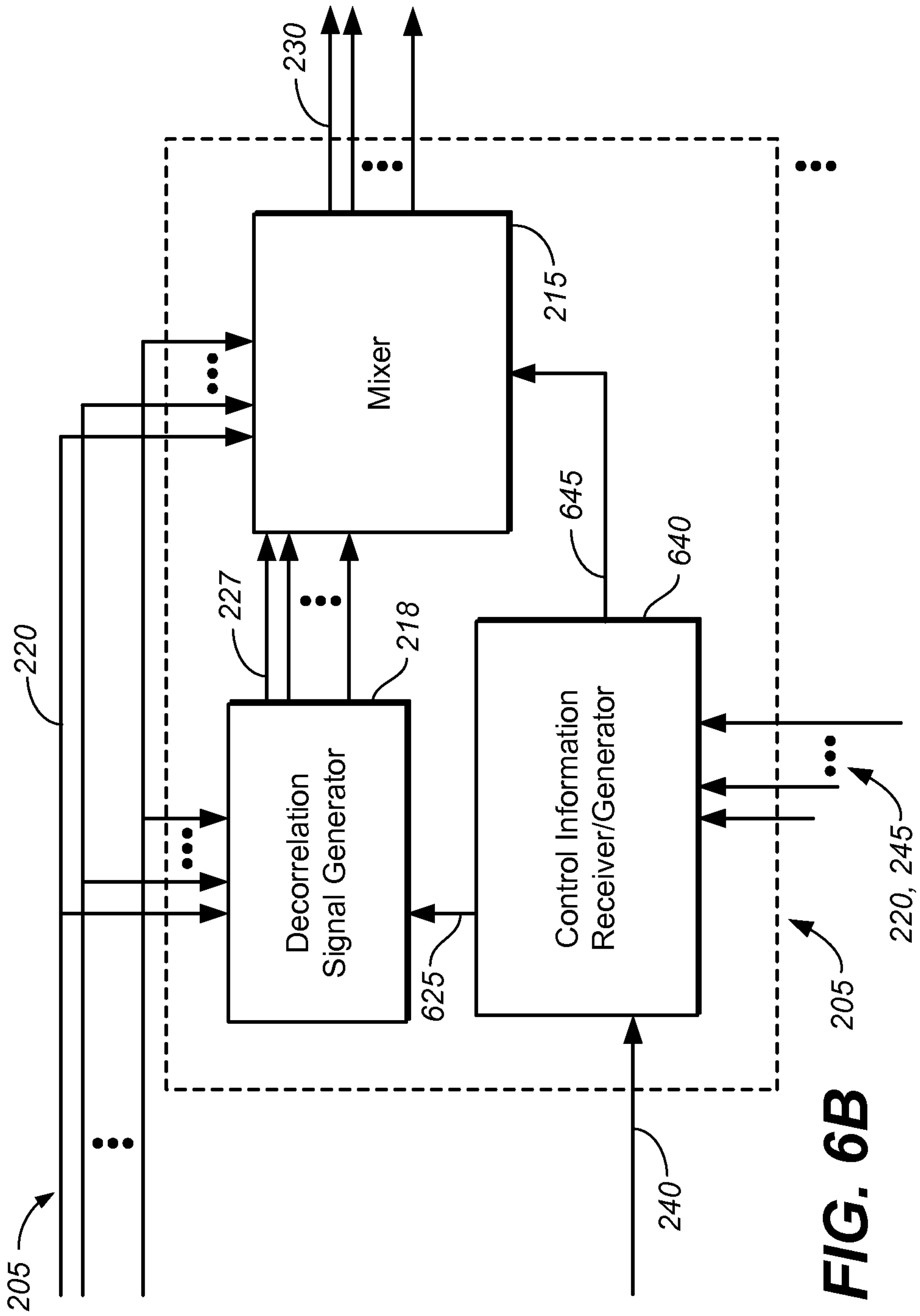
FIG. 6B is a block diagram that illustrates another implementation of a decorrelator.

FIG. 6B is a block diagram that illustrates another implementation of a decorrelator. In this example, the decorrelator 205 includes a control information receiver/generator 640. Here, control information receiver/generator 640 receives the audio data elements 220 and 245. In this example, corresponding audio data elements 220 are also received by the mixer 215 and the decorrelation signal generator 218. In some implementations, the audio data elements 220 may correspond to audio data in a coupling channel frequency range, whereas the audio data elements 245 may correspond to audio data that is in one or more frequency ranges outside of the coupling channel frequency range.

In this implementation, the control information receiver/generator 640 determines the decorrelation signal generator control information 625 and the mixer control information 645 according to the decorrelation information 240 and/or the audio data elements 220 and/or 245. Some examples of the control information receiver/generator 640 and its functionality are described below.

Figure 6C:
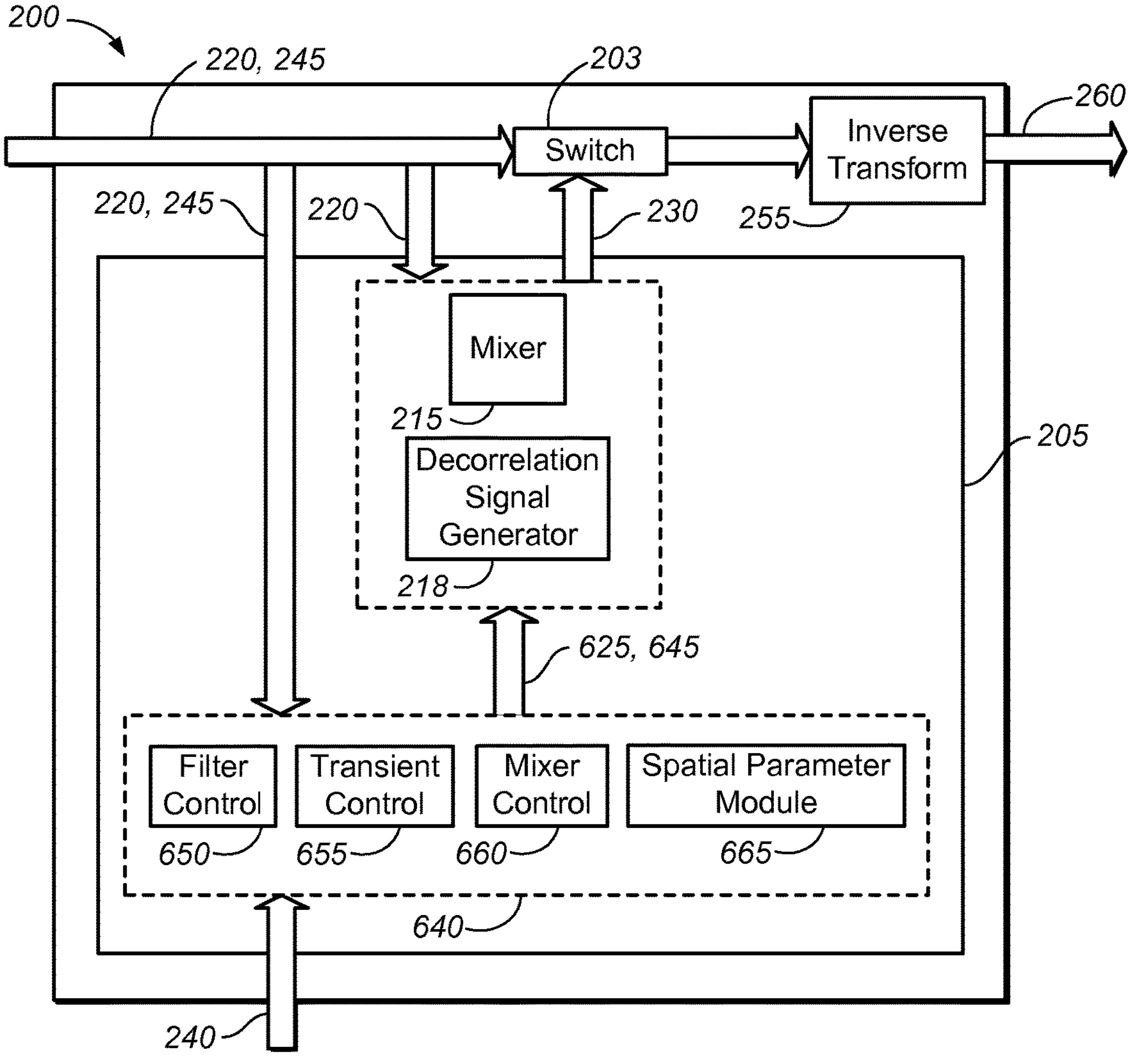
FIG. 6C illustrates an alternative implementation of an audio processing system.

FIG. 6C illustrates an alternative implementation of an audio processing system. In this example, the audio processing system 200 includes a decorrelator 205, a switch 203 and an inverse transform module 255. In some implementations, the switch 203 and the inverse transform module 255 may be substantially as described above with reference to FIG. 2A. Similarly, the mixer 215 and the decorrelation signal generator may be substantially as described elsewhere herein.

The control information receiver/generator 640 may have different functionality, according to the specific implementation. In this implementation, the control information receiver/generator 640 includes a filter control module 650, a transient control module 655, a mixer control module 660 and a spatial parameter module 665. As with other components of the audio processing system 200, the elements of the control information receiver/generator 640 may be implemented via hardware, firmware, software stored on a non-transitory medium and/or combinations thereof. In some implementations, these components may be implemented by a logic system such as described elsewhere in this disclosure.

The filter control module 650 may, for example, be configured to control the decorrelation signal generator as described above with reference to FIGS. 2E-5E and/or as described below with reference to FIG. 11B. Various examples of the functionality of the transient control module 655 and the mixer control module 660 are provided below.

In this example, the control information receiver/generator 640 receives the audio data elements 220 and 245, which may include at least a portion of the audio data received by switch 203 and/or the decorrelator 205. The audio data elements 220 are received by the mixer 215 and the decorrelation signal generator 218. In some implementations, the audio data elements 220 may correspond to audio data in a coupling channel frequency range, whereas the audio data elements 245 may correspond to audio data that is in a frequency range outside of the coupling channel frequency range. For example, the audio data elements 245 may correspond to audio data that is in a frequency range above and/or below that of the coupling channel frequency range.

In this implementation, the control information receiver/generator 640 determines the decorrelation signal generator control information 625 and the mixer control information 645 according to the decorrelation information 240, the audio data elements 220 and/or the audio data elements 245. The control information receiver/generator 640 provides the decorrelation signal generator control information 625 and the mixer control information 645 to the decorrelation signal generator 218 and the mixer 215, respectively.

In some implementations, the control information receiver/generator 640 may be configured to determine tonality information and to determine the decorrelation signal generator control information 625 and/or the mixer control information 645 based, at least in part, on the tonality information. For example, the control information receiver/generator 640 may be configured to receive explicit tonality information via explicit tonality information, such as tonality flags, as part of the decorrelation information 240. The control information receiver/generator 640 may be configured to process the received explicit tonality information and to determine tonality control information.

For example, if the control information receiver/generator 640 determines that the audio data in the coupling channel frequency range is highly tonal, the control information receiver/generator 640 may be configured to provide decorrelation signal generator control information 625 indicating that the maximum stride value should be set to zero or nearly zero, which causes little or no variation in the poles to occur. Subsequently (for example, over a time period of a few blocks), the maximum stride value may be ramped to a larger value. In some implementations, if the control information receiver/generator 640 determines that the audio data in the coupling channel frequency range is highly tonal, the control information receiver/generator 640 may be configured to indicate to the spatial parameter module 665 that a relatively higher degree of smoothing may be applied in calculating various quantities, such as energies used in the estimation of spatial parameters. Other examples of responses to determining highly tonal audio data are provided elsewhere herein.

In some implementations, the control information receiver/generator 640 may be configured to determine tonality information according to one or more attributes of the audio data 220 and/or according to information from a bitstream of a legacy audio code that is received via the decorrelation information 240, such as exponent information and/or exponent strategy information.

For example, in the bitstream of audio data encoded according to the E-AC-3 audio codec, the exponents for transform coefficients are differentially coded. The sum of absolute exponent differences in a frequency range is a measure of distance travelled along the spectral envelope of the signal in a log-magnitude domain. Signals such as pitch-pipe and harpsichord have a picket-fence spectrum and hence the path along which this distance is measure is characterized by many peaks and valleys. Thus, for such signals the distance travelled along the spectral envelope in the same frequency range is larger than for signals for audio data corresponding to, e.g., applause or rain, which have a relatively flat spectrum.

Therefore, in some implementations the control information receiver/generator 640 may be configured to determine a tonality metric based, at least in part, according to exponent differences in the coupling channel frequency range. For example, the control information receiver/generator 640 may be configured to determine a tonality metric based on the average absolute exponent difference in the coupling channel frequency range. According to some such implementations, the tonality metric is only calculated when the coupling exponent strategy is shared for all blocks in a frame and does not indicate exponent frequency sharing, in which case it is meaningful to define the exponent difference from one frequency bin to the next. According to some implementations, the tonality metric is only calculated if the E-AC-3 adaptive hybrid transform ("AHT") flag is set for the coupling channel.

If the tonality metric is determined as the absolute exponent difference of E-AC-3 audio data, in some implementations the tonality metric may take a value between 0 and 2, because −2, −1, 0, 1, and 2 are the only exponent differences allowed according to E-AC-3. One or more tonality thresholds may be set in order to differentiate tonal and non-tonal signals. For example, some implementations involve setting one threshold for entering a tonality state and another threshold for exiting the tonality state. The threshold for exiting the tonality state may be lower than the threshold for entering the tonality state. Such implementations provide a degree of hysteresis, such that tonality values slightly below the upper threshold will not inadvertently cause a tonality state change. In one example, the threshold for exiting the tonality state is 0.40, whereas the threshold for entering the tonality state is 0.45. However, other implementations may include more or fewer thresholds, and the thresholds may have different values.

In some implementations, the tonality metric calculation may be weighted according to the energy present in the signal. This energy may be derived directly from the exponents. The log energy metric may be inversely proportional to the exponents, because the exponents are represented as negative powers of two in E-AC-3. According to such implementations, those parts of the spectrum that are low in energy will contribute less to the overall tonality metric than those parts of the spectrum that are high in energy. In some implementations, the tonality metric calculation may only be performed on block zero of a frame.

In the example shown in FIG. 6C, the decorrelated audio data 230 from the mixer 215 is provided to the switch 203. In some implementations, the switch 203 may determine which components of the direct audio data 220 and the decorrelated audio data 230 will be sent to the inverse transform module 255. Accordingly, in some implementations the audio processing system 200 may provide selective or signal-adaptive decorrelation of audio data components. For example, in some implementations the audio processing system 200 may provide selective or signal-adaptive decorrelation of specific channels of audio data. Alternatively, or additionally, in some implementations the audio processing system 200 may provide selective or signal-adaptive decorrelation of specific frequency bands of audio data.

In various implementations of the audio processing system 200, the control information receiver/generator 640 may be configured to determine one or more types of spatial parameters of the audio data 220. In some implementations, at least some such functionality may be provided by the spatial parameter module 665 shown in FIG. 6C. Some such spatial parameters may be correlation coefficients between individual discrete channels and a coupling channel, which also may be referred to herein as "alphas." For example, if the coupling channel includes audio data for four channels, there may be four alphas, one alpha for each channel. In some such implementations, the four channels may be the left channel ("L"), the right channel ("R"), the left surround channel ("Ls") and the right surround channel ("Rs"). In some implementations, the coupling channel may include audio data for the above-described channels and a center channel. An alpha may or may not be calculated for the center channel, depending on whether the center channel will be decorrelated. Other implementations may involve a larger or smaller number of channels.

Other spatial parameters may be inter-channel correlation coefficients that indicate a correlation between pairs of individual discrete channels. Such parameters may sometimes be referred to herein as reflecting "inter-channel coherence" or "ICC." In the four-channel example referenced above, there may be six ICC values involved, for the L-R pair, the L-Ls pair, the L-Rs pair, the R-Ls pair, the R-Rs pair and the Ls-Rs pair.

In some implementations, the determination of spatial parameters by the control information receiver/generator 640 may involve receiving explicit spatial parameters in a bitstream, e.g., via the decorrelation information 240. Alternatively, or additionally, the control information receiver/generator 640 may be configured to estimate at least some spatial parameters. The control information receiver/generator 640 may be configured to determine mixing parameters based, at least in part, on spatial parameters. Accordingly, in some implementations, functions relating to the determination and processing of spatial parameters may be performed, at least in part, by the mixer control module 660.

Figure 7A:
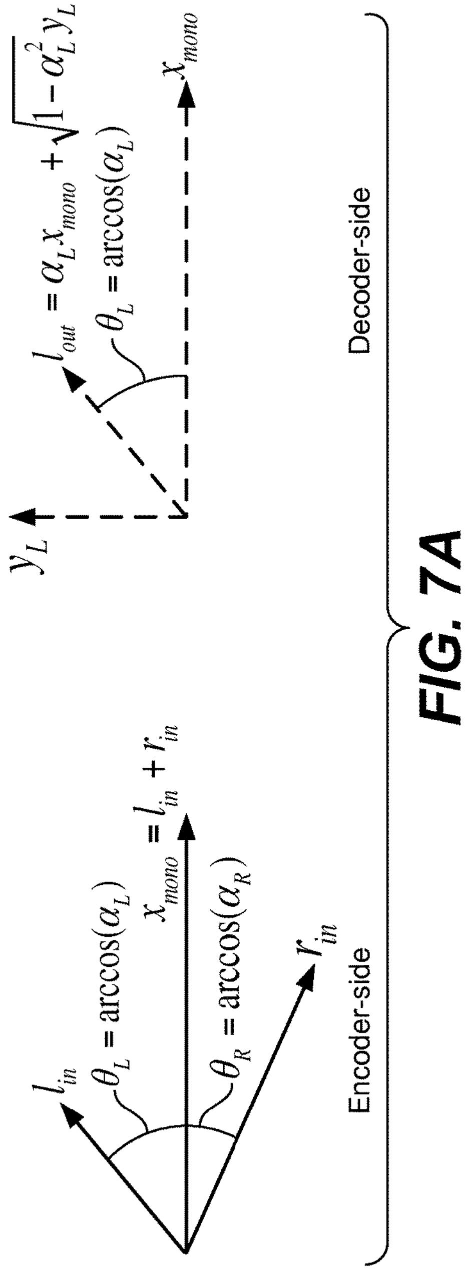
FIGS. 7A and 7B are vector diagrams that provide a simplified illustration of spatial parameters.
Figure 7B:
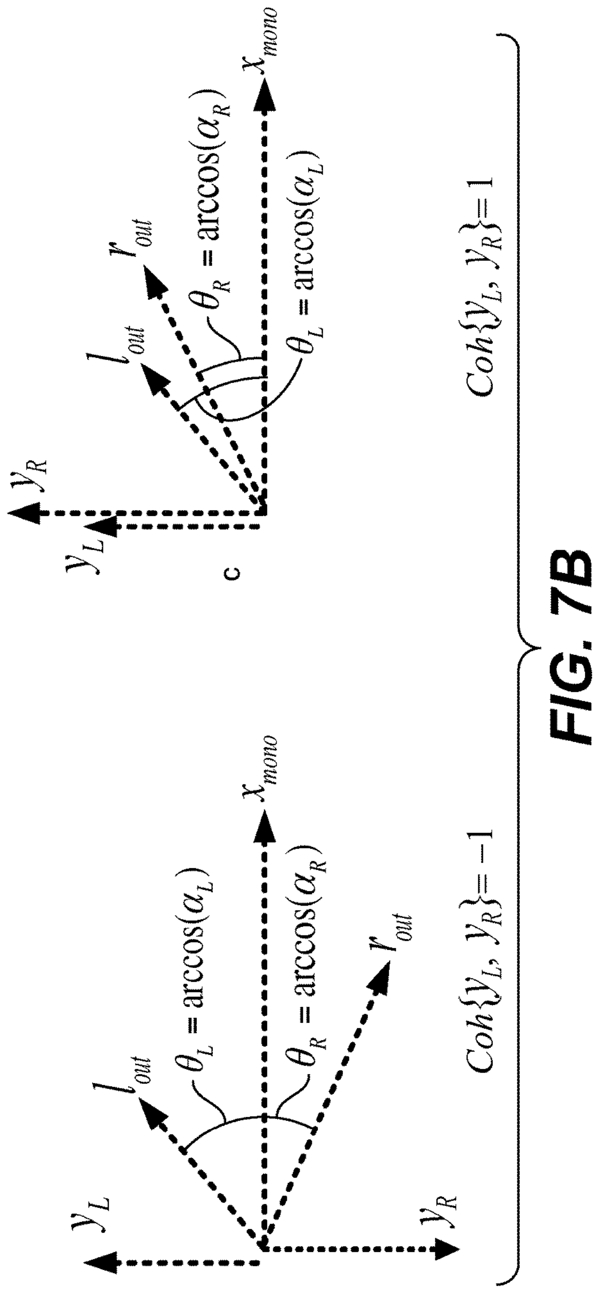

FIGS. 7A and 7B are vector diagrams that provide a simplified illustration of spatial parameters. FIGS. 7A and 7B may be considered a 3-D conceptual representation of signals in an N-dimensional vector space. Each N-dimensional vector may represent a real- or complex-valued random variable whose N coordinates correspond to any N independent trials. For example, the N coordinates may correspond to a collection of N frequency-domain coefficients of a signal within a frequency range and/or within a time interval (e.g., during a few audio blocks).

Referring first to the left panel of FIG. 7A, this vector diagram represents the spatial relationships between a left input channel $l_{in}$, a right input channel $r_{in}$ and a coupling channel $x_{mono}$, a mono downmix formed by summing $l_{in}$ and $r_{in}$. FIG. 7A is a simplified example of forming a coupling channel, which may be performed by an encoding apparatus. The correlation coefficient between the left input channel $l_{in}$ and the coupling channel $x_{mono}$ is $\alpha_L$, and correlation coefficient between the right input channel $r_{in}$ and the coupling channel is $\alpha_R$. Accordingly, the angle $\theta_L$ between the vectors representing the left input channel $l_{in}$ and the coupling channel $x_{mono}$ equals $\arccos(\alpha_L)$ and the angle $\theta_R$ between the vectors representing the right input channel $r_{in}$ and the coupling channel $x_{mono}$ equals $\arccos(\alpha_R)$.

The right panel of FIG. 7A shows a simplified example of decorrelating an individual output channel from a coupling channel. A decorrelation process of this type may be performed, for example, by a decoding apparatus. By generating a decorrelation signal $y_L$ that is uncorrelated with (perpendicular to) to the coupling channel $x_{mono}$ and mixing it with the coupling channel $x_{mono}$ using proper weights, the amplitude of the individual output channel ($l_{out}$, in this example) and its angular separation from the coupling channel $x_{mono}$ can accurately reflect the amplitude of the individual input channel and its spatial relationship with the coupling channel. The decorrelation signal $y_L$ should have the same power distribution (represented here by vector length) as the coupling channel $x_{mono}$. In this example, $l_{out}=\alpha_L\ x_{mono}+\sqrt{1-\alpha_L^2}y_L$. By denoting $\sqrt{1-\alpha_L^2}=\beta_L$, $l_{out}=\alpha_L x_{mono}+\beta_L\ y_L$.

However, restoring the spatial relationship between individual discrete channels and a coupling channel does not guarantee the restoration of the spatial relationships between the discrete channels (represented by the ICCs). This fact is illustrated in FIG. 7B. The two panels in FIG. 7B show two extreme cases. The separation between $l_{out}$ and $r_{out}$ is maximized when the decorrelation signals $y_L$ and $y_R$ are separated by 180°, as shown in the left panel of FIG. 7B. In this case, the ICC between the left and right channels is minimized and the phase diversity between $l_{out}$ and $r_{out}$ is maximized Conversely, as shown in the right panel of FIG. 7B, the separation between $l_{out}$ and $r_{out}$ is minimized when the decorrelation signals $y_L$ and $y_R$ are separated by 0°. In this case, the ICC between the left and right channels is maximized and the phase diversity between $l_{out}$ and $r_{out}$ is minimized.

In the examples shown in FIG. 7B, all of the illustrated vectors are in the same plane. In other examples, $y_L$ and $y_R$ may be positioned at other angles with respect to each other. However, it is preferable that $y_L$ and $y_R$ are perpendicular, or at least substantially perpendicular, to the coupling channel $x_{mono}$. In some examples either $y_L$ and $y_R$ may extend, at least partially, into a plane that is orthogonal to the plane of FIG. 7B.

Because the discrete channels are ultimately reproduced and presented to listeners, proper restoration of the spatial relationships between discrete channels (the ICCs) may significantly improve the restoration of spatial characteristics of the audio data. As may be seen by the examples of FIG. 7B, an accurate restoration of the ICCs depends on creating decorrelation signals (here, $y_L$ and $y_R$) that have proper spatial relationships with one another. This correlation between decorrelation signals may be referred to herein as the inter-decorrelation-signal coherence or "IDC."

In the left panel of FIG. 7B, the IDC between $y_L$ and $y_R$ is −1. As noted above, this IDC corresponds with a minimum ICC between the left and right channels. By comparing the left panel of FIG. 7B with the left panel of FIG. 7A, it may be observed that in this example with two coupled channels, the spatial relationship between $l_{out}$ and $r_{out}$ accurately reflects the spatial relationship between $l_{in}$ and $r_{in}$. In the right panel of FIG. 7B, the IDC between $y_L$ and $y_R$ is 1 (complete correlation). By comparing the right panel of FIG. 7B with the left panel of FIG. 7A, one may see that in this example the spatial relationship between $l_{out}$ and $r_{out}$ does not accurately reflect the spatial relationship between $l_{in}$ and $r_{in}$.

Accordingly, by setting the IDC between spatially adjacent individual channels to −1, the ICC between these channels may be minimized and the spatial relationship between the channels may be closely restored when these channels are dominant. This results in an overall sound image that is perceptually approximate to the sound image of the original audio signal. Such methods may be referred to herein as "sign-flip" methods. In such methods, no knowledge of the actual ICCs is required.

Figure 8A:
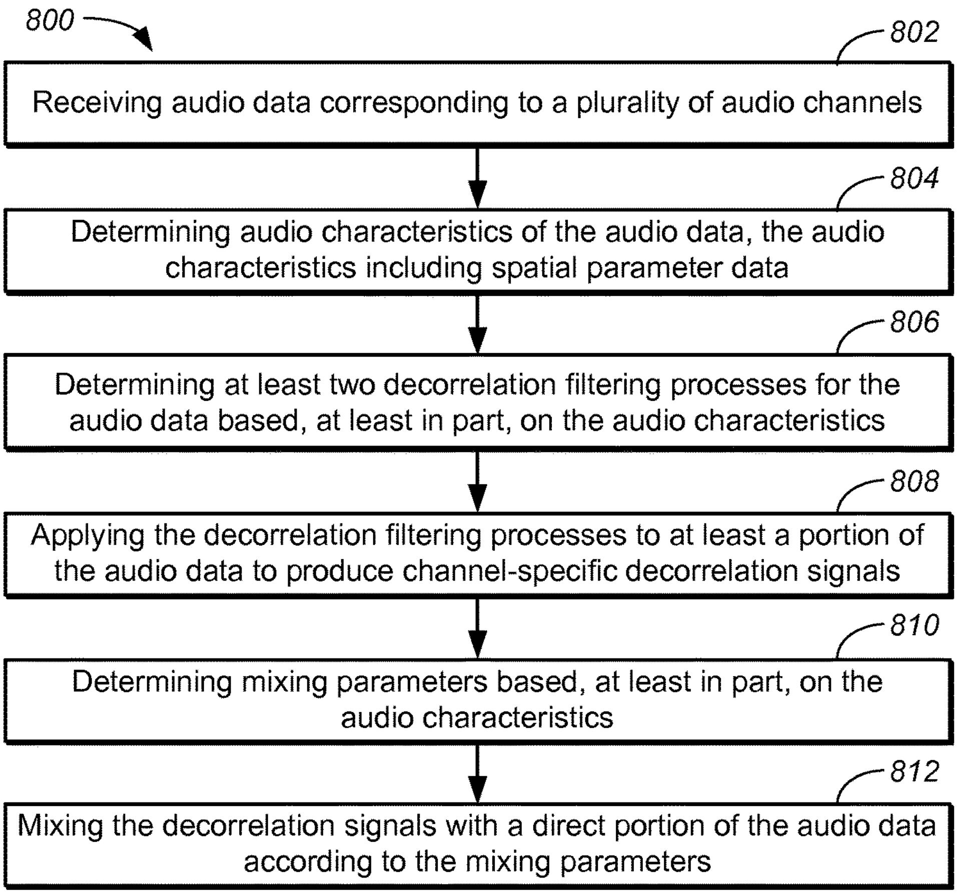
FIG. 8A is a flow diagram that illustrates blocks of some decorrelation methods provided herein.

FIG. 8A is a flow diagram that illustrates blocks of some decorrelation methods provided herein. As with other method described herein, the blocks of method 800 are not necessarily performed in the order indicated. Moreover, some implementations of method 800 and other methods may include more or fewer blocks than indicated or described. Method 800 begins with block 802, wherein audio data corresponding to a plurality of audio channels are received. The audio data may, for example, be received by a component of an audio decoding system. In some implementations, the audio data may be received by a decorrelator of an audio decoding system, such as one of the implementations of the decorrelator 205 disclosed herein. The audio data may include audio data elements for a plurality of audio channels produced by upmixing audio data corresponding to a coupling channel. According to some implementations, the audio data may have been upmixed by applying channel-specific, time-varying scaling factors to the audio data corresponding to the coupling channel. Some examples are provided below.

In this example, block 804 involves determining audio characteristics of the audio data. Here, the audio characteristics include spatial parameter data. The spatial parameter data may include alphas, the correlation coefficients between individual audio channels and the coupling channel. Block 804 may involve receiving spatial parameter data, e.g., via the decorrelation information 240 described above with reference to FIG. 2A et seq. Alternatively, or additionally, block 804 may involve estimating spatial parameters locally, e.g., by the control information receiver/generator 640 (see e.g., FIG. 6B or 6C). In some implementations, block 804 may involve determining other audio characteristics, such as transient characteristics or tonality characteristics.

Here, block 806 involves determining at least two decorrelation filtering processes for the audio data based, at least in part, on the audio characteristics. The decorrelation filtering processes may be channel-specific decorrelation filtering processes. According to some implementations, each of the decorrelation filtering processes determined in block 806 includes a sequence of operations relating to decorrelation.

Applying at least two decorrelation filtering processes determined in block 806 may produce channel-specific decorrelation signals. For example, applying the decorrelation filtering processes determined in block 806 may cause a specific inter-decorrelation signal coherence ("IDC") between channel-specific decorrelation signals for at least one pair of channels. Some such decorrelation filtering processes may involve applying at least one decorrelation filter to at least a portion of the audio data (e.g., as described below with reference to block 820 of FIG. 8B or FIG. 8E) to produce filtered audio data, also referred to herein as decorrelation signals. Further operations may be performed on the filtered audio data to produce the channel-specific decorrelation signals. Some such decorrelation filtering processes may involve a lateral sign-flip process, such as one of the lateral sign-flip processes described below with reference to FIGS. 8B-8D.

In some implementations, it may be determined in block 806 that the same decorrelation filter will be used to produce filtered audio data corresponding to all of the channels that will be decorrelated, whereas in other implementations, it may be determined in block 806 that a different decorrelation filter will be used to produce filtered audio data for at least some channels that will be decorrelated. In some implementations, it may be determined in block 806 that audio data corresponding to a center channel will not be decorrelated, whereas in other implementations block 806 may involve determining a different decorrelation filter for audio data of a center channel. Moreover, although in some implementations each of the decorrelation filtering processes determined in block 806 includes a sequence of operations relating to decorrelation, in alternative implementations each of the decorrelation filtering processes determined in block 806 may correspond with a particular stage of an overall decorrelation process. For example, in alternative implementations each of the decorrelation filtering processes determined in block 806 may correspond with a particular operation (or a group of related operations) within a sequence of operations relating to generating a decorrelation signal for at least two channels.

In block 808, the decorrelation filtering processes determined in block 806 will be implemented. For example, block 808 may involve applying a decorrelation filter or filters to at least a portion of the received audio data, to produce filtered audio data. The filtered audio data may, for example, correspond with the decorrelation signals 227 produced by the decorrelation signal generator 218, as described above with reference to FIGS. 2F, 4 and/or 6A-6C. Block 808 also may involve various other operations, examples of which will be provided below.

Here, block 810 involves determining mixing parameters based, at least in part, on the audio characteristics. Block 810 may be performed, at least in part, by the mixer control module 660 of the control information receiver/generator 640 (see FIG. 6C). In some implementations, the mixing parameters may be output-channel-specific mixing parameters. For example, block 810 may involve receiving or estimating alpha values for each of the audio channels that will be decorrelated, and determining mixing parameters based, at least in part, on the alphas. In some implementations, the alphas may be modified according to transient control information, which may be determined by the transient control module 655 (see FIG. 6C). In block 812, the filtered audio data may be mixed with a direct portion of the audio data according to the mixing parameters.

Figure 8B:
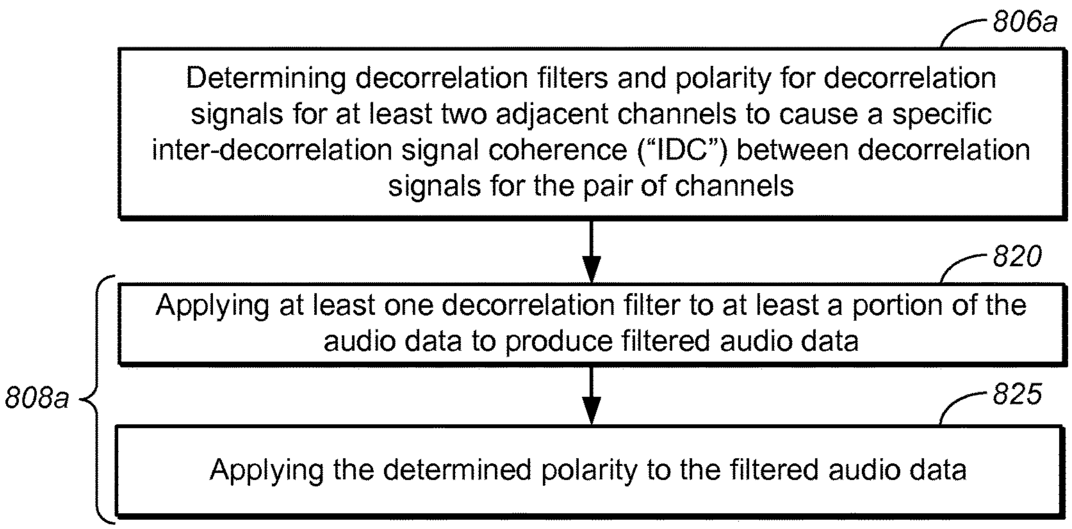
FIG. 8B is a flow diagram that illustrates blocks of a lateral sign-flip method.

FIG. 8B is a flow diagram that illustrates blocks of a lateral sign-flip method. In some implementations, the blocks shown in FIG. 8B are examples of the "determining" block 806 and the "applying" block 808 of FIG. 8A. Accordingly, these blocks are labeled as "806*a*" and "808*a*" in FIG. 8B. In this example, block 806*a* involves determining decorrelation filters and polarity for decorrelation signals for at least two adjacent channels to cause a specific IDC between decorrelation signals for the pair of channels. In this implementation, block 820 involves applying one or more of the decorrelation filters determined in block 806*a* to at least a portion of the received audio data, to produce filtered audio data. The filtered audio data may, for example, correspond with the decorrelation signals 227 produced by the decorrelation signal generator 218, as described above with reference to FIGS. 2E and 4.

In some four-channel examples, block 820 may involve applying a first decorrelation filter to audio data for a first and second channel to produce first channel filtered data and second channel filtered data, and applying a second decorrelation filter to audio data for a third and fourth channel to produce third channel filtered data and fourth channel filtered data. For example, the first channel may be a left channel, the second channel may be a right channel, the third channel may be a left surround channel and the fourth channel may be a right surround channel.

The decorrelation filters may be applied either before or after audio data is upmixed, depending on the particular implementation. In some implementations, for example, a decorrelation filter may be applied to a coupling channel of the audio data. Subsequently, a scaling factor appropriate for each channel may be applied. Some examples are described below with reference to FIG. 8C.

Figure 8C:
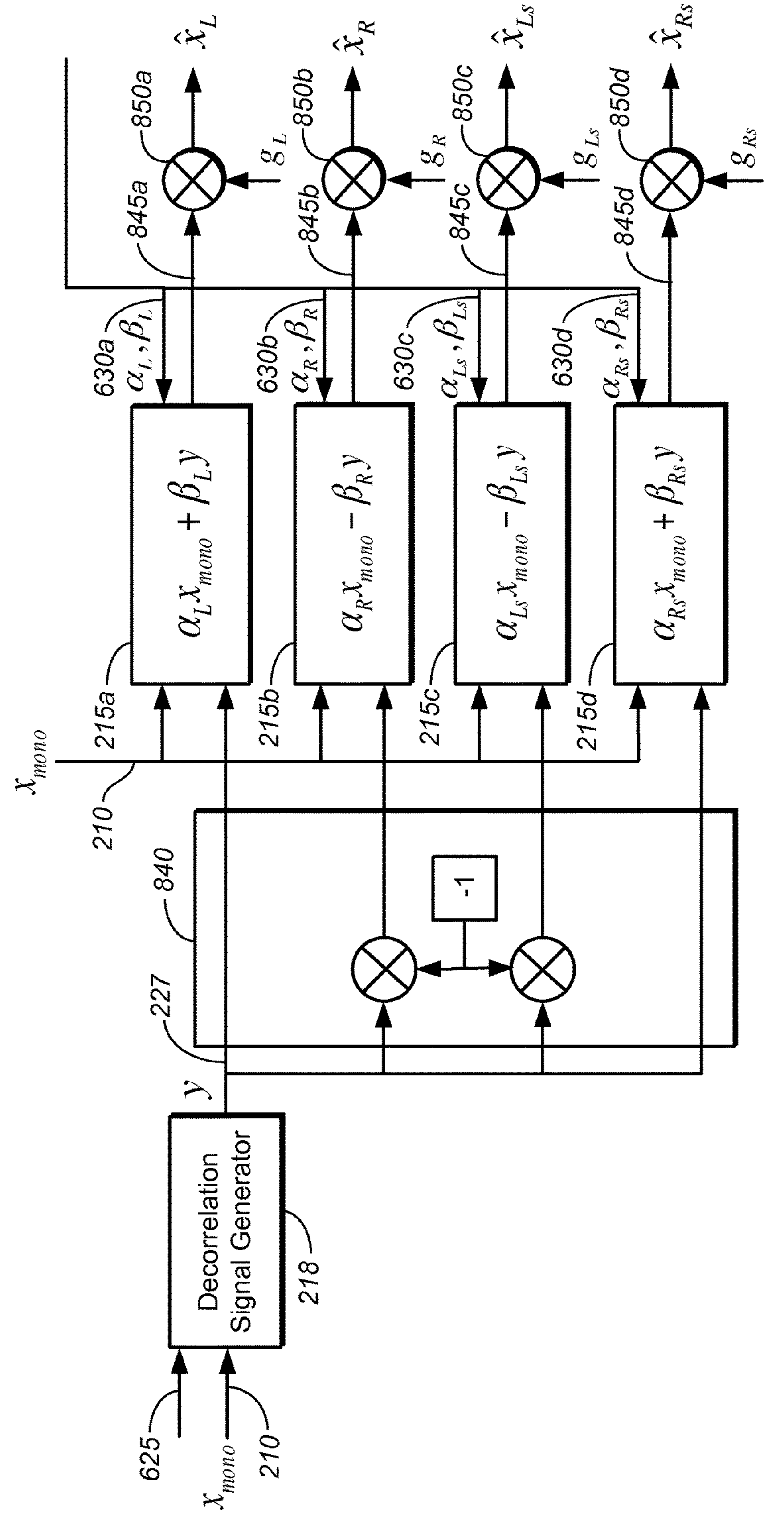
FIGS. 8C and 8D are a block diagrams that illustrate components that may be used for implementing some sign-flip methods.
Figure 8D:
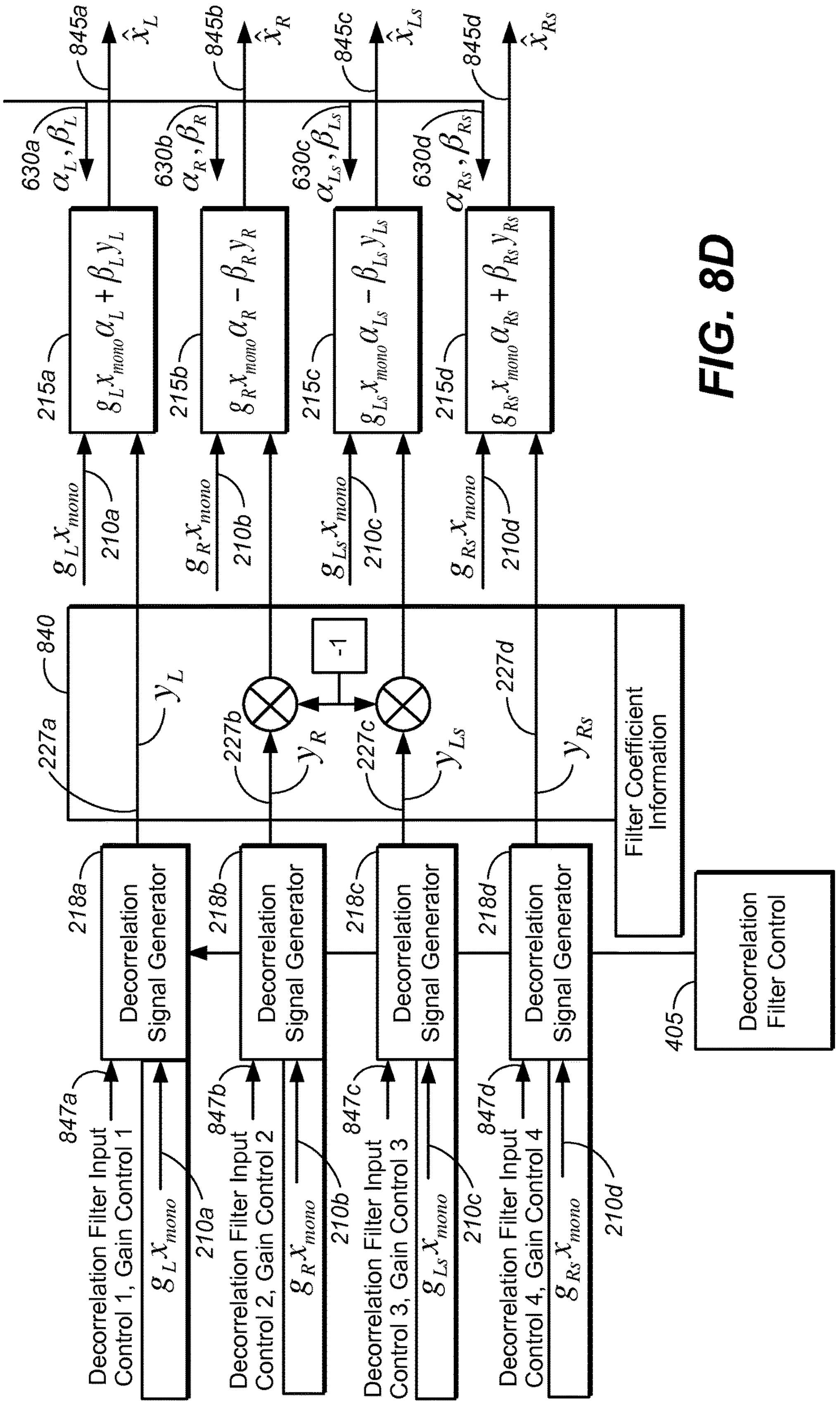

FIGS. 8C and 8D are a block diagrams that illustrate components that may be used for implementing some sign-flip methods. Referring first to FIG. 8B, in this implementation a decorrelation filter is applied to a coupling channel of input audio data in block 820. In the example shown in FIG. 8C, the decorrelation signal generator control information 625 and the audio data 210, which includes frequency domain representations corresponding to the coupling channel, are received by the decorrelation signal generator 218. In this example, the decorrelation signal generator 218 outputs decorrelation signals 227 that are the same for all channels that will be decorrelated.

The process 808*a* of FIG. 8B may involve performing operations on the filtered audio data to produce decorrelation signals that have a specific inter-decorrelation signal coherence IDC between decorrelation signals for at least one pair of channels. In this implementation, block 825 involves applying a polarity to the filtered audio data produced in block 820. In this example, the polarity applied in block 820 was determined in block 806*a*. In some implementations, block 825 involves reversing a polarity between filtered audio data for adjacent channels. For example, block 825 may involve multiplying filtered audio data corresponding to a left-side channel or a right-side channel by −1. Block 825 may involve reversing a polarity of filtered audio data corresponding to a left surround channel with reference to the filtered audio data corresponding to the left-side channel. Block 825 also may involve reversing a polarity of filtered audio data corresponding to a right surround channel with reference to the filtered audio data corresponding to the right-side channel. In the four-channel example described above, block 825 may involve reversing a polarity of the first channel filtered data relative to the second channel filtered data and reversing a polarity of the third channel filtered data relative to the fourth channel filtered data.

In the example shown in FIG. 8C, the decorrelation signals 227, which are also denoted as y, are received by the polarity reversing module 840. The polarity reversing module 840 is configured to reverse the polarity of decorrelation signals for adjacent channels. In this example, the polarity reversing module 840 is configured to reverse the polarity of decorrelation signals for the right channel and the left surround channel. However, in other implementations, the polarity reversing module 840 may be configured to reverse the polarity of decorrelation signals for other channels. For example, the polarity reversing module 840 may be configured to reverse the polarity of decorrelation signals for the left channel and the right surround channel. Other implementations may involve reversing the polarity of decorrelation signals for yet other channels, depending on the number of channels involved and their spatial relationships.

The polarity reversing module 840 provides the decorrelation signals 227, including the sign-flipped decorrelation signals 227, to channel-specific mixers 215*a*-215*d*. The channel-specific mixers 215*a*-215*d* also receive direct, unfiltered audio data 210 of the coupling channel and output-channel-specific spatial parameter information 630*a*-630*d*. Alternatively, or additionally, in some implementations the channel-specific mixers 215*a*-215*d* may receive the modified mixing coefficients 890 that are described below with reference to FIG. 8F. In this example, the output-channel-specific spatial parameter information 630*a*-630*d* has been modified according to transient data, e.g., according to input from a transient control module such as that depicted in FIG. 6C. Examples of modifying spatial parameters according to transient data are provided below.

In this implementation, the channel-specific mixers 215*a*-215*d* mix the decorrelation signals 227 with the direct audio data 210 of the coupling channel according to the output-channel-specific spatial parameter information 630*a*-630*d* and outputs the resulting output-channel-specific mixed audio data 845*a*-845*d* to the gain control modules 850*a*-850*d*. In this example, the gain control modules 850*a*-850*d* are configured to apply output-channel-specific gains, also referred to herein as scaling factors, to the output-channel-specific mixed audio data 845*a*-845*d*.

An alternative sign-flip method will now be described with reference to FIG. 8D. In this example, channel-specific decorrelation filters, based at least in part on the channel-specific decorrelation control information 847*a*-847*d*, are applied by the decorrelation signal generators 218*a*-218*d* to the audio data 210*a*-210*d*. In some implementations, decorrelation signal generator control information 847*a*-847*d* may be received in a bitstream along with audio data, whereas in other implementations decorrelation signal generator control information 847*a*-847*d* may be generated locally (at least in part), e.g., by the decorrelation filter control module 405. Here, the decorrelation signal generators 218*a*-218*d* also may generate the channel-specific decorrelation filters according to decorrelation filter coefficient information received from the decorrelation filter control module 405. In some implementations a single filter description may be generated by the decorrelation filter control module 405, which is shared by all channels.

In this example, a channel-specific gain/scaling factor has been applied to the audio data 210*a*-210*d* before the audio data 210*a*-210*d* are received by the decorrelation signal generators 218*a*-218*d*. For example, if the audio data has been encoded according to the AC-3 or E-AC-3 audio codecs, the scaling factors may be coupling coordinates or "cplcoords" that are encoded with the rest of the audio data and received in a bitstream by an audio processing system such as a decoding device. In some implementations, cplcoords also may be the basis for the output-channel-specific scaling factors applied by the gain control modules 850*a*-850*d* to the output-channel-specific mixed audio data 845*a*-845*d* (see FIG. 8C).

Accordingly, the decorrelation signal generators 218*a*-218*d* output channel-specific decorrelation signals 227*a*-227*d* for all channels that will be decorrelated. The decorrelation signals 227*a*-227*d* are also referenced as $y_L$, $y_R$, $y_{LS}$ and $y_{RS}$, respectively, in FIG. 8D.

The decorrelation signals 227*a*-227*d* are received by the polarity reversing module 840. The polarity reversing module 840 is configured to reverse the polarity of decorrelation signals for adjacent channels. In this example, the polarity reversing module 840 is configured to reverse the polarity of decorrelation signals for the right channel and the left surround channel. However, in other implementations, the polarity reversing module 840 may be configured to reverse the polarity of decorrelation signals for other channels. For example, the polarity reversing module 840 may be configured to reverse the polarity of decorrelation signals for the left and right surround channels. Other implementations may involve reversing the polarity of decorrelation signals for yet other channels, depending on the number of channels involved and their spatial relationships.

The polarity reversing module 840 provides the decorrelation signals 227*a*-227*d*, including the sign-flipped decorrelation signals 227*b* and 227*c*, to channel-specific mixers 215*a*-215*d*. Here, the channel-specific mixers 215*a*-215*d* also receive direct audio data 210*a*-210*d* and output-channel-specific spatial parameter information 630*a*-630*d*. In this example, the output-channel-specific spatial parameter information 630*a*-630*d* has been modified according to transient data.

In this implementation, the channel-specific mixers 215*a*-215*d* mix the decorrelation signals 227 with the direct audio data 210*a*-210*d* according to the output-channel-specific spatial parameter information 630*a*-630*d* and outputs the output-channel-specific mixed audio data 845*a*-845*d*.

Alternative methods for restoring the spatial relationship between discrete input channels are provided herein. The methods may involve systematically determining synthesizing coefficients to determine how decorrelation or reverb signals will be synthesized. According to some such methods, the optimal IDCs are determined from alphas and target ICCs. Such methods may involve systematically synthesizing a set of channel-specific decorrelation signals according to the IDCs that are determined to be optimal.

An overview of some such systematic methods will now be described with reference to FIGS. 8E and 8F. Further details, including the underlying mathematical formulas of some examples, will be described thereafter.

Figure 8E:
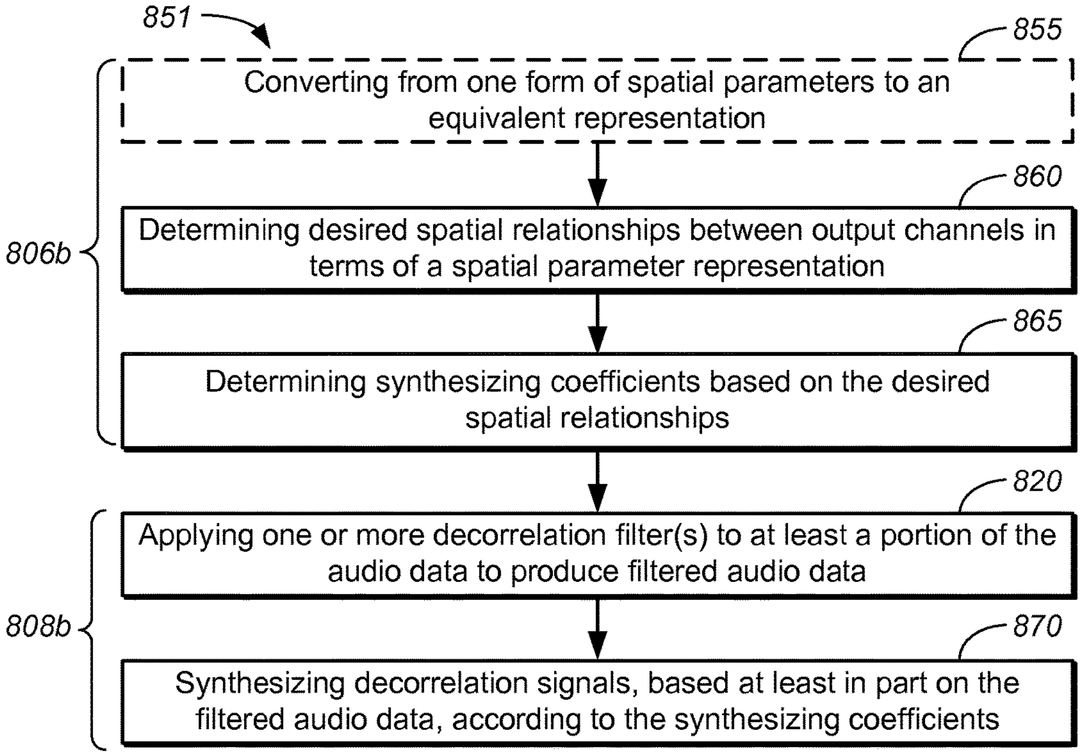
FIG. 8E is a flow diagram that illustrates blocks of a method of determining synthesizing coefficients and mixing coefficients from spatial parameter data.
Figure 8F:
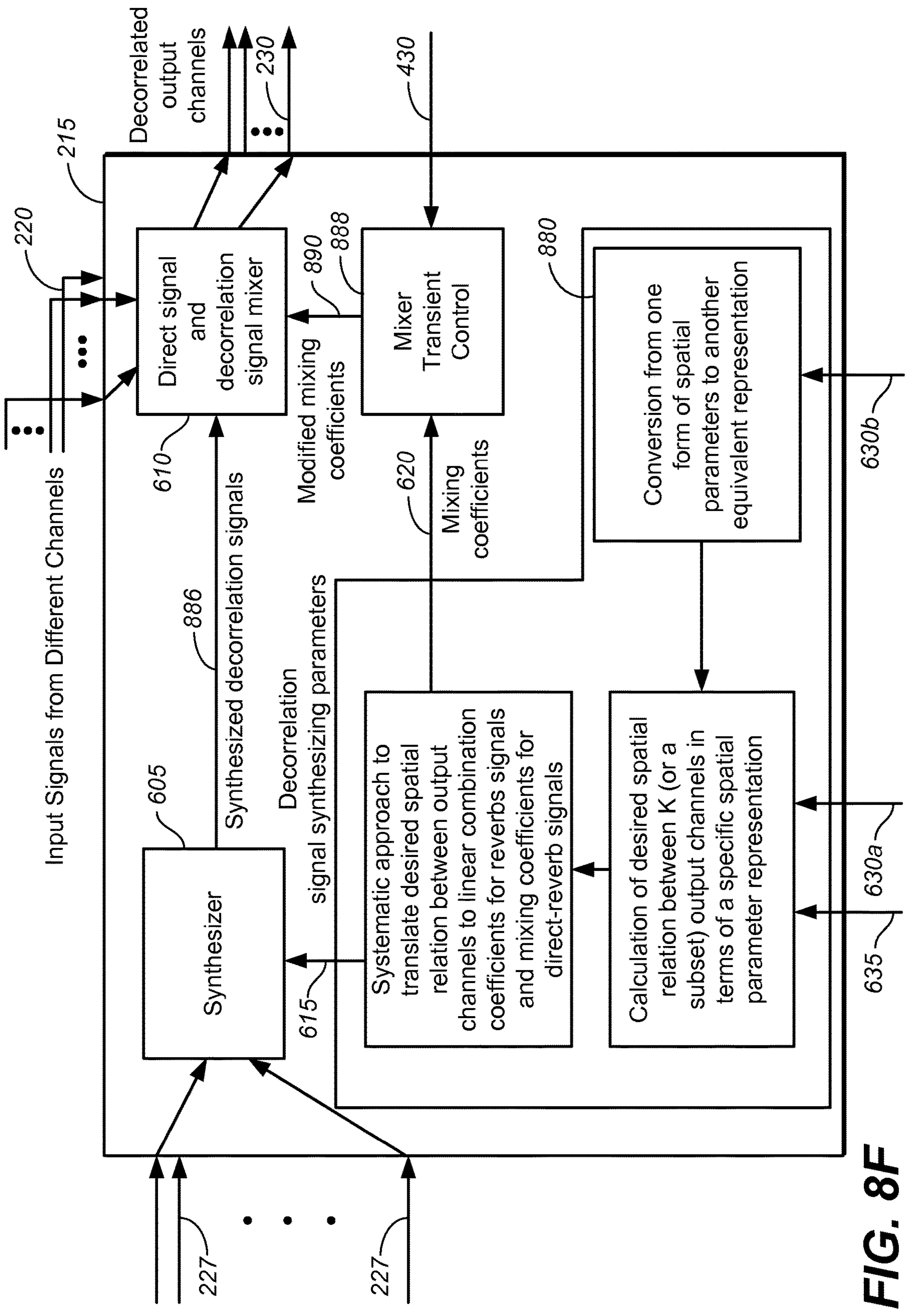
FIG. 8F is a block diagram that shows examples of mixer components.

FIG. 8E is a flow diagram that illustrates blocks of a method of determining synthesizing coefficients and mixing coefficients from spatial parameter data. FIG. 8F is a block diagram that shows examples of mixer components. In this example, method 851 begins after blocks 802 and 804 of FIG. 8A. Accordingly, the blocks shown in FIG. 8E may be considered further examples of the "determining" block 806 and the "applying" block 808 of FIG. 8A. Therefore, blocks 855-865 of FIG. 8E are labeled as "806*b*" and blocks 820 and 870 are labeled as "808*b*."

However, in this example, the decorrelation processes determined in block 806 may involve performing operations on the filtered audio data according to synthesizing coefficients. Some examples are provided below.

Optional block 855 may involve converting from one form of spatial parameters to an equivalent representation. Referring to FIG. 8F, for example, synthesizing and mixing coefficient generating module 880 may receive spatial parameter information 630*b*, which includes information describing spatial relationships between N input channels, or a subset of these spatial relationships. The module 880 may be configured to convert at least some of the spatial parameter information 630*b* from one form of spatial parameters to an equivalent representation. For example, alphas may be converted to ICCs or vice versa.

In alternative audio processing system implementations, at least some of the functionality of the synthesizing and mixing coefficient generating module 880 may be performed by elements other than the mixer 215. For example, in some alternative implementations, at least some of the functionality of the synthesizing and mixing coefficient generating module 880 may be performed by a control information receiver/generator 640 such as that shown in FIG. 6C and described above.

In this implementation, block 860 involves determining a desired spatial relationship between output channels in terms of a spatial parameter representation. As shown in FIG. 8F, in some implementations the synthesizing and mixing coefficient generating module 880 may receive the downmix/upmix information 635, which may include information corresponding to the mixing information 266 received by the N-to-M upmixer/downmixer 262 and/or the mixing information 268 received by the M-to-K upmixer/downmixer 264 of FIG. 2E. The synthesizing and mixing coefficient generating module 880 also may receive spatial parameter information 630*a*, which includes information describing spatial relationships between K output channels, or a subset of these spatial relationships. As described above with reference to FIG. 2E, the number of input channels may or may not equal the number of output channels. The module 880 may be configured to calculate a desired spatial relationship (for example, an ICC) between at least some pairs of the K output channels.

In this example, block 865 involves determining synthesizing coefficients based on the desired spatial relationships Mixing coefficients may also be determined, based at least in part on the desired spatial relationships. Referring again to FIG. 8F, in block 865 the synthesizing and mixing coefficient generating module 880 may determine the decorrelation signal synthesizing parameters 615 according to the desired spatial relationships between output channels. The synthesizing and mixing coefficient generating module 880 also may determine the mixing coefficients 620 according to the desired spatial relationships between output channels.

The synthesizing and mixing coefficient generating module 880 may provide the decorrelation signal synthesizing parameters 615 to the synthesizer 605. In some implementations, the decorrelation signal synthesizing parameters 615 may be output-channel-specific. In this example, the synthesizer 605 also receives the decorrelation signals 227, which may be produced by a decorrelation signal generator 218 such as that shown in FIG. 6A.

In this example, block 820 involves applying one or more decorrelation filters to at least a portion of the received audio data, to produce filtered audio data. The filtered audio data may, for example, correspond with the decorrelation signals 227 produced by the decorrelation signal generator 218, as described above with reference to FIGS. 2E and 4.

Block 870 may involve synthesizing decorrelation signals according to the synthesizing coefficients. In some implementations, block 870 may involve synthesizing decorrelation signals by performing operations on the filtered audio data produced in block 820. As such, the synthesized decorrelation signals may be considered a modified version of the filtered audio data. In the example shown in FIG. 8F, the synthesizer 605 may be configured to perform operations on the decorrelation signals 227 according to the decorrelation signal synthesizing parameters 615 and to output the synthesized decorrelation signals 886 to the direct signal and decorrelation signal mixer 610. Here, the synthesized decorrelation signals 886 are channel-specific synthesized decorrelation signals. In some such implementations, block 870 may involve multiplying the channel-specific synthesized decorrelation signals with scaling factors appropriate for each channel to produce scaled channel-specific synthesized decorrelation signals 886. In this example, the synthesizer 605 makes linear combinations of the decorrelation signals 227 according to the decorrelation signal synthesizing parameters 615.

The synthesizing and mixing coefficient generating module 880 may provide the mixing coefficients 620 to a mixer transient control module 888. In this implementation, the mixing coefficients 620 are output-channel-specific mixing coefficients. The mixer transient control module 888 may receive transient control information 430. The transient control information 430 may be received along with the audio data or may be determined locally, e.g., by a transient control module such as the transient control module 655 shown in FIG. 6C. The mixer transient control module 888 may produce modified mixing coefficients 890, based at least in part on the transient control information 430, and may provide the modified mixing coefficients 890 to the direct signal and decorrelation signal mixer 610.

The direct signal and decorrelation signal mixer 610 may mix the synthesized decorrelation signals 886 with the direct, unfiltered audio data 220. In this example, the audio data 220 includes audio data elements corresponding to N input channels. The direct signal and decorrelation signal mixer 610 mixes the audio data elements and the channel-specific synthesized decorrelation signals 886 on an output-channel-specific basis and outputs decorrelated audio data 230 for N or M output channels, depending on the particular implementation (see, e.g., FIG. 2E and the corresponding description).

Following are detailed examples of some of the processes of method 851. Although these methods are described, at least in part, with reference to features of the AC-3 and E-AC-3 audio codecs, the methods have wide applicability to many other audio codecs.

The goal of some such methods is to reproduce all ICCs (or a selected set of ICCs) precisely, in order to restore the spatial characteristics of the source audio data that may have been lost due to channel coupling. The functionality of a mixer may be formulated as:

$$y_i=g_i\left[\alpha_i x+\sqrt{1-|\alpha_i|^2}D_i(x)\right],\forall i \qquad \text{(Equation 1)}$$

In Equation 1, x represents a coupling channel signal, $\alpha_i$ represents the spatial parameter alpha for channel I, $g_i$ represents the "cplcoord" (corresponding to a scaling factor) for channel I, $y_i$ represents the decorrelated signal and $D_i(x)$ represents the decorrelation signal generated from decorrelation filter $D_i$. It is desirable for the output of the decorrelation filter to have the same spectral power distribution as the input audio data, but to be uncorrelated to the input audio data. According to the AC-3 and E-AC-3 audio codecs, cplcoords and alphas are per coupling channel frequency band, while the signals and the filter are per frequency bin. Also, the samples of the signals correspond to the blocks of the filterbank coefficients. These time and frequency indices are omitted here for the sake of simplicity.

The alpha values represent the correlation between discrete channels of the source audio data and the coupling channel, which may be expressed as follows:

$$\alpha_i=\frac{E[s_i x^*]}{\sqrt{E\{|x|^2\}E\{|s_i|^2\}}} \qquad \text{(Equation 2)}$$

In Equation 2, E represents the expectation value of the term(s) within the curly brackets, x* represents the complex conjugate of x and $s_i$ represents a discrete signal for the channel I.

The inter-channel coherence or ICC between a pair of decorrelated signals can be derived as follows:

$$ICC_{i1,i2}^{output}=\frac{E\{y_{i1}y_{i2}^*\}}{\sqrt{E\{|y_{i1}|^2\}E\{|y_{i2}|^2\}}}=\left(\alpha_{i1}\alpha_{i1}^*+\sqrt{1-|\alpha_{i1}|^2}\sqrt{1-|\alpha_{i2}|^2}\,IDC_{i1,i2}\right) \qquad \text{(Equation 3)}$$

In Equation 3, $IDC_{i1,i2}$ represents the inter-decorrelation-signal coherence ("IDC") between $D_{i1}(x)$ and $D_{i2}(x)$. With fixed alphas, the ICC is maximized when IDC is +1 and minimized when IDC is −1. When the ICC of the source audio data is known, the optimal IDC required to replicate it can be solved as:

$$IDC_{i1,i2}^{opt}=\frac{ICC_{i1,i2}-\alpha_{i1}\alpha_{i2}^*}{\sqrt{1-|\alpha_{i1}|^2}\sqrt{1-|\alpha_{i2}|^2}} \qquad \text{(Equation 4)}$$

The ICC between the decorrelated signals may be controlled by selecting decorrelation signals that satisfy the optimal IDC conditions of Equation 4. Some methods of generating such decorrelation signals will be discussed below. Before that discussion, it may be useful to describe the relationships between some of these spatial parameters, particularly that between ICCs and alphas.

As noted above with reference to optional block 855 of method 851, some implementations provided herein may involve converting from one form of spatial parameters to an equivalent representation. In some such implementations, optional block 855 may involve converting from alphas to ICCs or vice versa. For example, alphas may be uniquely determined if both the cplcoords (or comparable scaling factors) and ICCs are known.

A coupling channel may be generated as follows:

$$x=g_x\sum_{\forall i}s_i \qquad \text{(Equation 5)}$$

In Equation 5, $s_i$ represents the discrete signal for channel i involved in the coupling and $g_x$ represents an arbitrary gain adjustment applied on x. By replacing the x term of Equation 2 with the equivalent expression of Equation 5, an alpha for channel i can be expressed as follows:

$$\alpha_i = \frac{E\{s_i x^*\}}{\sqrt{E\{|x|^2\}E\{|s_i|^2\}}} = \frac{g_x \sum_{\forall j} E\{s_i s_j^*\}}{\sqrt{E\{|x|^2\}E\{|s_i|^2\}}}$$

The power of each discrete channel can be represented by the power of the coupling channel and the power of the corresponding cplcoord as follows:

$$E\{|s_i|^2\} = g_i^2 E\{|x|^2\}$$

The cross-correlation terms can be substituted as follows:

$$E\{s_i s_j^*\} = g_i g_j E\{|x|^2\} ICC_{i,j}$$

Therefore, the alphas may be expressed in this manner:

$$\alpha_i = g_x \sum_{\forall j} g_j ICC_{i,j} = g_x\left(g_i + \sum_{j \neq i} g_j ICC_{i,j}\right)$$

Based on Equation 5, the power of x may be expressed as follows:

$$\begin{aligned} E\{|x|^2\} &= g_x^2 E\left\{\left|\sum_{\forall i} s_i\right|^2\right\} \\ &= g_x^2 \sum_{\forall i}\sum_{\forall j} E\{s_i s_j^*\} \\ &= g_x^2 E\{|x|^2\} \sum_{\forall i}\sum_{\forall j} g_i g_j ICC_{i,j} \end{aligned}$$

Therefore, the gain adjustment $g_x$ may be expressed as follows:

$$g_x = \frac{1}{\sqrt{\sum_{\forall i}\sum_{\forall j} g_i g_j ICC_{i,j}}} = \frac{1}{\sqrt{\sum_{\forall i} g_i^2 + \sum_{\forall i}\sum_{j \neq i} g_i g_j ICC_{i,j}}}$$

Accordingly, if all cplcoords and ICCs are known, alphas can be computed according to the following expression:

$$\alpha_i = \frac{g_i + \sum_{j \neq i} g_j ICC_{i,j}}{\sqrt{\sum_{\forall j} g_j^2 + \sum_{\forall j}\sum_{k \neq j} g_j g_k ICC_{j,k}}}, \forall i \quad \text{(Equation 6)}$$

As noted above, the ICC between decorrelated signals may be controlled by selecting decorrelation signals that satisfy Equation 4. In the stereo case, a single decorrelation filter may be formed that generates decorrelation signals uncorrelated to the coupling channel signal. The optimal IDC of −1 can be achieved by simply sign-flipping, e.g., according to one of the sign-flip methods described above.

However, the task of controlling ICCs for multichannel cases is more complex. In addition to ensuring that all decorrelation signals are substantially uncorrelated to the coupling channel, the IDCs among the decorrelation signals also should satisfy Equation 4.

In order to generate decorrelation signals with the desired IDCs, a set of mutually uncorrelated "seed" decorrelation signals may first be generated. For example, the decorrelation signals 227 may be generated according to methods described elsewhere herein. Subsequently, the desired decorrelation signals may be synthesized by linearly combining these seeds with proper weights. An overview of some examples is described above with reference to FIGS. 8E and 8F.

It may be challenging to generate many high-quality and mutually-uncorrelated (e.g., orthogonal) decorrelation signals from one downmix. Furthermore, calculating the proper combination weights may involve matrix inversion, which could pose challenges in terms of complexity and stability.

Accordingly, in some examples provided herein, an "anchor-and-expand" process may be implemented. In some implementations, some IDCs (and ICCs) may be more significant than others. For example, lateral ICCs may be perceptually more important than diagonal ICCs. In a Dolby 5.1 channel example, the ICCs for the L-R, L-Ls, R-Rs and Ls-Rs channel pairs may be perceptually more important than the ICCs for the L-Rs and R-Ls channel pairs. Front channels may be perceptually more important than rear or surround channels.

In some such implementations, the terms of Equation 4 for the most important IDC can be first satisfied by combining two orthogonal (seed) decorrelation signals to synthesize the decorrelation signals for the two channels involved. Then, using these synthesized decorrelation signals as anchors and adding new seeds, the terms of Equation 4 for the secondary IDCs can be satisfied and the corresponding decorrelation signals can be synthesized. This process may be repeated until the terms of Equation 4 are satisfied for all of the IDCs. Such implementations allow the use of decorrelation signals of higher quality to control relatively more critical ICCs.

Figure 9:
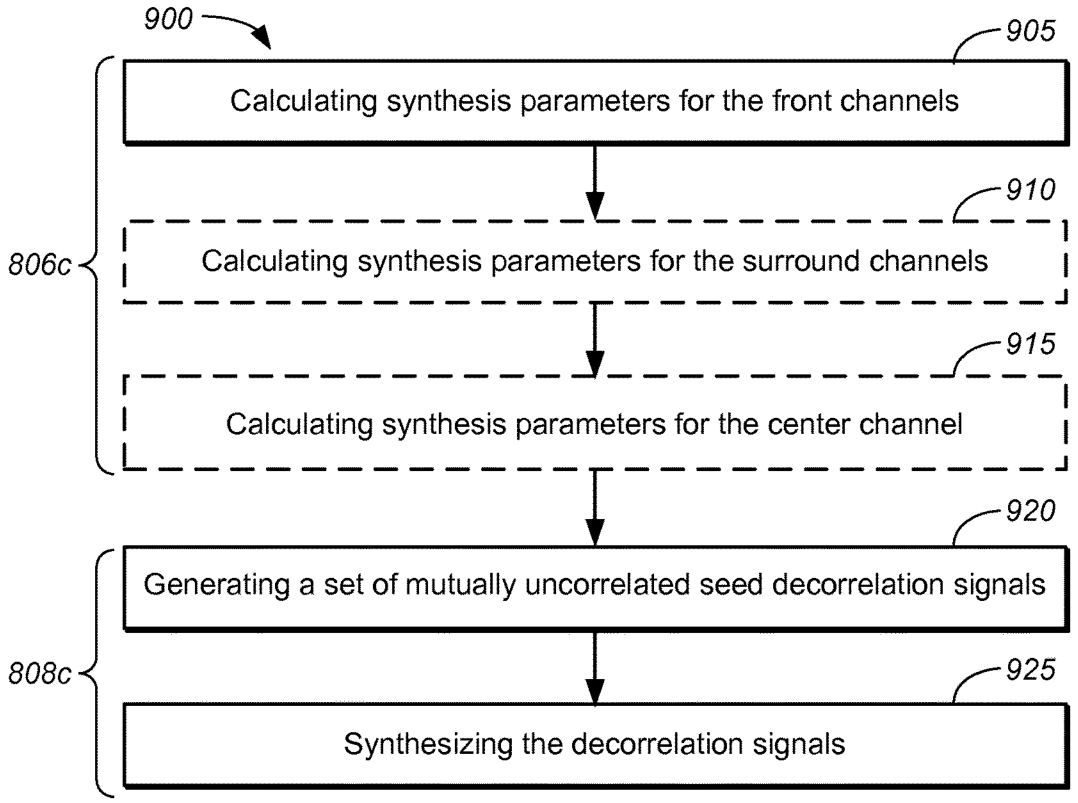
FIG. 9 is a flow diagram that outlines a process of synthesizing decorrelation signals in multichannel cases.

FIG. 9 is a flow diagram that outlines a process of synthesizing decorrelation signals in multichannel cases. The blocks of method 900 may be considered as further examples of the "determining" process of block 806 of FIG. 8A and the "applying" process of block 808 of FIG. 8A. Accordingly, in FIG. 9 blocks 905-915 are labeled as "806*c*" and blocks 920 and 925 of method 900 are labeled as "808*c*." Method 900 provides an example in a 5.1 channel context. However, method 900 has wide applicability to other contexts.

In this example, blocks 905-915 involve calculating synthesis parameters to be applied to a set of mutually uncorrelated seed decorrelation signals, $D_{ni}(x)$, that are generated in block 920. In some 5.1 channel implementations, i={1, 2, 3, 4}. If the center channel will be decorrelated, a fifth seed decorrelation signal may be involved. In some implementations, uncorrelated (orthogonal) decorrelation signals, $D_{ni}(x)$ may be generated by inputting the mono downmix signal into several different decorrelation filters. Alternatively, the initial upmixed signals can each be inputted into a unique decorrelation filter. Various examples are provided below.

As noted above, front channels may be perceptually more important than rear or surround channels. Therefore, in method 900, the decorrelation signals for L and R channels are jointly anchored on the first two seeds, then the decorrelation signals for Ls and Rs channels are synthesized using these anchors and the remaining seeds.

In this example, block 905 involves calculating synthesis parameters p and $\rho_r$ for the front L and R channels. Here, ρ and $\rho_r$ are derived from the L-R IDC as:

$$\rho = \sqrt{\frac{1+\sqrt{1-|IDC_{L,R}|^2}}{2}} \quad \text{(Equation 7)}$$

$$\rho_r = \exp(j\angle IDC_{L,R})\sqrt{1-\rho^2}$$

Therefore, block 905 also involves calculating the L-R IDC from Equation 4. Accordingly, in this example, ICC information is used to calculate the L-R IDC. Other processes of the method also may use ICC values as input. ICC values may be obtained from the coded bitstream or by estimation at the decoder side, e.g., based on uncoupled lower-frequency or higher-frequency bands, cplcoords, alphas, etc.

The synthesis parameters ρ and $\rho_r$ may be used to synthesize the decorrelation signals for the L and R channels in block 925. The decorrelation signals for the Ls and Rs channels may be synthesized using the decorrelation signals for the L and R channels as anchors.

In some implementations, it may be desirable to control the Ls-Rs ICC. According to method 900, synthesizing intermediate decorrelation signals $D'_{Ls}(x)$ and $D'_{Rs}(x)$ with two of the seed decorrelation signals involves calculating the synthesis parameters σ and $\sigma_r$. Therefore, optional block 910 involves calculating the synthesis parameters σ and $\sigma_r$ for the surround channels. It can be derived that the required correlation coefficient between intermediate decorrelation signals $D'_{Ls}(x)$ and $D'_{Rs}(x)$ may be expressed as follows:

$$C_{D'_{Ls},D'_{Rs}} = \frac{IDC_{Ls,Rs} - IDC_{L,R}IDC^*_{L,Ls}IDC_{R,Rs}}{\sqrt{1-|IDC_{L,Ls}|^2}\sqrt{1-|IDC_{R,Rs}|^2}}$$

The variables σ and $\sigma_r$ may be derived from their correlation coefficient:

$$\sigma = \sqrt{\frac{1+\sqrt{1-|C_{D'_{Ls},D'_{Rs}}|^2}}{2}}$$

$$\sigma_r = \exp(j\angle C_{D'_{Ls},D'_{Rs}})\sqrt{1-\sigma^2}$$

Therefore, $D'_{Ls}(x)$ and $D'_{Rs}(x)$ can be defined as:

$$D'_{Ls}(x)=\sigma D_{n3}(x)+\sigma_r D_{n4}(x)$$

$$D'_{Rs}(x)=\sigma D_{n4}(x)+\sigma_r D_{n3}(x)$$

However, if the Ls-Rs ICC is not a concern, the correlation coefficient between $D'_{Ls}(x)$ and $D'_{Rs}(x)$ can be set to −1. Accordingly, the two signals can simply be sign-flipped versions of each other constructed by the remaining seed decorrelation signals.

The center channel may or may not be decorrelated, depending on the particular implementation. Accordingly, block 915's process of calculating synthesis parameters $t_1$ and $t_2$ for the center channel is optional. Synthesis parameters for the center channel may be calculated, for example, if controlling the L-C and R-C ICCs is desirable. If so, a fifth seed, $D_{n5}(x)$ can be added and the decorrelation signal for the C channel may be expressed as follows:

$$D_c(x)=t_1D_{n1}(x)+t_2D_{n2}(x)+\sqrt{1-|t_1|^2-|t_2|^2}D_{n5}(x)$$

In order to achieve the desired L-C and R-C ICCs, Equation 4 should be satisfied for the L-C and R-C IDCs:

$$IDC_{L,C}=\rho t_1^*+\rho_r t_2^*$$

$$IDC_{R,C}=\rho_r t_1^*+\rho t_2^*$$

The asterisks indicate complex conjugates. Accordingly, synthesis parameters $t_1$ and $t_2$ for the center channel may be expressed as follows:

$$t_1 = \left(\frac{\rho IDC_{L,C} - \rho_r IDC_{R,C}}{\rho^2 - \rho_r^2}\right)^*$$

$$t_2 = \left(\frac{\rho IDC_{R,C} - \rho_r IDC_{L,C}}{\rho^2 - \rho_r^2}\right)^*$$

In block 920, a set of mutually uncorrelated seed decorrelation signals, $D_{ni}(x)$, i={1, 2, 3, 4}, may be generated. If the center channel will be decorrelated, a fifth seed decorrelation signal may be generated in block 920. These uncorrelated (orthogonal) decorrelation signals, $D_{ni}(x)$ may be generated by inputting the mono downmix signal into several different decorrelation filters.

In this example, block 925 involves applying the above-derived terms to synthesize decorrelation signals, as follows:

$$D_L(x)=\rho D_{n1}(x)+\rho_r D_{n2}(x)$$

$$D_R(x)=\rho D_{n2}(x)+\rho_r D_{n1}(x)$$

$$D_{Ls}(x)=IDC_{L,Ls}{}^*\rho D_{n1}(x)+IDC_{L,Ls}{}^*\rho_r D_{n2}(x)+\sqrt{1-|IDC_{L,Ls}|^2}\sigma D_{n3}(X)+\sqrt{1-|IDC_{L,Ls}|^2}\sigma_r D_{n4}(x)$$

$$D_{Rs}(x)=IDC_{R,Rs}{}^*\rho D_{n2}(x)+IDC_{R,Rs}{}^*\rho_r D_{n1}(x)+\sqrt{1-|IDC_{R,Rs}|^2}\sigma D_{n4}(X)+\sqrt{1-|IDC_{R,Rs}|^2}\sigma_r D_{n3}(x)$$

$$D_C(x)=t_1D_{n1}(x)+t_2D_{n2}(x)+\sqrt{1-|t_1|^2-|t_2|^2}D_{n5}(x)$$

In this example, the equations for synthesizing decorrelation signals for the Ls and Rs channels ($D_{Ls}(x)$ and $D_{Rs}(x)$) are dependent on the equations for synthesizing the decorrelation signals for the L and R channels ($D_L(x)$ and $D_R(x)$). In method 900, the decorrelation signals for the L and R channels are jointly anchored to mitigate potential left-right bias due to imperfect decorrelation signals.

In the example above, the seed decorrelation signals are generated from the mono downmix signal x in block 920. Alternatively, the seed decorrelation signals can be generated by inputting each initial upmixed signal into a unique decorrelation filter. In this case, the generated seed decorrelation signals would be channel-specific: $D_{ni}(g_i x)$, i={L, R, Ls, Rs, C}. These channel-specific seed decorrelation signals would generally have different power levels due to the upmixing process. Accordingly, it is desirable to align the power level among these seeds when combining them. To achieve this, the synthesizing equations for block 925 can be modified as follows:

$$D_L(x)=\rho D_{nL}(g_L x)+\rho_r\lambda_{L,R}D_{nR}(g_R x)$$

$$D_R(x)=\rho_{nR}(g_R x)+\rho_r\lambda_{R,L}D_{nL}(g_L x)$$

$$D_{Ls}(x)=IDC_{L,Ls}{}^{*}\rho\lambda_{Ls,L}D_{nL}(g_Lx)+IDC_{L,Ls}{}^{*}\rho_r\lambda_{Ls,R}D_{nR}(g_Rx)+\sqrt{1-|IDC_{L,Ls}|^2}\sigma D_{nLs}(g_{Ls}x)+\sqrt{1-|IDC_{L,Ls}|^2}\sigma_r\lambda_{Ls,Rs}D_{nRs}(g_{Rs}x)$$

$$D_{Rs}(x)=IDC_{R,Rs}{}^{*}\rho\lambda_{Rs,R}D_{nR}(g_Rx)+IDC_{R,Rs}{}^{*}\rho_r\lambda_{Rs,L}D_{nL}(g_Lx)+\sqrt{1-|IDC_{R,Rs}|^2}\sigma D_{nRs}(g_{Rs}x)+\sqrt{1-|IDC_{R,Rs}|^2}\sigma_r\lambda_{Rs,Ls}D_{nLs}(g_{Ls}x)$$

$$D_C(x)=t_1\lambda_{C,L}D_{nL}(g_Lx)+t_2\lambda_{C,R}D_{nR}(g_Rx)+\sqrt{1-|t_1|^2-|t_2|^2}D_{nC}(g_cx)$$

In the modified synthesizing equations, all synthesizing parameters remain the same. However, level adjusting parameters $\lambda_{i,j}$ are required to align the power level when using a seed decorrelation signal generated from channel j to synthesize the decorrelation signal for channel i. These channel-pair-specific level adjusting parameters can be computed based on the estimated channel level differences, such as:

$$\lambda_{i,j}=\sqrt{\frac{E\{|g_ix|^2\}}{E\{|g_jx|^2\}}}\text{ or }\frac{E\{g_i\}}{E\{g_j\}}$$

Furthermore, since the channel-specific scaling factors are already incorporated into the synthesized decorrelation signals in this case, the mixer equation for block 812 (FIG. 8A) should be modified from Equation 1 as:

$$y_i=\alpha_ig_ix+\sqrt{1-|\alpha_i|^2}D_i(x),\forall i$$

As noted elsewhere herein, in some implementations spatial parameters may be received along with audio data. The spatial parameters may, for example, have been encoded with the audio data. The encoded spatial parameters and audio data may be received in a bitstream by an audio processing system such as a decoder, e.g., as described above with reference to FIG. 2D. In that example, spatial parameters are received by the decorrelator 205 via explicit decorrelation information 240.

However, in alternative implementations, no encoded spatial parameters (or an incomplete set of spatial parameters) are received by the decorrelator 205. According to some such implementations, the control information receiver/generator 640, described above with reference to FIGS. 6B and 6C (or another element of an audio processing system 200), may be configured to estimate spatial parameters based on one or more attributes of the audio data. In some implementations, the control information receiver/generator 640 may include a spatial parameter module 665 that is configured for spatial parameter estimation and related functionality described herein. For example, the spatial parameter module 665 may estimate spatial parameters for frequencies in a coupling channel frequency range based on characteristics of audio data outside of the coupling channel frequency range. Some such implementations will now be described with reference to FIG. 10A et seq.

Figure 10A:
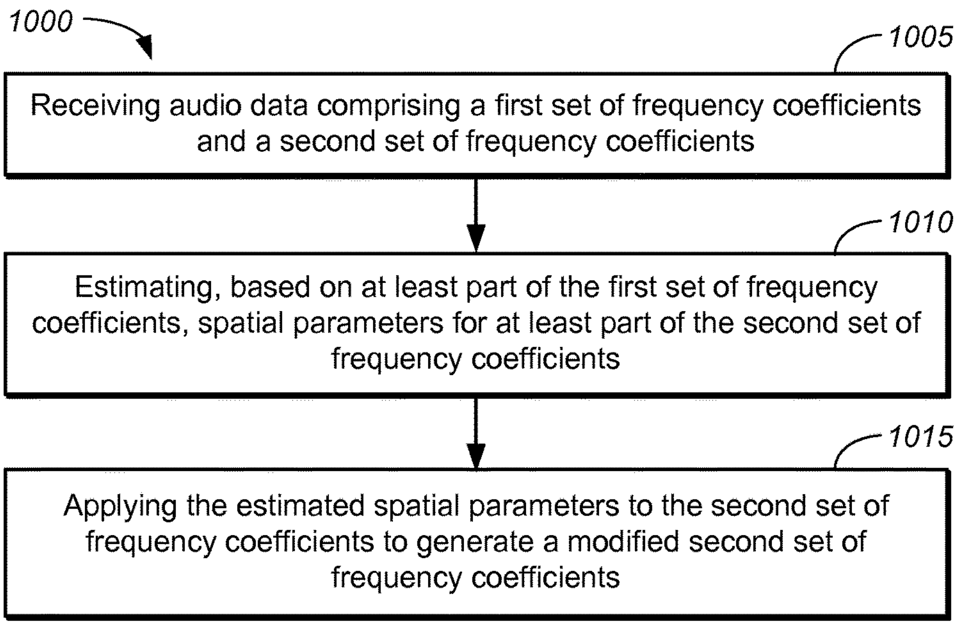
FIG. 10A is a flow diagram that provides an overview of a method for estimating spatial parameters.

FIG. 10A is a flow diagram that provides an overview of a method for estimating spatial parameters. In block 1005, audio data including a first set of frequency coefficients and a second set of frequency coefficients are received by an audio processing system. For example, the first and second sets of frequency coefficients may be results of applying a modified discrete sine transform, a modified discrete cosine transform or a lapped orthogonal transform to audio data in a time domain. In some implementations, the audio data may have been encoded according to a legacy encoding process. For example, the legacy encoding process may be a process of the AC-3 audio codec or the Enhanced AC-3 audio codec. Accordingly, in some implementations, the first and second sets of frequency coefficients may be real-valued frequency coefficients. However, method 1000 is not limited in its application to these codecs, but is broadly applicable to many audio codecs.

The first set of frequency coefficients may correspond to a first frequency range and the second set of frequency coefficients may correspond to a second frequency range. For example, the first frequency range may correspond to an individual channel frequency range and the second frequency range may correspond to a received coupling channel frequency range. In some implementations, the first frequency range may be below the second frequency range. However, in alternative implementations, the first frequency range may be above the second frequency range.

Referring to FIG. 2D, in some implementations the first set of frequency coefficients may correspond to the audio data 245*a* or 245*b*, which include frequency domain representations of audio data outside of a coupling channel frequency range. The audio data 245*a* and 245*b* are not decorrelated in this example, but may nonetheless be used as input for spatial parameter estimations performed by the decorrelator 205. The second set of frequency coefficients may correspond to the audio data 210 or 220, which includes frequency domain representations corresponding to a coupling channel. However, unlike the example of FIG. 2D, method 1000 may not involve receiving spatial parameter data along with the frequency coefficients for the coupling channel.

In block 1010 spatial parameters for at least part of the second set of frequency coefficients are estimated. In some implementations, the estimation is based upon one or more aspects of estimation theory. For example, the estimating process may be based, at least in part, on a maximum likelihood method, a Bayes estimator, a method of moments estimator, a minimum mean squared error estimator and/or a minimum variance unbiased estimator.

Some such implementations may involve estimating the joint probability density functions ("PDFs") of the spatial parameters of the lower frequencies and the higher frequencies. For instance, let us say we have two channels L and R and in each channel we have a low band in the individual channel frequency range and a high band in the coupling channel frequency range. We may thus have an ICC_lo which represents the inter-channel-coherence between the L and R channels in the individual channel frequency range, and an ICC_hi which exists in the coupling channel frequency range.

If we have a large training set of audio signals, we can segment them and for each segment ICC_lo and ICC_hi can be calculated. Thus we may have a large training set of ICC pairs (ICC_lo, ICC_hi). A joint PDF of this pair of parameters may be calculated as histograms and/or modeled via parametric models (for instance, Gaussian Mixture Models). This model could be a time-invariant model that is known at the decoder. Alternatively, the model parameters may be regularly sent to the decoder via the bitstream.

At the decoder, ICC_lo for a particular segment of received audio data may be calculated, e.g., according to how cross-correlation coefficients between individual channels and the composite coupling channel are calculated as described herein. Given this value of the ICC_lo and the model of the joint PDF of the parameters the decoder may try to estimate what ICC_hi is. One such estimate is the Maximum-likelihood ("ML") estimate, wherein the decoder may calculate the conditional PDF of ICC_hi given the value of ICC_lo. This conditional PDF is now essentially a positive-real-valued function that can be represented on an x-y axis, the x axis representing the continuum of ICC-hi values and the y axis representing the conditional probability of each such value. The ML estimate may involve choosing as the estimate of ICC_hi that value where this function peaks. On the other hand, the minimum-mean-squared-error ("MMSE") estimate is the mean of this conditional PDF, which is another valid estimate of ICC_hi. Estimation theory provides many such tools to come up with an estimate of ICC_hi.

The above two-parameter example is a very simple case. In some implementations there may be a larger number of channels as well as bands. The spatial parameters may be alphas or ICCs. Moreover, the PDF model may be conditioned on signal type. For example, there may be a different model for transients, a different model for tonal signals, etc.

In this example, the estimation of block 1010 is based at least in part on the first set of frequency coefficients. For example, the first set of frequency coefficients may include audio data for two or more individual channels in a first frequency range that is outside of a received coupling channel frequency range. The estimating process may involve calculating combined frequency coefficients of a composite coupling channel within the first frequency range, based on the frequency coefficients of the two or more channels. The estimating process also may involve computing cross-correlation coefficients between the combined frequency coefficients and frequency coefficients of the individual channels within the first frequency range. The results of the estimating process may vary according to temporal changes of input audio signals.

In block 1015, the estimated spatial parameters may be applied to the second set of frequency coefficients, to generate a modified second set of frequency coefficients. In some implementations, the process of applying the estimated spatial parameters to the second set of frequency coefficients may be part of a decorrelation process. The decorrelation process may involve generating a reverb signal or a decorrelation signal and applying it to the second set of frequency coefficients. In some implementations, the decorrelation process may involve applying a decorrelation algorithm that operates entirely on real-valued coefficients. The decorrelation process may involve selective or signal-adaptive decorrelation of specific channels and/or specific frequency bands.

Figure 10B:
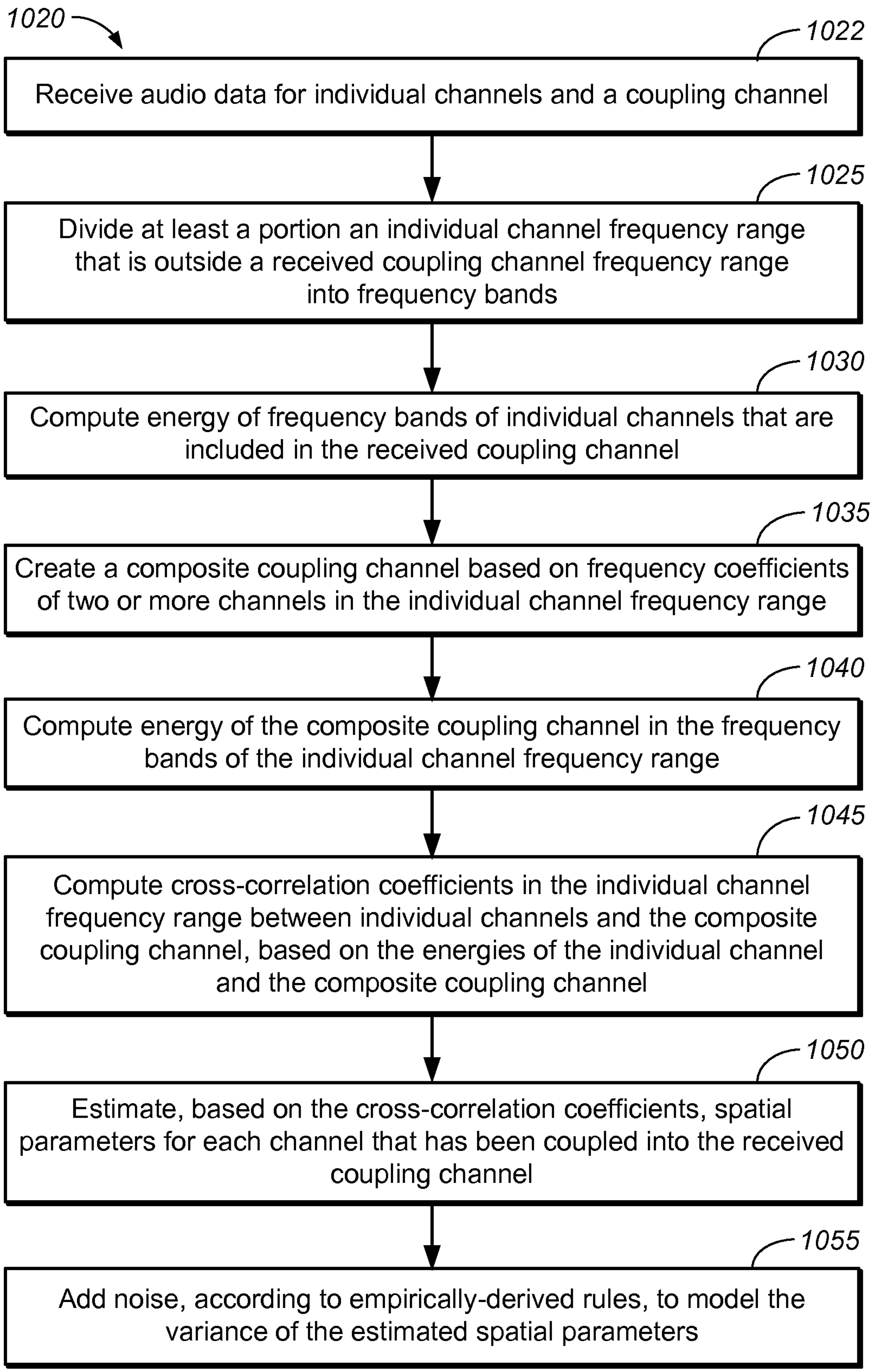
FIG. 10B is a flow diagram that provides an overview of an alternative method for estimating spatial parameters.

A more detailed example will now be described with reference to FIG. 10B. FIG. 10B is a flow diagram that provides an overview of an alternative method for estimating spatial parameters. Method 1020 may be performed by an audio processing system, such as a decoder. For example, method 1020 may be performed, at least in part, by a control information receiver/generator 640 such as the one that is illustrated in FIG. 6C.

In this example, the first set of frequency coefficients is in an individual channel frequency range. The second set of frequency coefficients corresponds to a coupling channel that is received by an audio processing system. The second set of frequency coefficients is in a received coupling channel frequency range, which is above the individual channel frequency range in this example.

Accordingly, block 1022 involves receiving audio data for the individual channels and for received coupling channel. In some implementations, the audio data may have been encoded according to a legacy encoding process. Applying spatial parameters that are estimated according to method 1000 or method 1020 to audio data of the received coupling channel may yield a more spatially accurate audio reproduction than that obtained by decoding the received audio data according to a legacy decoding process that corresponds with the legacy encoding process. In some implementations, the legacy encoding process may be a process of the AC-3 audio codec or the Enhanced AC-3 audio codec. Accordingly, in some implementations, block 1022 may involve receiving real-valued frequency coefficients but not frequency coefficients having imaginary values. However, method 1020 is not limited to these codecs, but is broadly applicable to many audio codecs.

In block 1025 of method 1020, at least a portion of the individual channel frequency range is divided into a plurality of frequency bands. For example, the individual channel frequency range may be divided into 2, 3, 4 or more frequency bands. In some implementations, each of the frequency bands may include a predetermined number of consecutive frequency coefficients, e.g., 6, 8, 10, 12 or more consecutive frequency coefficients. In some implementations, only part of the individual channel frequency range may be divided into frequency bands. For example, some implementations may involve dividing only a higher-frequency portion of the individual channel frequency range (relatively closer to the received coupled channel frequency range) into frequency bands. According to some E-AC-3-based examples, a higher-frequency portion of the individual channel frequency range may be divided into 2 or 3 bands, each of which includes 12 MDCT coefficients. According to some such implementations, only that portion of the individual channel frequency range that is above 1 kHz, above 1.5 kHz, etc. may be divided into frequency bands.

In this example, block 1030 involves computing the energy in the individual channel frequency bands. In this example, if an individual channel has been excluded from coupling, then the banded energy of the excluded channel will not be computed in block 1030. In some implementations, the energy values computed in block 1030 may be smoothed.

In this implementation, a composite coupling channel, based on audio data of the individual channels in the individual channel frequency range, is created in block 1035. Block 1035 may involve calculating frequency coefficients for the composite coupling channel, which may be referred to herein as "combined frequency coefficients." The combined frequency coefficients may be created using frequency coefficients of two or more channels in the individual channel frequency range. For example, if the audio data has been encoded according to the E-AC-3 codec, block 1035 may involve computing a local downmix of MDCT coefficients below the "coupling begin frequency," which is the lowest frequency in the received coupling channel frequency range.

The energy of the composite coupling channel, within each frequency band of the individual channel frequency range, may be determined in block 1040. In some implementations, the energy values computed in block 1040 may be smoothed.

In this example, block 1045 involves determining cross-correlation coefficients, which correspond to the correlation between frequency bands of the individual channels and corresponding frequency bands of the composite coupling channel. Here, computing cross correlation coefficients in block 1045 also involves computing the energy in the frequency bands of each of the individual channels and the energy in the corresponding frequency bands of the composite coupling channel. The cross-correlation coefficients may be normalized. According to some implementations, if an individual channel has been excluded from coupling, then frequency coefficients of the excluded channel will not be used in the computation of the cross-correlation coefficients.

Block 1050 involves estimating spatial parameters for each channel that has been coupled into the received coupling channel. In this implementation, block 1050 involves estimating the spatial parameters based on the cross-correlation coefficients. The estimating process may involve averaging normalized cross-correlation coefficients across all of the individual channel frequency bands. The estimating process also may involve applying a scaling factor to the average of the normalized cross-correlation coefficients to obtain the estimated spatial parameters for individual channels that have been coupled into the received coupling channel. In some implementations, the scaling factor may decrease with increasing frequency.

In this example, block 1055 involves adding noise to the estimated spatial parameters. The noise may be added to model the variance of the estimated spatial parameters. The noise may be added according to a set of rules corresponding to an expected prediction of the spatial parameter across frequency bands. The rules may be based on empirical data. The empirical data may correspond to observations and/or measurements derived from a large set of audio data samples. In some implementations, the variance of the added noise may be based on the estimated spatial parameter for a frequency band, a frequency band index and/or a variance of the normalized cross-correlation coefficients.

Some implementations may involve receiving or determining tonality information regarding the first or second set of frequency coefficients. According to some such implementations, the process of block 1050 and/or 1055 may be varied according to the tonality information. For example, if the control information receiver/generator 640 of FIG. 6B or FIG. 6C determines that the audio data in the coupling channel frequency range is highly tonal, the control information receiver/generator 640 may be configured to temporarily reduce the amount of noise added in block 1055.

In some implementations, the estimated spatial parameters may be estimated alphas for the received coupling channel frequency bands. Some such implementations may involve applying the alphas to audio data corresponding to the coupling channel, e.g., as part of a decorrelation process.

More detailed examples of the method 1020 will now be described. These examples are provided in the context of the E-AC-3 audio codec. However, the concepts illustrated by these examples are not limited to the context of the E-AC-3 audio codec, but instead are broadly applicable to many audio codecs.

In this example, the composite coupling channel is computed as a mixture of discrete sources:

$$x_D = g_x \sum_{\forall i} s_{Di} \quad \text{(Equation 8)}$$

In Equation 8, where $S_{Di}$ represents the row vector of a decoded MDCT transform of a specific frequency range ($k_{start} \ldots k_{end}$) of channel i, with $k_{end}=K_{CPL}$, the bin index corresponding to the E-AC-3 coupling begin frequency, the lowest frequency of the received coupling channel frequency range. Here, $g_x$ represents a normalization term that does not impact the estimation process. In some implementations, $g_x$ may be set to 1.

The decision regarding the number of bins analyzed between $k_{start}$ and $k_{end}$ may be based on a trade-off between complexity constraints and the desired accuracy of estimating alpha. In some implementations, $k_{start}$ may correspond to a frequency at or above a particular threshold (e.g., 1 kHz), such that audio data in a frequency range that is relatively closer to the received coupling channel frequency range are used, in order to improve the estimation of alpha values. The frequency region ($k_{start} \ldots k_{end}$) may be divided into frequency bands. In some implementations, cross-correlation coefficients for these frequency bands may be computed as follows:

$$cc_i(l) = \frac{E\{s_{D_i}(l)x_D^T(l)\}}{\sqrt{E\{|x_D(l)|^2\}E\{|s_{D_i}(l)|^2\}}} \quad \text{(Equation 9)}$$

In Equation 9, $s_{Di}(l)$ represents that segment of $S_{Di}$ that corresponds to band 1 of the lower frequency range, and $x_D(l)$ represents the corresponding segment of $x_D$. In some implementations, the expectation E{ } may be approximated using a simple pole-zero infinite impulse response ("IIR") filter, e.g., as follows:

$$\hat{E}\{y\}(n)=y(n)\cdot a+\hat{E}\{y\}(n-1)\cdot(1-a) \quad \text{(Equation 10)}$$

In Equation 10, $\hat{E}\{y\}(n)$ represents the estimate of E{y} using samples up to block n. In this example, $cc_i(l)$ is only computed for those channels that are in coupling for the current block. For the purpose of smoothing out the power estimation given only real-based MDCT coefficients, a value of a=0.2 was found to be sufficient. For transforms other than the MDCT, and specifically for complex transforms, a larger value of a may be used. In such cases, a value of a in the range of 0.2<a<0.5 would be reasonable. Some lower-complexity implementations may involve time smoothing of the computed correlation coefficient $cc_i(l)$ instead of the powers and cross-correlation coefficients. Though not mathematically equivalent to estimating the numerator and denominator separately, such lower-complexity smoothing was found to provide a sufficiently accurate estimate of the cross-correlation coefficients. The particular implementation of the estimation function as a first order IIR filter does not preclude the implementation via other schemes, such as one based on a first-in-last-out ("FILO") buffer. In such implementations, the oldest sample in the buffer may be subtracted from the current estimate E{ }, while the newest sample may be added to the current estimate E{ }.

In some implementations, the smoothing process takes into consideration whether for the previous block the coefficients $S_{Di}$ were in coupling. For example, if in the previous block, channel i was not in coupling, then for the current block, a may be set to 1.0, since the MDCT coefficients for the previous block would not have been included in the coupling channel. Also, the previous MDCT transform could have been coded using the E-AC-3 short block mode, which further validates setting a to 1.0 in this case.

At this stage, cross-correlation coefficients between individual channels and a composite coupling channel have been determined. In the example of FIG. 10B, the processes corresponding to blocks 1022 through 1045 have been performed. The following processes are examples of estimating spatial parameters based on the cross-correlation coefficients. These processes are examples of block 1050 of method 1020.

In one example, using the cross-correlation coefficients for the frequency bands below $K_{CPL}$ (the lowest frequency of the received coupling channel frequency range), an estimate of the alphas to be used for decorrelation of MDCT coefficients above $K_{CPL}$ may be generated. The pseudo-code for computing the estimated alphas from the $cc_i(l)$ values according to one such implementation is as follows:

```
for (reg = 0; reg < numRegions; reg ++)
{
    for (chan = 0; chan < numChans; chan ++)
    {
        Compute the ICC mean and variance for the current region:
        CCm = MeanRegion(chan, iCCs, blockStart[reg],
        blockEnd[reg])
        CCv = VarRegion(chan, iCCs, blockStart[reg], blockEnd[reg])
         for (block = blockStart[reg]; block < blockEnd[reg]; block ++)
        {
            If channel is not in coupling then skip block:
            if (chanNotInCpl[block][chan])
                continue;
            fAlphaRho = CCm * MAPPED_VAR_RHO;
            fAlphaRho = (fAlphaRho > -1.0f) ? fAlphaRho : -1.0f;
            fAlphaRho = (fAlphaRho < 1.0f) ? fAlphaRho : 0.99999f;
            for(band = cplStartBand[blockStart]; band <
            iBandEnd[blockStart]; band ++)
            {
                iAlphaRho=floor(fAlphaRho*128)+128;
                fEstimatedValue = fAlphaRho + w[iNoiseIndex++] *
                Vb[band] * Vm[iAlphaRho]
                    * sqrt(CCv);
                fAlphaRho = fAlphaRho * MAPPED_VAR_RHO;
                EstAlphaArray[block][chan][band] =
                Smooth(fEstimatedValue);
            }
        }
    } end channel loop
} end region loop
```

A principal input to the above extrapolation process that generates alphas is CCm, which represents the mean of the correlation coefficients ($cc_i(l)$) over the current region. A "region" may be an arbitrary grouping of consecutive E-AC-3 blocks. An E-AC-3 frame could be composed of more than one region. However, in some implementations regions do not straddle frame boundaries. CCm may be computed as follows (indicated as the function MeanRegion( ) in the above pseudo-code):

$$CCm(i) = \frac{1}{N \cdot L} \sum_{0 \le n < N} \sum_{0 \le l < L} cc_i(n, l) \quad \text{(Equation 11)}$$

In Equation 11, i represents the channel index, L represents the number of low-frequency bands (below $K_{CPL}$) used for estimation, and N represents the number of blocks within the current region. Here we extend the notation $cc_i(l)$ to include the block index n. The mean cross-correlation coefficient may next be extrapolated to the received coupling channel frequency range via repeated application of the following scaling operation to generate a predicted alpha value for each coupling channel frequency band:

$$f\text{AlphaRho}=f\text{AlphaRho*MAPPED\_VAR\_RHO} \quad \text{(Equation 12)}$$

When applying Equation 12, fAlphaRho for the first coupling channel frequency band may be CCm(i) *MAPPED_VAR_RHO. In the pseudo-code example, the variable MAPPED_VAR_RHO was derived heuristically by observing that the mean alpha values tend to decrease with increasing band index. As such, MAPPED_VAR_RHO is set be less than 1.0. In some implementations, MAPPED_VAR_RHO is set to 0.98.

At this stage, spatial parameters (alphas in this example) have been estimated. In the example of FIG. 10B, the processes corresponding to blocks 1022 through 1050 have been performed. The following processes are examples of adding noise to or "dithering" the estimated spatial parameters. These processes are examples of block 1055 of method 1020.

Based on an analysis of how the prediction error varies with frequency for a large corpus of different types of multichannel input signals, the inventors have formulated heuristic rules that control the degree of randomization that is imposed on the estimated alpha values. The estimated spatial parameters in the coupling channel frequency range (obtained by correlation calculation from lower frequencies followed by extrapolation) may eventually have the same statistics as if these parameters had been calculated directly in the coupling channel frequency range from the original signal, when all the individual channels were available without being coupled. The goal of adding noise is to impart a statistical variation similar to that which was empirically observed. In the pseudo-code above, $V_B$ represents an empirically-derived scaling term that dictates how the variance changes as a function of band index. $V_M$ represents an empirically-derived feature that is based on the prediction for alpha before the synthesized variance is applied. This accounts for the fact that the variance of prediction error is actually a function of the prediction. For instance, when the linear prediction of the alpha for a band is close to 1.0 the variance is very low. The term CCv represents a control based on the local variance of the computed $cc_i$ values for the current shared block region. CCv may be computed as follows (indicated by VarRegion( ) in the above pseudo-code):

$$CCv(i) = \frac{1}{N \cdot L} \sum_{0 \le n < N} \sum_{0 \le l < L} [cc_i(n, l) - CCm(i)]^2 \quad \text{(Equation 13)}$$

In this example, $V_B$ controls the dither variance according to the band index. $V_B$ was derived empirically by examining the variance across bands of the alpha prediction error calculated from the source. The inventors discovered that the relationship between normalized variance and the band index l may be modeled according to the following equation:

$$V_B(l) = \begin{cases} 1.0 & 0 \le l < 4 \\ \sqrt{1 + \frac{(1 - 0.8^{(l-4)})}{2}} & l \ge 4 \end{cases}$$

Figure 10C:
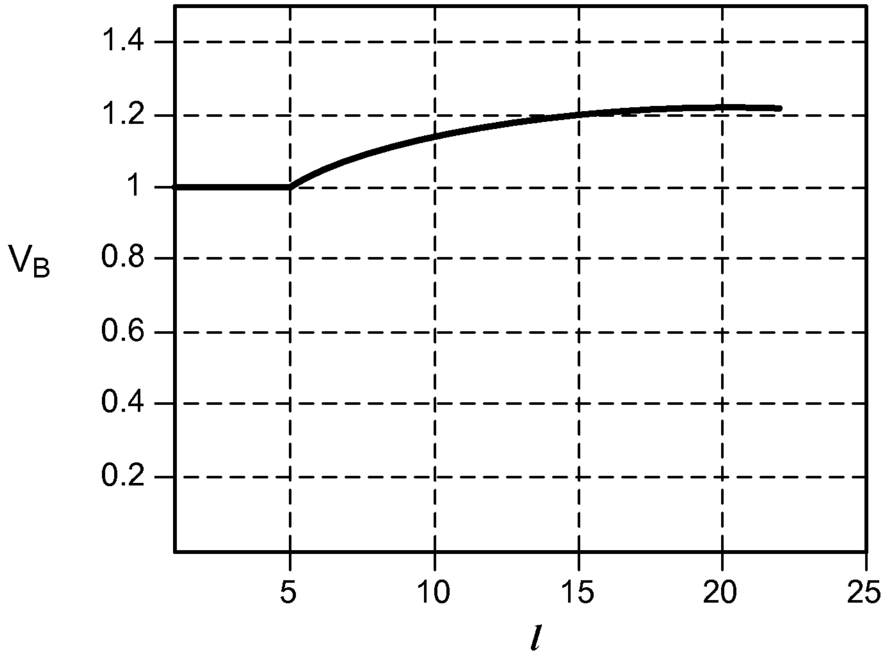
FIG. 10C is a graph that indicates the relationship between scaling term $V_B$ and band index 1.

FIG. 10C is a graph that indicates the relationship between scaling term $V_B$ and band index l. FIG. 10C shows that the incorporation of the $V_B$ feature will lead to an estimated alpha that will have progressively greater variance as a function of band index. In Equation 13, a band index l<3 corresponds to the region below 3.42 kHz, the lowest coupling begin frequency of the E-AC-3 audio codec. Therefore, the values of $V_B$ for those band indices are immaterial.

The $V_M$ parameter was derived by examining the behavior of the alpha prediction error as a function of the prediction itself. In particular, the inventors discovered through analysis of a large corpus of multichannel content that when the predicted alpha value is negative the variance of prediction error increases, with a peak at alpha=−0.59375. This implies that when the current channel under analysis is negatively correlated to the downmix $x_D$, the estimated alpha may generally be more chaotic. Equation 14, below, models the desired behavior:

$$V_M(q) = \begin{cases} \sqrt{1.5\frac{q}{128} + 1.58} & -128 \le q < -76 \\ \sqrt{1.6\left(\frac{q}{128}\right)^2 + 0.055} & -76 \le q < 0 \\ \sqrt{-0.01\frac{q}{128} + 0.055} & 0 \le q < 128 \end{cases} \quad \text{(Equation 14)}$$

In Equation 14, q represents the quantized version of the prediction (denoted by fAlphaRho in the pseudo-code), and may be computed according to:

$q$=floor($f$AlphaRho*128)

Figure 10D:
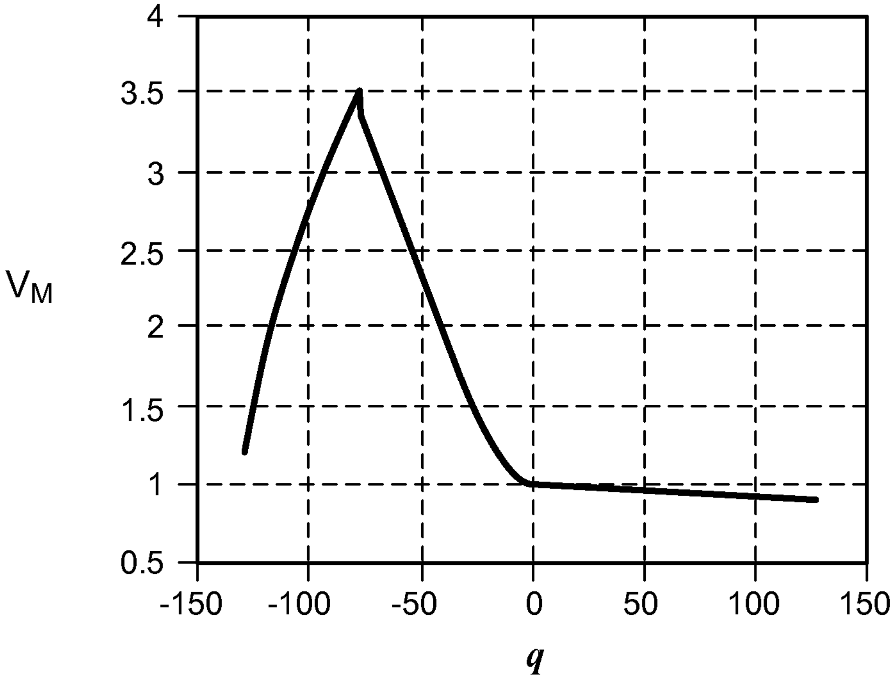
FIG. 10D is a graph that indicates the relationship between variables $V_M$ and q.

FIG. 10D is a graph that indicates the relationship between variables $V_M$ and q. Note that $V_M$ is normalized by the value at q=0, such that $V_M$ modifies the other factors contributing to the prediction error variance. Thus the term $V_M$ only affects the overall prediction error variance for values other than q=0. In the pseudo-code, the symbol iAlphaRho is set to q+128. This mapping avoids the need for negative values of iAlphaRho and allows reading values of $V_M$ (q) directly from a data structure, such as a table.

In this implementation, the next step is to scale the random variable w by the three factors $V_M$, $V_b$ and CCv. The geometric mean between $V_M$ and CCv may be computed and applied as the scaling factor to the random variable. In some implementations, w may be implemented as a very large table of random numbers with a zero mean unit variance Gaussian distribution.

After the scaling process, a smoothing process may be applied. For example, the dithered estimated spatial parameters may be smoothed across time, e.g., by using a simple pole-zero or FILO smoother. The smoothing coefficient may be set to 1.0 if the previous block was not in coupling, or if the current block is the first block in a region of blocks. Accordingly, the scaled random number from the noise record w may be low-pass filtered, which was found to better match the variance of the estimated alpha values to the variance of alphas in the source. In some implementations, this smoothing process may be less aggressive (i.e., IIR with a shorter impulse response) than the smoothing used for the $cc_i(l)$ s.

As noted above, the processes involved in estimating alphas and/or other spatial parameters may be performed, at least in part, by a control information receiver/generator 640 such as the one that is illustrated in FIG. 6C. In some implementations, the transient control module 655 of the control information receiver/generator 640 (or one or more other components of an audio processing system) may be configured to provide transient-related functionality. Some examples of transient detection, and of controlling a decorrelation process accordingly, will now be described with reference to FIG. 11A et seq.

Figure 11A:
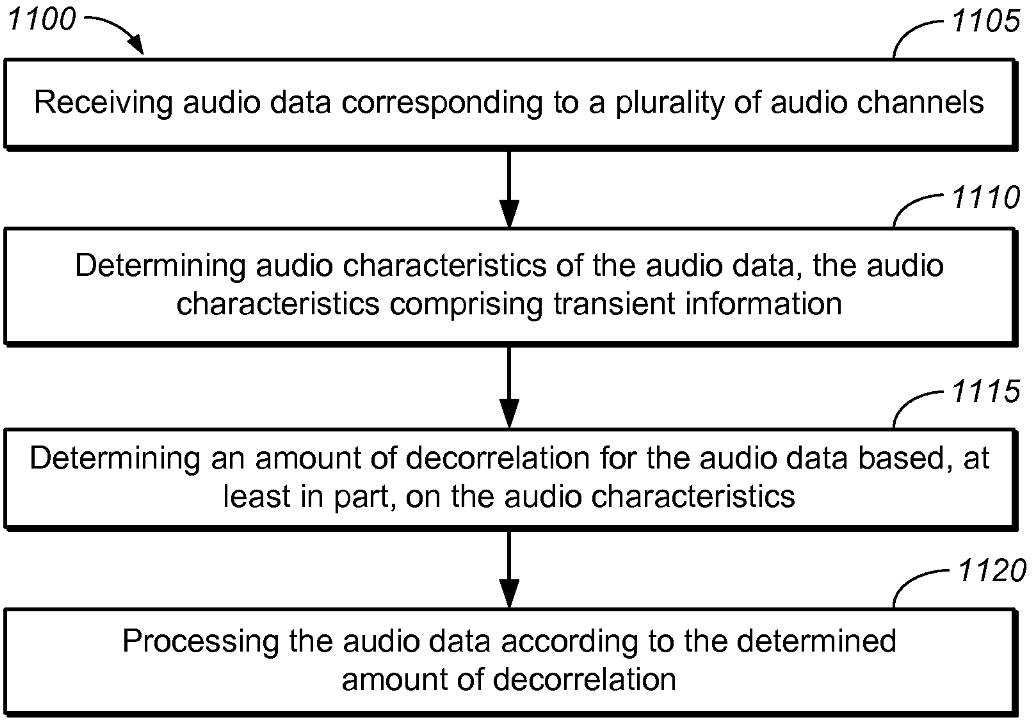
FIG. 11A is a flow diagram that outlines some methods of transient determination and transient-related controls.

FIG. 11A is a flow diagram that outlines some methods of transient determination and transient-related controls. In block 1105, audio data corresponding to a plurality of audio channels is received, e.g., by a decoding device or another such audio processing system. As described below, in some implementations similar processes may be performed by an encoding device.

Figure 11B:
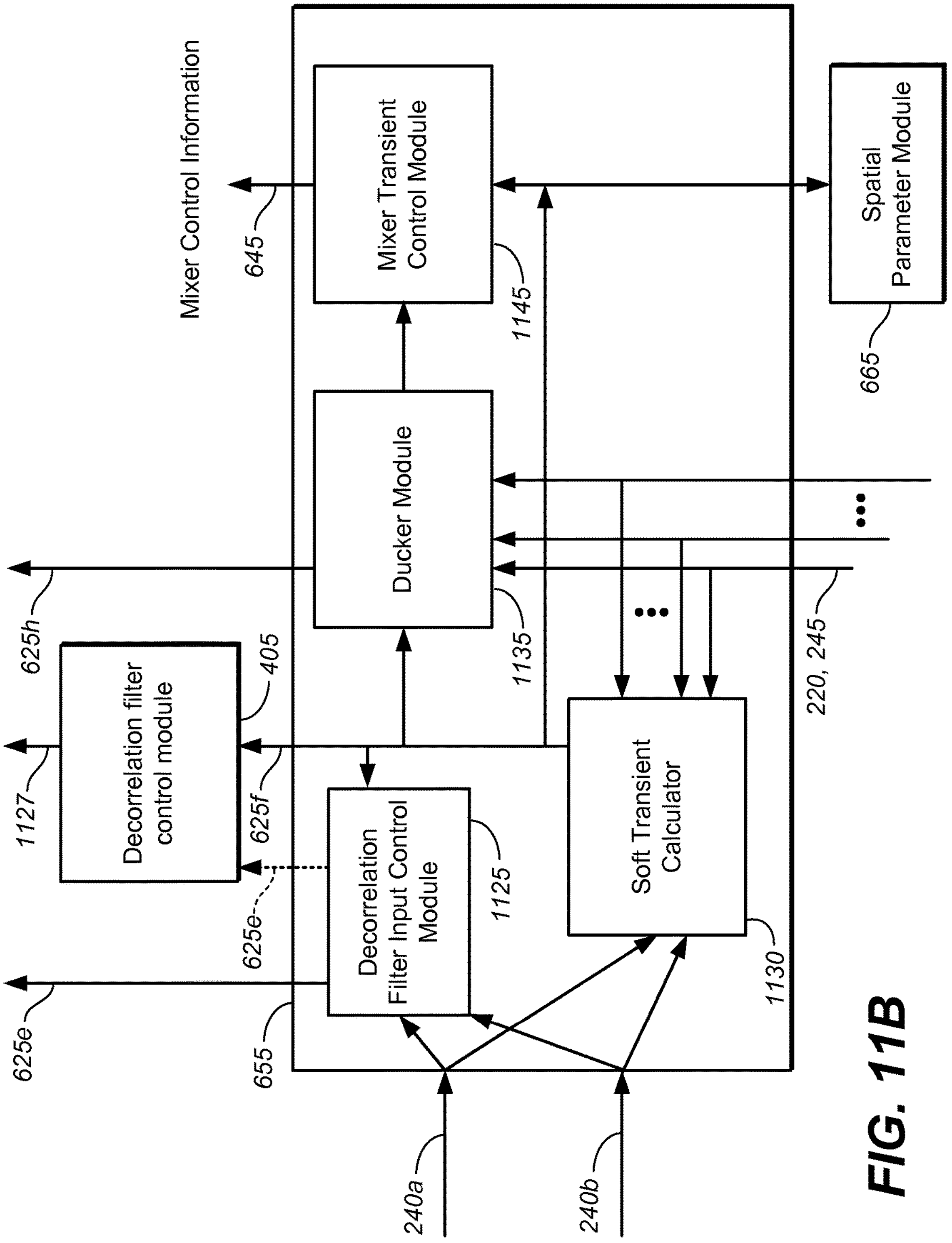
FIG. 11B is a block diagram that includes examples of various components for transient determination and transient-related controls.

FIG. 11B is a block diagram that includes examples of various components for transient determination and transient-related controls. In some implementations, block 1105 may involve receiving audio data 220 and audio data 245 by an audio processing system that includes the transient control module 655. The audio data 220 and 245 may include frequency domain representations of audio signals. The audio data 220 may include audio data elements in a coupling channel frequency range, whereas the audio data elements 245 may include audio data outside of the coupling channel frequency range. The audio data elements 220 and/or 245 may be routed to a decorrelator that includes the transient control module 655.

In addition to the audio data elements 245 and 220, the transient control module 655 may receive other associated audio information, such as the decorrelation information 240*a* and 240*b*, in block 1105. In this example, the decorrelation information 240*a* may include explicit decorrelator-specific control information. For example, the decorrelation information 240*a* may include explicit transient information such as that described below. The decorrelation information 240*b* may include information from a bitstream of a legacy audio codec. For example, the decorrelation information 240*b* may include time segmentation information that is available in a bitstream encoded according to the AC-3 audio codec or the E-AC-3 audio codec. For example, the decorrelation information 240*b* may include coupling-in-use information, block-switching information, exponent information, exponent strategy information, etc. Such information may have been received by an audio processing system in a bitstream along with audio data 220.

Block 1110 involves determining audio characteristics of the audio data. In various implementations, block 1110 involves determining transient information, e.g., by the transient control module 655. Block 1115 involves determining an amount of decorrelation for the audio data based, at least in part, on the audio characteristics. For example, block 1115 may involve determining decorrelation control information based, at least in part, on transient information.

In block 1115, the transient control module 655 of FIG. 11B may provide the decorrelation signal generator control information 625 to a decorrelation signal generator, such as the decorrelation signal generator 218 described elsewhere herein. In block 1115, the transient control module 655 also may provide the mixer control information 645 to a mixer, such as the mixer 215. In block 1120, the audio data may be processed according to the determinations made in block 1115. For example, the operations of the decorrelation signal generator 218 and the mixer 215 may be performed, at least in part, according to decorrelation control information provided by the transient control module 655.

In some implementations, block 1110 of FIG. 11A may involve receiving explicit transient information with the audio data and determining the transient information, at least in part, according to the explicit transient information.

In some implementations, the explicit transient information may indicate a transient value corresponding to a definite transient event. Such a transient value may be a relatively high (or maximum) transient value. A high transient value may correspond to a high likelihood and/or a high severity of a transient event. For example, if possible transient values range from 0 to 1, a range of transient values between 0.9 and 1 may correspond to a definite and/or a severe transient event. However, any appropriate range of transient values may be used, e.g., 0 to 9, 1 to 100, etc.

The explicit transient information may indicate a transient value corresponding to a definite non-transient event. For example, if possible transient values range from 1 to 100, a value in the range of 1-5 may correspond to a definite non-transient event or a very mild transient event.

In some implementations, the explicit transient information may have a binary representation, e.g. of either 0 or 1. For example, a value of 1 may correspond with a definite transient event. However, a value of 0 may not indicate a definite non-transient event. Instead, in some such implementations, a value of 0 may simply indicate the lack of a definite and/or a severe transient event.

However, in some implementations, the explicit transient information may include intermediate transient values between a minimum transient value (e.g., 0) and a maximum transient value (e.g., 1). An intermediate transient value may correspond to an intermediate likelihood and/or an intermediate severity of a transient event.

The decorrelation filter input control module 1125 of FIG. 11B may determine transient information in block 1110 according to explicit transient information received via the decorrelation information 240*a*. Alternatively, or additionally, the decorrelation filter input control module 1125 may determine transient information in block 1110 according to information from a bitstream of a legacy audio codec. For example, based on the decorrelation information 240*b*, the decorrelation filter input control module 1125 may determine that channel coupling is not in use for the current block, that the channel is out of coupling in the current block and/or that the channel is block-switched in the current block.

Based on the decorrelation information 240*a* and/or 240*b*, the decorrelation filter input control module 1125 may sometimes determine a transient value corresponding to a definite transient event in block 1110. If so, in some implementations the decorrelation filter input control module 1125 may determine in block 1115 that a decorrelation process (and/or a decorrelation filter dithering process) should be temporarily halted. Accordingly, in block 1120 the decorrelation filter input control module 1125 may generate decorrelation signal generator control information 625*e* indicating that a decorrelation process (and/or a decorrelation filter dithering process) should be temporarily halted. Alternatively, or additionally, in block 1120 the soft transient calculator 1130 may generate decorrelation signal generator control information 625*f*, indicating that a decorrelation filter dithering process should be temporarily halted or slowed down.

In alternative implementations, block 1110 may involve receiving no explicit transient information with the audio data. However, whether or not explicit transient information is received, some implementations of method 1100 may involve detecting a transient event according to an analysis of the audio data 220. For example, in some implementations, a transient event may be detected in block 1110 even when explicit transient information does not indicate a transient event. A transient event that is determined or detected by a decoder, or a similar audio processing system, according to an analysis of the audio data 220 may be referred to herein as a "soft transient event."

In some implementations, whether a transient value is provided as an explicit transient value or determined as a soft transient value, the transient value may be subject to an exponential decay function. For example, the exponential decay function may cause the transient value to smoothly decay from an initial value to zero over a period of time. Subjecting a transient value to an exponential decay function may prevent artifacts associated with abrupt switching.

In some implementations, detecting a soft transient event may involve evaluating the likelihood and/or the severity of a transient event. Such evaluations may involve calculating a temporal power variation in the audio data 220.

Figure 11C:
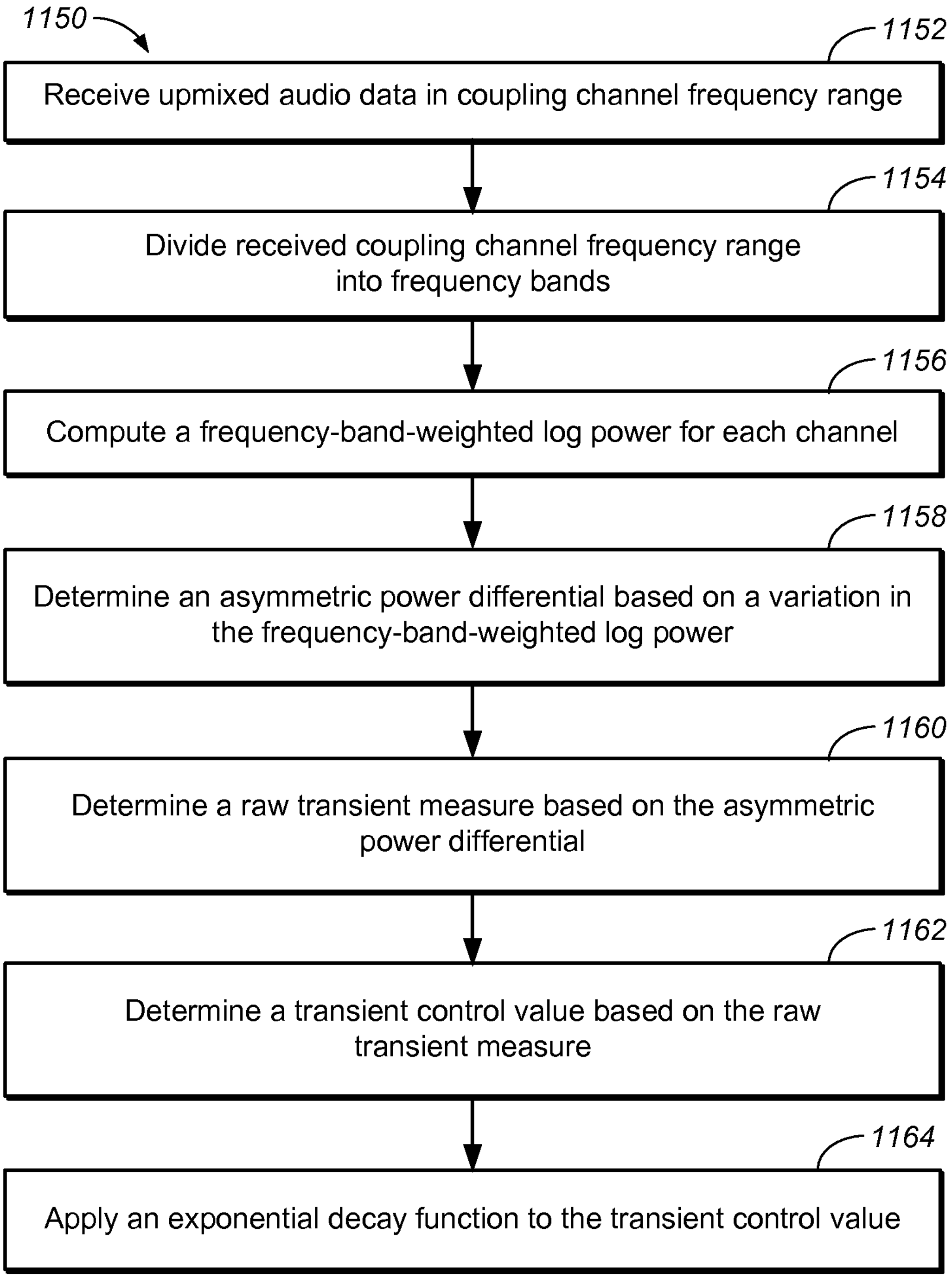
FIG. 11C is a flow diagram that outlines some methods of determining transient control values based, at least in part, on temporal power variations of audio data.

FIG. 11C is a flow diagram that outlines some methods of determining transient control values based, at least in part, on temporal power variations of audio data. In some implementations the method 1150 may be performed, at least in part, by the soft transient calculator 1130 of the transient control module 655. However, in some implementations the method 1150 may be performed by an encoding device. In some such implementations, explicit transient information may be determined by the encoding device according to the method 1150 and included in a bitstream along with other audio data.

The method 1150 begins with block 1152, wherein upmixed audio data in a coupling channel frequency range are received. In FIG. 11B, for example, upmixed audio data elements 220 may be received by the soft transient calculator 1130 in block 1152. In block 1154, the received coupling channel frequency range is divided into one or more frequency bands, which also may be referred to herein as "power bands."

Block 1156 involves computing the frequency-band-weighted logarithmic power ("WLP") for each channel and block of the upmixed audio data. To compute the WLP, the power of each power band may be determined. These powers may be converted into logarithmic values and then averaged across the power bands. In some implementations, block 1156 may be performed according to the following expression:

$$WLP[ch][blk]=mean_{pwr\_bnd}\{\log(P[ch][blk][pwr\_bnd])\} \quad \text{(Equation 15)}$$

In Equation 15, WLP[ch][blk] represents the weighted logarithmic power for a channel and block, [pwr_bnd] represents a frequency band or "power band" into which the received coupling channel frequency range has been divided and $mean_{pwr\_bnd}\{\log(P[ch][blk][pwr\_bnd])\}$ represents a mean of the logarithms of power across the power bands of the channel and block.

Banding may pre-emphasize the power variation in higher frequencies, for the following reasons. If the entire coupling channel frequency range were one band, then P[ch][blk][pwr_bnd] would be the arithmetic mean of the power at each frequency in the coupling channel frequency range and the lower frequencies that typically have higher power would tend to swamp the value of P[ch][blk][pwr_bnd] and hence the value of log(P[ch][blk][pwr_bnd]). (In this case log(P[ch][blk][pwr_bnd]) would have the same value as mean log(P[ch][blk][pwr_bnd]), because there would be only one band.) Accordingly, the transient detection would be based to a large extent on the temporal variation in the lower frequencies. Dividing the coupling channel frequency range into, for example, a lower frequency band and a higher frequency band and then averaging the power of the two bands in the log-domain rather is equivalent to calculating the geometric mean of the power of the lower frequencies and the power of the higher frequencies. Such a geometric mean would be closer to the power of the higher frequencies than would be an arithmetic mean. Therefore banding, determining the log (power) and then determining the mean would tend to result in a quantity that is more sensitive to temporal variation at the higher frequencies.

In this implementation, block 1158 involves determining an asymmetric power differential ("APD") based on the WLP. For example, the APD may be determined as follows:

$$dWLP[ch][blk] = \begin{cases} WLP[ch][blk] - WLP[ch][blk-2], & WLP[ch][blk] \geq WLP[ch][blk-2] \\ \frac{WLP[ch][blk] - WLP[ch][blk-2]}{2}, & WLP[ch][blk] < WLP[ch][blk-2] \end{cases} \quad \text{(Equation 16)}$$

In Equation 16, dWLP[ch][blk] represents the differential weighted logarithmic power for a channel and block and WLP[ch][blk][blk−2] represents the weighted logarithmic power for the channel two blocks ago. The example of Equation 16 is useful for processing audio data encoded via audio codecs such as E-AC-3 and AC-3, in which there is a 50% overlap between consecutive blocks. Accordingly, the WLP of the current block is compared to the WLP two blocks ago. If there is no overlap between consecutive blocks, the WLP of the current block may be compared to the WLP of the previous block.

This example takes advantage of the possible temporal masking effect of prior blocks. Accordingly, if the WLP of the current block is greater than or equal to that of the prior block (in this example, the WLP two blocks prior), the APD is set to the actual WLP differential. However, if the WLP of the current block is less than that of the prior block, the APD is set to half of the actual WLP differential. Accordingly, the APD emphasizes increasing power and de-emphasizes decreasing power. In other implementations, a different fraction of the actual WLP differential may be used, e.g., ¼ of the actual WLP differential.

Block 1160 may involve determining a raw transient measure ("RTM") based on the APD. In this implementation, determining the raw transient measure involves calculating a likelihood function of transient events based on an assumption that the temporal asymmetric power differential is distributed according to a Gaussian distribution:

$$RTM[ch][blk] = 1 - \exp\left(-0.5 * \left(\frac{dWLP[ch][blk]}{S_{APD}}\right)^2\right) \quad \text{(Equation 17)}$$

In Equation 17, RTM[ch][blk] represents a raw transient measure for a channel and block, and $S_{APD}$ represents a tuning parameter. In this example, when $S_{APD}$ is increased, a relatively larger power differential will be required to produce the same value of RTM.

A transient control value, which may also be referred to herein as a "transient measure," may be determined from the RTM in block 1162. In this example, the transient control value is determined according to Equation 18:

$$TM[ch][blk] = \begin{cases} 1.0, & RTM[ch][blk] \geq T_H \\ \frac{RTM[ch][blk] - T_L}{T_H - T_L}, & T_L < RTM[ch][blk] < T_H \\ 0.0, & RTM[ch][blk] \leq T_L \end{cases} \quad \text{(Equation 18)}$$

Figure 11D:
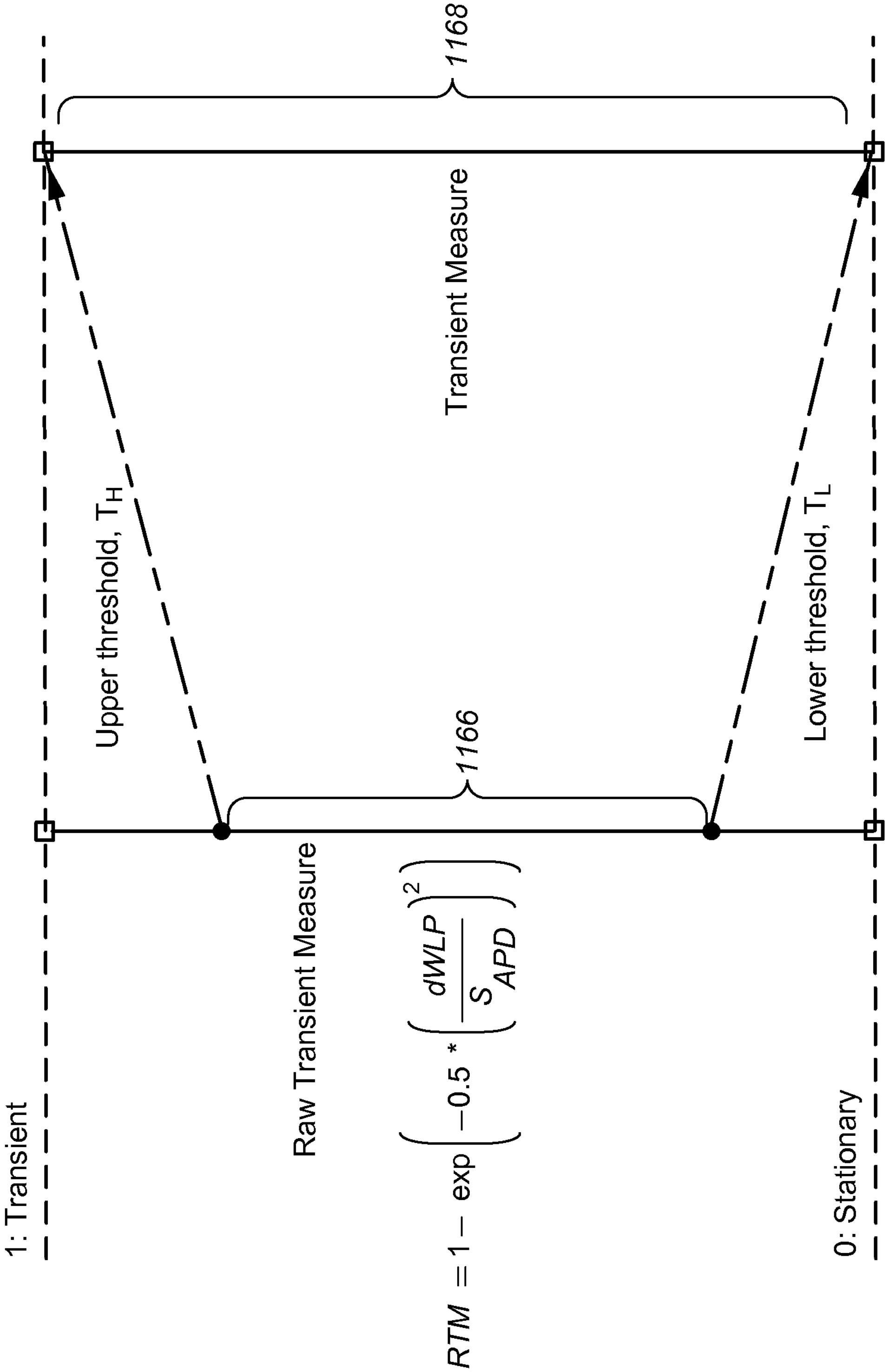
FIG. 11D is a graph that illustrates an example of mapping raw transient values to transient control values.

In Equation 18, TM[ch][blk] represents the transient measure for a channel and block, $T_H$ represents an upper threshold and $T_L$ represents a lower threshold. FIG. 11D provides an example of applying Equation 18 and of how the thresholds $T_H$ and $T_L$ may be used. Other implementations may involve other types of linear or nonlinear mapping from RTM to TM. According to some such implementations, TM is a non-decreasing function of RTM.

FIG. 11D is a graph that illustrates an example of mapping raw transient values to transient control values. Here, both the raw transient values and the transient control values range from 0.0 to 1.0, but other implementations may involve other ranges of values. As shown in Equation 18 and FIG. 11D, if a raw transient value is greater than or equal to the upper threshold $T_H$, the transient control value is set to its maximum value, which is 1.0 in this example. In some implementations, a maximum transient control value may correspond with a definite transient event.

If a raw transient value is less than or equal to the lower threshold $T_L$, the transient control value is set to its minimum value, which is 0.0 in this example. In some implementations, a minimum transient control value may correspond with a definite non-transient event.

However, if a raw transient value is within the range 1166 between the lower threshold $T_L$ and the upper threshold $T_H$, the transient control value may be scaled to an intermediate transient control value, which is between 0.0 and 1.0 in this example. The intermediate transient control value may correspond with a relative likelihood and/or a relative severity of a transient event.

Referring again to FIG. 11C, in block 1164 an exponential decay function may be applied to the transient control value that is determined in block 1162. For example, the exponential decay function may cause the transient control value to smoothly decay from an initial value to zero over a period of time. Subjecting a transient control value to an exponential decay function may prevent artifacts associated with abrupt switching. In some implementations, a transient control value of each current block may be calculated and compared to the exponential decayed version of the transient control value of the previous block. The final transient control value for the current block may be set as the maximum of the two transient control values.

Transient information, whether received along with other audio data or determined by a decoder, may be used to control decorrelation processes. The transient information may include transient control values such as those described above. In some implementations, an amount of decorrelation for the audio data may be modified (e.g. reduced), based at least in part on such transient information.

As described above, such decorrelation processes may involve applying a decorrelation filter to a portion of the audio data, to produce filtered audio data, and mixing the filtered audio data with a portion of the received audio data according to a mixing ratio. Some implementations may involve controlling the mixer 215 according to transient information. For example, such implementations may involve modifying the mixing ratio based, at least in part, on transient information. Such transient information may, for example, be included in the mixer control information 645 by the mixer transient control module 1145. (See FIG. 11B.)

According to some such implementations, transient control values may be used by the mixer 215 to modify alphas in order to suspend or reduce decorrelation during transient events. For example, the alphas may be modified according to the following pseudo code:

```
if (alpha[ch][bnd] >=0)
    alpha[ch][bnd] = alpha[ch][bnd] + (1-alpha[ch][bnd])
* decorrelationDecayArray[ch];
```

-continued

```
else
    alpha[ch][bnd] = alpha[ch][bnd] + (−1-alpha[ch][bnd])
* decorrelationDecayArray[ch];
```

In the foregoing pseudo code, alpha[ch][bnd] represents an alpha value of a frequency band for one channel. The term decorrelationDecayArray[ch] represents an exponential decay variable that takes a value ranging from 0 to 1. In some examples, the alphas may be modified toward+/−1 during transient events. The extent of modification may be proportional to decorrelationDecayArray[ch], which would reduce the mixing weights for the decorrelation signals toward 0 and thus suspend or reduce decorrelation. The exponential decay of decorrelationDecayArray[ch] slowly restores the normal decorrelation process.

In some implementations, the soft transient calculator 1130 may provide soft transient information to the spatial parameter module 665. Based at least in part on the soft transient information, the spatial parameter module 665 may select a smoother either for smoothing spatial parameters received in the bitstream or for smoothing energy and other quantities involved in spatial parameter estimation.

Some implementations may involve controlling the decorrelation signal generator 218 according to transient information. For example, such implementations may involve modifying or temporarily halting a decorrelation filter dithering process based, at least in part, on transient information. This may be advantageous because dithering the poles of the all-pass filters during transient events may cause undesired ringing artifacts. In some such implementations, the maximum stride value for dithering poles of a decorrelation filter may be modified based, at least in part, on transient information.

For example, the soft transient calculator 1130 may provide the decorrelation signal generator control information **625*f* to the decorrelation filter control module 405 of the decorrelation signal generator 218 (see also FIG. 4). The decorrelation filter control module 405 may generate time-variant filters 1127 in response to the decorrelation signal generator control information 625*f*. According to some implementations, the decorrelation signal generator control information 625*f*** may include information for controlling the maximum stride value according to the maximum value of an exponential decay variable, such as:

$$1-\max_{ch} decorrelationDecayArray[ch]$$

For example, the maximum stride value may be multiplied by the forgoing expression when transient events are detected in any channel. The dithering process may be halted or slowed accordingly.

In some implementations, a gain may be applied to filtered audio data based, at least in part, on transient information. For example, the power of the filtered audio data may be matched with the power of the direct audio data. In some implementations, such functionality may be provided by the ducker module 1135 of FIG. 11B.

The ducker module 1135 may receive transient information, such as transient control values, from the soft transient calculator 1130. The ducker module 1135 may determine the decorrelation signal generator control information **625*h* according to the transient control values. The ducker module 1135 may provide the decorrelation signal generator control information 625*h* to the decorrelation signal generator 218. For example, the decorrelation signal generator control information 625*h* includes a gain value that the decorrelation signal generator 218 can apply to the decorrelation signals 227 in order to maintain the power of the filtered audio data at a level that is less than or equal to the power of the direct audio data. The ducker module 1135 may determine the decorrelation signal generator control information 625*h*** by calculating, for each received channel in coupling, the energy per frequency band in the coupling channel frequency range.

The ducker module 1135 may, for example, include a bank of duckers. In some such implementations, the duckers may include buffers for temporarily storing the energy per frequency band in the coupling channel frequency range determined by the ducker module 1135. A fixed delay may be applied to the filtered audio data and the same delay may be applied to the buffers.

The ducker module 1135 also may determine mixer-related information and may provide the mixer-related information to the mixer transient control module 1145. In some implementations, the ducker module 1135 may provide information for controlling the mixer 215 to modify the mixing ratio based on a gain to be applied to the filtered audio data. According to some such implementations, the ducker module 1135 may provide information for controlling the mixer 215 to suspend or reduce decorrelation during transient events. For example, the ducker module 1135 may provide the following mixer-related information:

```
TransCtrlFlag = max(decorrelationDecayArray[ch], 1-
DecorrGain[ch][bnd]);
if (alpha[ch][bnd] >=0)
    alpha[ch][bnd] = alpha[ch][bnd] + (1-alpha[ch][bnd])
    * TransCtrlFlag;
else
    alpha[ch][bnd] = alpha[ch][bnd] + (−1-alpha[ch][bnd])
* TransCtrlFlag;
```

In the foregoing pseudo code, TransCtrlFlag represents a transient control value and DecorrGain[ch][bnd] represents the gain to apply to a band of a channel of filtered audio data.

In some implementations, a power estimation smoothing window for the duckers may be based, at least in part, on transient information. For example, a shorter smoothing window may be applied when a transient event is relatively more likely or when a relatively stronger transient event is detected. A longer smoothing window may be applied when a transient event is relatively less likely, when a relatively weaker transient event is detected or when no transient event is detected. For example, the smoothing window length may be dynamically adjusted based on the transient control values such that the window length is shorter when the flag value is close to a maximum value (e.g., 1.0) and longer when the flag value is close to a minimum value (e.g., 0.0). Such implementations may help to avoid time smearing during transient events while resulting in smooth gain factors during non-transient situations.

Figure 11E:
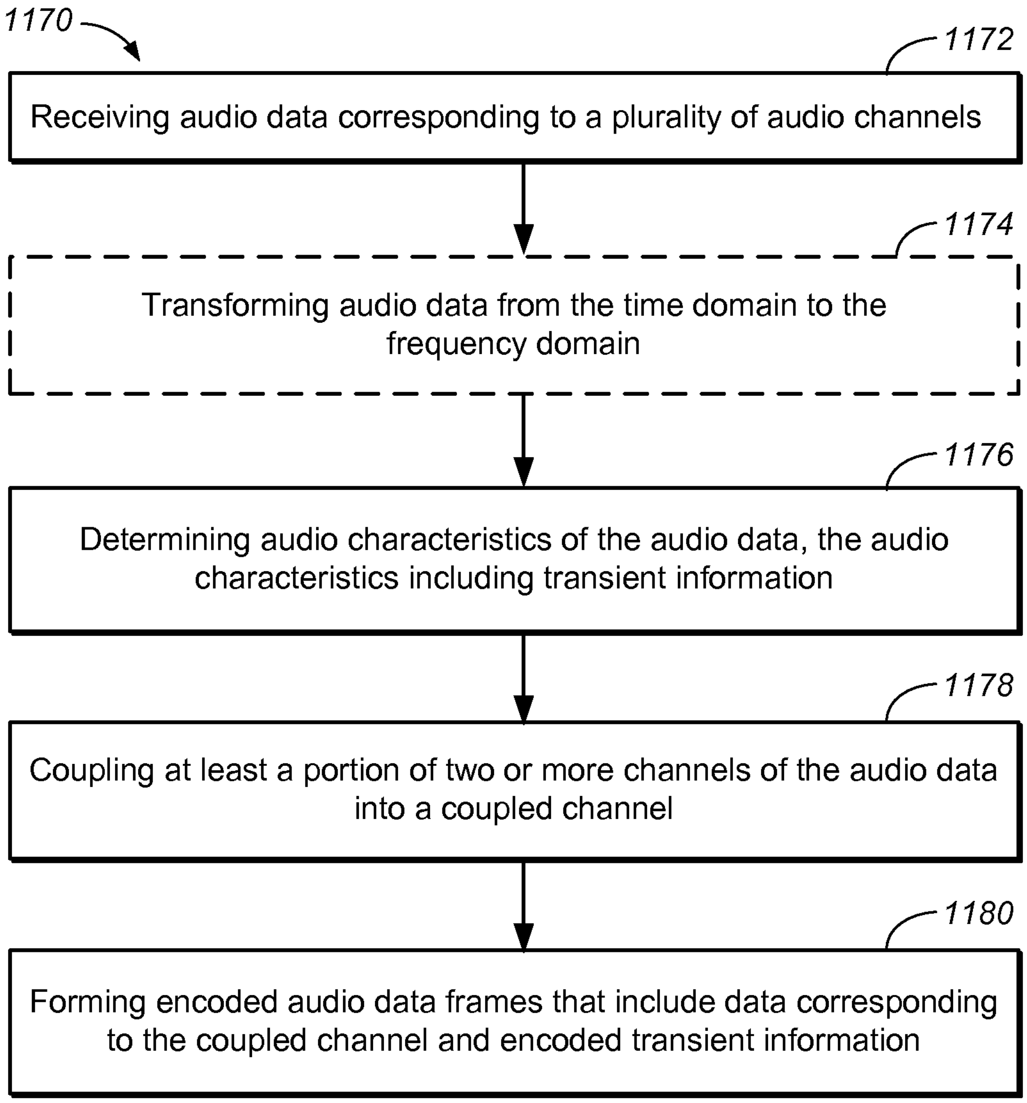
FIG. 11E is a flow diagram that outlines a method of encoding transient information.

As noted above, in some implementations transient information may be determined by an encoding device. FIG. 11E is a flow diagram that outlines a method of encoding transient information. In block 1172, audio data corresponding to a plurality of audio channels are received. In this example, the audio data is received by an encoding device. In some implementations, the audio data may be transformed from the time domain to the frequency domain (optional block 1174).

In block 1176, audio characteristics, including transient information, are determined. For example, the transient information may be determined as described above with reference to FIGS. 11A-11D. For example, block 1176 may involve evaluating a temporal power variation in the audio data. Block 1176 may involve determining transient control values according to the temporal power variation in the audio data. Such transient control values may indicate a definite transient event, a definite non-transient event, the likelihood of a transient event and/or the severity of a transient event. Block 1176 may involve applying an exponential decay function to the transient control values.

In some implementations, the audio characteristics determined in block 1176 may include spatial parameters, which may be determined substantially as described elsewhere herein. However, instead of calculating correlations outside of the coupling channel frequency range, the spatial parameters may be determined by calculating correlations within the coupling channel frequency range. For example, alphas for an individual channel that will be encoded with coupling may be determined by calculating correlations between transform coefficients of that channel and the coupling channel on a frequency band basis. In some implementations, the encoder may determine the spatial parameters by using complex frequency representations of the audio data.

Block 1178 involves coupling at least a portion of two or more channels of the audio data into a coupled channel. For example, frequency domain representations of the audio data for the coupled channel, which are within a coupling channel frequency range, may be combined in block 1178. In some implementations, more than one coupled channel may be formed in block 1178.

In block 1180, encoded audio data frames are formed. In this example, the encoded audio data frames include data corresponding to the coupled channel(s) and encoded transient information determined in block 1176. For example, the encoded transient information may include one or more control flags. The control flags may include a channel block switch flag, a channel out-of-coupling flag and/or a coupling-in-use flag. Block 1180 may involve determining a combination of one or more of the control flags to form encoded transient information that indicates a definite transient event, a definite non-transient event, the likelihood of a transient event or the severity of a transient event.

Whether or not formed by combining control flags, the encoded transient information may include information for controlling a decorrelation process. For example, the transient information may indicate that a decorrelation process should be temporarily halted. The transient information may indicate that an amount of decorrelation in a decorrelation process should be temporarily reduced. The transient information may indicate that a mixing ratio of a decorrelation process should be modified.

The encoded audio data frames also may include various other types of audio data, including audio data for individual channels outside the coupling channel frequency range, audio data for channels not in coupling, etc. In some implementations, the encoded audio data frames also may include spatial parameters, coupling coordinates, and/or other types of side information such as that described elsewhere herein.

Figure 12:
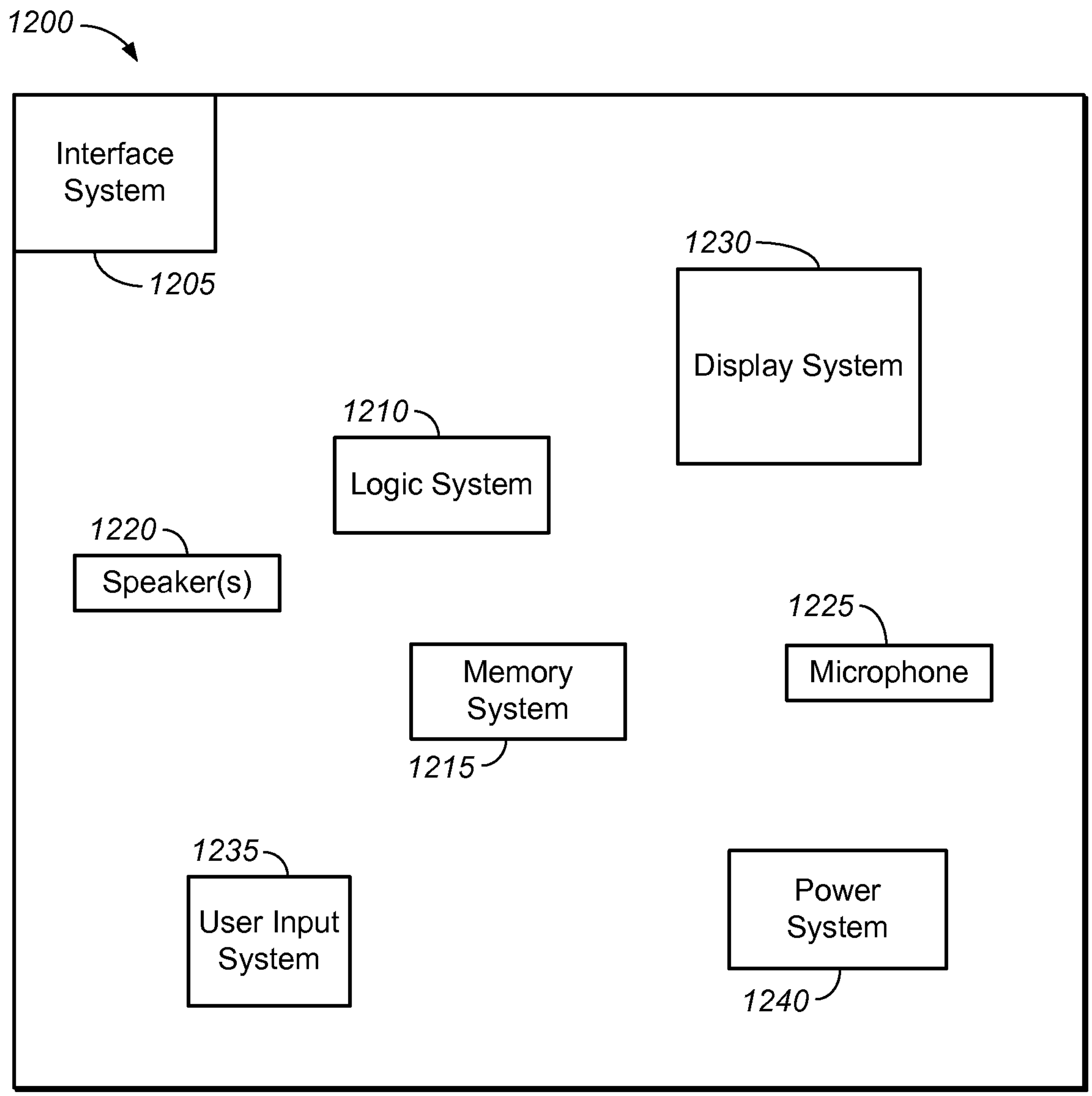
FIG. 12 is a block diagram that provides examples of components of an apparatus that may be configured for implementing aspects of the processes described herein.

FIG. 12 is a block diagram that provides examples of components of an apparatus that may be configured for implementing aspects of the processes described herein. The device 1200 may be a mobile telephone, a smartphone, a desktop computer, a hand-held or portable computer, a netbook, a notebook, a smartbook, a tablet, a stereo system, a television, a DVD player, a digital recording device, or any of a variety of other devices. The device 1200 may include an encoding tool and/or a decoding tool. However, the components illustrated in FIG. 12 are merely examples. A particular device may be configured to implement various embodiments described herein, but may or may not include all components. For example, some implementations may not include a speaker or a microphone.

In this example, the device includes an interface system 1205. The interface system 1205 may include a network interface, such as a wireless network interface. Alternatively, or additionally, the interface system 1205 may include a universal serial bus (USB) interface or another such interface.

The device 1200 includes a logic system 1210. The logic system 1210 may include a processor, such as a general purpose single- or multi-chip processor. The logic system 1210 may include a digital signal processor (DSP), an application specific integrated circuit (ASIC), a field programmable gate array (FPGA) or other programmable logic device, discrete gate or transistor logic, or discrete hardware components, or combinations thereof. The logic system 1210 may be configured to control the other components of the device 1200. Although no interfaces between the components of the device 1200 are shown in FIG. 12, the logic system 1210 may be configured for communication with the other components. The other components may or may not be configured for communication with one another, as appropriate.

The logic system 1210 may be configured to perform various types of audio processing functionality, such as encoder and/or decoder functionality. Such encoder and/or decoder functionality may include, but is not limited to, the types of encoder and/or decoder functionality described herein. For example, the logic system 1210 may be configured to provide the decorrelator-related functionality described herein. In some such implementations, the logic system 1210 may be configured to operate (at least in part) according to software stored on one or more non-transitory media. The non-transitory media may include memory associated with the logic system 1210, such as random access memory (RAM) and/or read-only memory (ROM). The non-transitory media may include memory of the memory system 1215. The memory system 1215 may include one or more suitable types of non-transitory storage media, such as flash memory, a hard drive, etc.

For example, the logic system 1210 may be configured to receive frames of encoded audio data via the interface system 1205 and to decode the encoded audio data according to the methods described herein. Alternatively, or additionally, the logic system 1210 may be configured to receive frames of encoded audio data via an interface between the memory system 1215 and the logic system 1210. The logic system 1210 may be configured to control the speaker(s) 1220 according to decoded audio data. In some implementations, the logic system 1210 may be configured to encode audio data according to conventional encoding methods and/or according to encoding methods described herein. The logic system 1210 may be configured to receive such audio data via the microphone 1225, via the interface system 1205, etc.

The display system 1230 may include one or more suitable types of display, depending on the manifestation of the device 1200. For example, the display system 1230 may include a liquid crystal display, a plasma display, a bistable display, etc.

The user input system 1235 may include one or more devices configured to accept input from a user. In some implementations, the user input system 1235 may include a touch screen that overlays a display of the display system 1230. The user input system 1235 may include buttons, a keyboard, switches, etc. In some implementations, the user input system 1235 may include the microphone 1225: a user may provide voice commands for the device 1200 via the microphone 1225. The logic system may be configured for speech recognition and for controlling at least some operations of the device 1200 according to such voice commands.

The power system 1240 may include one or more suitable energy storage devices, such as a nickel-cadmium battery or a lithium-ion battery. The power system 1240 may be configured to receive power from an electrical outlet.

Various modifications to the implementations described in this disclosure may be readily apparent to those having ordinary skill in the art. The general principles defined herein may be applied to other implementations without departing from the spirit or scope of this disclosure. For example, while various implementations have been described in terms of Dolby Digital and Dolby Digital Plus, the methods described herein may be implemented in conjunction with other audio codecs. Thus, the claims are not intended to be limited to the implementations shown herein, but are to be accorded the widest scope consistent with this disclosure, the principles and the novel features disclosed herein.

What is claimed is:

1. A method, comprising:

Determining, from an encoded bitstream, modified discrete cosine transform (MDCT) coefficients corresponding to a frequency domain representation of a plurality of audio channels; and applying a decorrelation process to at least some of the MDCT coefficients, the decorrelation process being performed without converting the MDCT coefficients to another frequency domain or time domain representation, wherein the decorrelation process involves applying a decorrelation algorithm that operates entirely on the MDCT coefficients.

2. The method of claim 1, wherein the decorrelation process involves generating reverb signals or decorrelation signals by applying linear filters to at least a portion of the MDCT coefficients.

3. The method of claim 1, wherein the decorrelation process involves selective or signal-adaptive decorrelation of specific channels and/or specific frequency bands.

4. The method of claim 1, wherein the decorrelation process involves applying a decorrelation filter to a portion of the MDCT coefficients to produce filtered MDCT coefficients.

5. The method of claim 4, wherein the decorrelation process involves using a non-hierarchical mixer to combine the MDCT coefficients with the filtered MDCT coefficients according to spatial parameters.

6. The method of claim 1, further comprising receiving decorrelation information with the encoded bitstream, wherein the decorrelation process involves decorrelating at least some of the MDCT coefficients according to the received decorrelation information.

7. The method of claim 6, wherein the received decorrelation information includes at least one of correlation coefficients between individual discrete channels and a coupling channel, correlation coefficients between individual discrete channels, explicit tonality information or transient information.

8. The method of claim 1, further comprising determining decorrelation information based on the MDCT coefficients, wherein the decorrelation process involves decorrelating at least some of the MDCT coefficients according to determined decorrelation information.

9. The method of claim 8, further comprising receiving decorrelation information encoded with the encoded bitstream, wherein the decorrelation process involves decorrelating at least some of the MDCT coefficients according to at least one of the received decorrelation information or the determined decorrelation information.

10. An apparatus, comprising:

an interface; and a logic system configured for:

receiving, via the interface, an encoded bitstream, and determining, from the encoded bitstream, modified discrete cosine transform (MDCT) coefficients corresponding to a frequency domain representation of a plurality of audio channels; and applying a decorrelation process to at least some of the MDCT coefficients, the decorrelation process being performed without converting the MDCT coefficients to another frequency domain or time domain representation, wherein the decorrelation process involves applying a decorrelation algorithm that operates entirely on the MDCT coefficients.

11. The apparatus of claim 10, wherein the decorrelation process involves generating reverb signals or decorrelation signals by applying linear filters to a least a portion of the MDCT coefficients.

12. The apparatus of claim 10, wherein the decorrelation process involves selective or signal-adaptive decorrelation of specific channels and/or specific frequency bands.

13. The apparatus of claim 10, wherein the decorrelation process involves applying a decorrelation filter to a portion of the MDCT coefficients to produce filtered MDCT coefficients.

14. The apparatus of claim 13, wherein the decorrelation process involves using a non-hierarchical mixer to combine the MDCT coefficients with the filtered MDCT coefficients according to spatial parameters.

15. A non-transitory medium having software stored thereon, the software including instructions for controlling an apparatus to:

determine, from an encoded bitstream, modified discrete cosine transform (MDCT) coefficients corresponding to a frequency domain representation of a plurality of audio channels; and apply a decorrelation process to at least some of the MDCT coefficients, the decorrelation process being performed without converting the MDCT coefficients to another frequency domain or time domain representation, wherein the decorrelation process involves applying a decorrelation algorithm that operates entirely on the MDCT coefficients.

* * * * *